United States Patent [19]

Carpenter et al.

[11] Patent Number: 5,754,174
[45] Date of Patent: May 19, 1998

[54] USER INTERFACE WITH INDIVIDUALLY CONFIGURABLE PANEL INTERFACES FOR USE IN A COMPUTER SYSTEM

[75] Inventors: Claudia Carpenter, Sunnyvale; George A. Hansen, Walnut Creek; Beatrice M. Y. Lam; Lawrence Lozares, both of Sunnyvale; Krisztina Mako, Santa Barbara; Paul A. Mernyk, Palo Alto; Robert Chris Robnett, San Jose, all of Calif.

[73] Assignee: Starfish Software, Inc., Scotts Valley, Calif.

[21] Appl. No.: 743,053

[22] Filed: Nov. 4, 1996

Related U.S. Application Data

[63] Continuation of Ser. No. 79,720, Jun. 18, 1993, abandoned, which is a continuation-in-part of Ser. No. 936,692, Aug. 27, 1992, abandoned.

[51] Int. Cl.$^6$ ............................................. G06F 17/60
[52] U.S. Cl. ............................................. 345/334
[58] Field of Search ................................. 395/339–358; 345/333–335, 339–354

[56] References Cited

U.S. PATENT DOCUMENTS

| | | | |
|---|---|---|---|
| 5,276,816 | 1/1994 | Cavandish et al. | 345/348 |
| 5,287,447 | 2/1994 | Miller et al. | 345/342 |
| 5,287,514 | 2/1994 | Gram | 345/333 |
| 5,333,252 | 7/1994 | Brewer, III et al. | 707/506 |
| 5,339,390 | 8/1994 | Robertson et al. | 345/342 |
| 5,339,391 | 8/1994 | Wroblewski et al. | 345/341 |
| 5,347,628 | 9/1994 | Brewer et al. | 345/351 |
| 5,349,658 | 9/1994 | O'Rourke et al. | 345/349 |

OTHER PUBLICATIONS

Amish Software, Amish System Utilities for Windows, Nov. 5, 1991, including disk label, directory listing, contents of files Product.TXT and Readme.TXT.

hDC Computer Corporation, hDC Power Launcher User's Guide, 1991, pp. 32–35, 74–76.

Microsoft, Windows 3.0 User Guide, 1990, pp. 15–57, 79–98, 145–157, 560–561.

Webster, The Next Book, 1989, pp. 112–113, 118–139, 162–205, 286–319.

Screen Prints from Microsoft Windows 3.1, Program.INI, Clock.INI.

Amish Utilities User's Guide, Amish Software, Inc., 541 Cowper Street, Suite A, Palo Alto, CA 94301, 1992, pp. 19–24.

WinMaster User's Guide, PC–Kwik Corporation,15100 SW Koll Parkway, Beaverton, OR 97006, pp. 28–49.

Rooms for Windows from XSoft User Guide, Xerox Corporation, 3400 Hillview Avenue, Palo Alto, California 94303, Mar. 1, 1992, pp. 18–42.

Wide Angle, Attitash Software, Inc., 20 Trafalgar Square, Nashua, New Hampshire 03063, pp. 3–1–4–13.

Using Norton Desktop for Windows, Symantec, pp. 18–3—18–7.

HOTWin Version 2.0A, Abacist Software Company, 1992, pp. 4–1—5–1.

*Primary Examiner*—Anton Fetting
*Attorney, Agent, or Firm*—John A. Smart

[57] ABSTRACT

A user interface has a main module and a plurality of panel modules. The main module presents the user interface on the display screen to a user. The plurality of panel modules are in communication with the main module. Each panel module presents a panel interface on the display screen to the user. Each panel module is individually configurable and each panel is configurable as part of the user interface presented by the main module.

18 Claims, 63 Drawing Sheets

Microfiche Appendix Included
(10 Microfiche, 591 Pages)

USER INTERFACE WITH INDIVIDUALLY CONFIGURABLE PANEL INTERFACES FOR USE IN A COMPUTER SYSTEM

CROSS REFERENCE TO RELATED APPLICATION

The present application is a continuation of application Ser. No. 08/079,720, filed Jun. 18, 1993, now abandoned, which is a continuation in part of application Ser. No. 07/936,692, filed Aug. 27, 1992, now abandoned.

Reference to a Microfiche Appendix

A microfiche Appendix B includes various code segments utilized in the preferred embodiment of the present invention. Appendix B includes 10 microfiche sheets and a total of 591 frames.

BACKGROUND

The present invention concerns a user interface with individually configurable panel interfaces for use in a computer system.

In a computer systems such as personal computers, there is a continual search to provide a user simple and intuitive interfaces to computer applications and resources. For example, many personal computers use the Microsoft Windows operating system, available from Microsoft Corporation having a business address of One Microsoft Way, Redmond, Washington 98052.

Various utilities have been designed to run with the Microsoft Windows operating system. These include, for example, Amish Utilities available from Amish Software, Inc., having a business address of 541 Cowper Street, Suite A, Palo Alto, CA 94301, the KwikInfo utility available from PC-Kwik Corporation having a business address of 15100 SW Koll Parkway, Beaverton, OR 97006, the Power-Launcher utility available from hDC Computer Corporation, having a business address of 6742 185th Ave NE, Redmond Washington 98052, the SideBar utility available from Paper Software, Inc., having a business address of P.O. Box 567 New Paltz, New York 12561, the Rooms for Windows utility available from Xerox Corporation, XSoft Production Education, having a business address of 3400 Hillview Avenue, Palo Alto, California 94303, the Wide Angle utility available from Attitash, having a business address of 20 Trafalgar Square, Nashua, New Hampshire 03063, the Squeegee utility available from ICOM Simulations, Inc., having a business address of 648, S. Wheeling Road, Wheeling, Illinois 60090, the SYSTEM INFO utility available from Symantec, as part of the Norton Desktop for Windows, and the Gallery View utility available from Abacist Software Company. The above described utilities variously implement functionality for launching programs, printing, viewing screens and showing virtual screens.

SUMMARY OF THE INVENTION

In accordance with the preferred embodiment of the present invention, a user interface is presented. The user interface has a main module and a plurality of panel modules. The main module presents the user interface on the display screen to a user. The plurality of panel modules are in communication with the main module. Each panel module presents a panel interface on the display screen to the user. Each panel module is individually configurable and each panel module is configurable as part of the user interface presented by the main module.

In the preferred embodiment panel interfaces are displayed across a computer screen. A first panel interface from the plurality of panel interfaces has a plurality of columns of software buttons. A listing for each of the first plurality of panel interfaces is displayed in a configuration menu. An order of the listings determines an order of the display of panel interfaces on the computer screen. Upon a user changing the order of the listings, the order of the display of panel interfaces on the computer screen is correspondingly changed. Upon a user marking a listing for a panel interface as not shown, display of the panel interface on computer screen is ceased.

In one panel interface a plurality of software buttons is provided. Each software button represents one of a plurality of applications. Upon a user selecting a first software button, a first application represented by the first software button is started. Upon a user selecting and dragging a visual representation of a second application to the panel interface, a new software button representing the second application is added to the panel interface. Upon a user selecting a different software button size in a configuration menu, the size of each software button in the plurality of software buttons is changed. The plurality of applications are listed in a configuration menu. The order in which the plurality of software buttons is displayed on the panel interface reflects the order of the listing of the plurality of applications. Upon a user changing the order of the listing of the plurality of applications, the order in which the plurality of software buttons is displayed on the panel interface is changed.

In another panel interface, a plurality of mini-program windows is displayed. Each mini-program window has a first background pattern. Each mini-program window represents a virtual computing screen. Mini-windows shown in the mini-program windows each represent an application window displayed in the represented virtual computing screen. An associated software button is displayed adjacent to each mini-program window. A first miniwindow which is greater than a pre-selected size includes a first icon which identifies a first application which controls a first application window represented by the first mini-window. Upon a user selecting a first miniprogram window, a first virtual computing screen is displayed which is represented by the mini-program window additionally, it is indicated to the user that the first virtual screen is selected. The user selects the first mini-program Hewlett window by selecting an associated software button for the first miniprogram window. Upon the user selecting a second background pattern from a configuration menu, the display of mini-program windows is changed so that each mini-program window has the second background pattern.

In another panel interface, a clock is displayed on a panel interface in a computer screen. A user accesses preferences configuration for the clock. Upon the user selecting a digital clock face, a digital clock face for the clock is displayed. Upon the user selecting an analog clock face, an analog clock face for the clock is displayed. Upon the user selecting a first analog clock face style, the first analog clock face style for the clock is displayed. Upon the user selecting a second analog clock face style, the second analog clock face style for the clock is displayed. Upon the user selecting a first color, the digital clock face is displayed using the first color. Upon the user selecting a second color, the digital clock face is displayed using the second color.

In another panel interface, a first gauge is displayed on a panel interface. The first gauge indicates an amount of resources available to a user of the computing system. Also displayed on the panel interface is an indication of the unused memory available to the user. Upon the amount of resources available to the user becoming less than a first preselected amount, a warning is given to the user. Upon the amount of unused memory available to the user becoming less than a second preselected amount, a warning is given to the user.

In another panel interface, a printer icon and a printer indicator button are displayed for each printer for which the computing system is configured. Upon selection of the printer icon for a first printer, a label describing the first printer is displayed. Upon selection of the printer indicator button for the first printer, designating the first printer as a default printer for the computing system. For example, this includes placing an indication within the printer indicator button that the first printer is the default printer. Upon a user double selecting the printer icon for the first printer, a configuration window for the first printer is displayed. A first image of a sheet of paper is displayed within a first printer icon for a first printer. The sheet of paper is oriented in a landscape orientation when the printer is configured to be in a landscape mode and the sheet of paper is oriented in a portrait orientation when the printer is configured to be in a portrait mode. Upon a user configuring the first printer from the landscape mode to the portrait mode, the display of the first image of the sheet of paper is changed from being oriented in the landscape orientation to being oriented in the portrait orientation. Upon the user configuring the first printer from the portrait mode to the landscape mode, changing the display of the first image of the sheet of paper from being oriented in the portrait orientation to being oriented in the landscape orientation.

DESCRIPTION OF THE PREFERRED EMBODIMENTS

Figure 1:
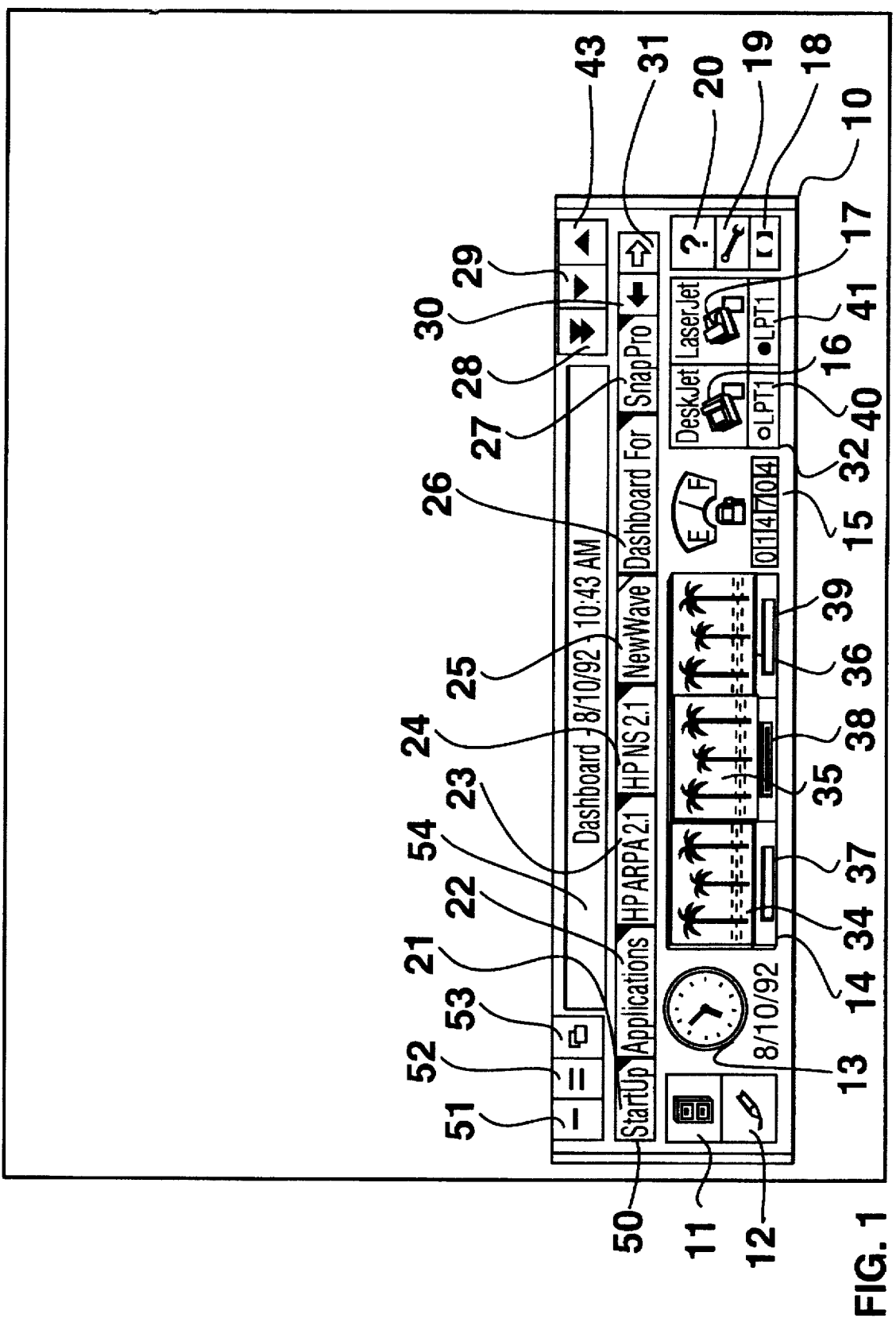
FIG. 1 shows a dashboard interface, in accordance with the preferred embodiment of the present invention.

FIG. 1 shows a graphic representation of an interface in accordance with the preferred embodiment of present invention. A computer "dashboard" interface 10 is placed on a computer screen, for example, in an unused region near the bottom of the screen. In the preferred embodiment, the default position of dashboard interface 10 can be anywhere on the computer screen.

As shown in FIG. 1, dashboard interface 10 includes a quick launch button 11, a quick launch button 12, an alarm clock 13, an extended screens display 14, a resource icon 15, a printer manager 32, an about button 18, a customize button 19, a help button 20, a maximize button 43, a minimize button 29, a show/hide program menu button 28, a title bar 54, a system menu button 51, a task menu button 52, a layout menu button 53 and program menu 50. Printer manager 32 includes a first printer icon 16 and a second printer icon 17, a first default printer indicator button 40 and a second default printer indicator button 41. Selection of the default printer indicator button under a printer icon results in that printer becoming the default printer. A area within the default printer indicator button for the selected default printer is highlighted indicating the default printer to the computer user.

Extended screens display 14 includes a mini-program window 34, a mini-program window 35, a mini-program window 36, a selection bar 37, a selection bar 38 and a selection bar 39. Program menu 50 includes a program group button 21, a program group button 22, a program group button 23, a program group button 24, a program group button 25, a program group button 26 and a program group button 27. A shift button 30 is used to shift group tabs in program menu 50 to the left. A shift button 31 is used to shift group tabs in program menu 50 to the right.

A program from program menu 50 may be launched by first selecting the program group button. All of the programs within that group will then be displayed. A listed program may then be selected to run. Also, the group window may be opened to display all programs as icons.

Figure 2:
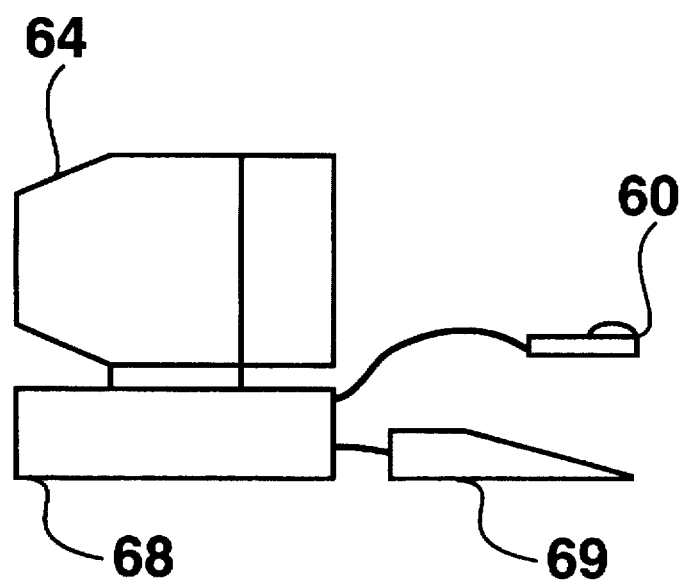
FIG. 2 shows a computing system which runs the dashboard interface shown in FIG. 1, in accordance with the preferred embodiment of the present invention.
Figure 3:
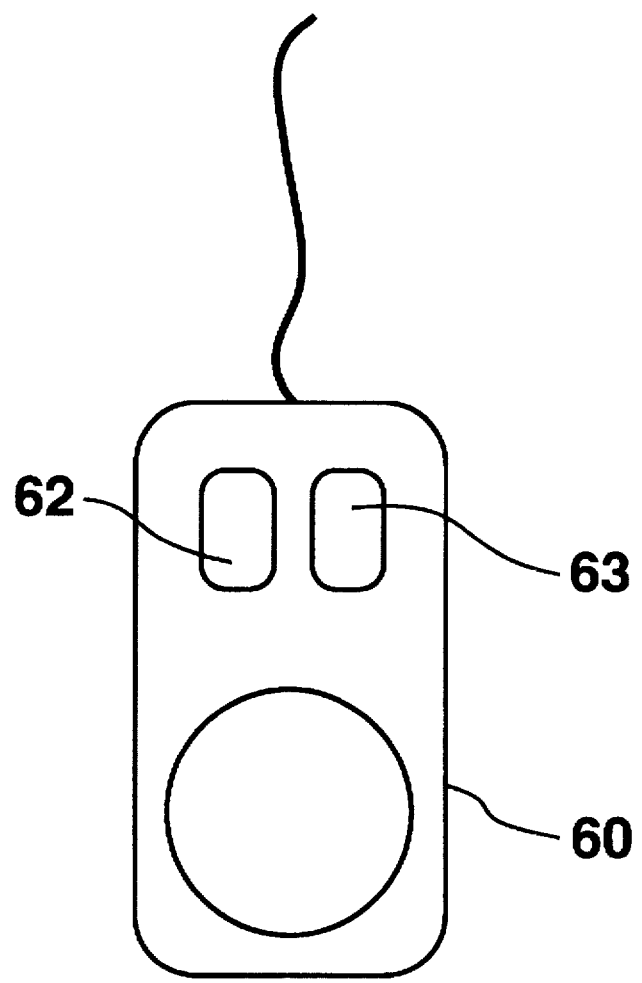
FIG. 3 shows a mouse utilized in the computing system shown in FIG. 2, in accordance with the preferred embodiment of the present invention.

FIG. 2 shows a block diagram of a computer system which generates and displays dashboard interface 10. A computer 68 controls a monitor 64. A keyboard 69 and a mouse 60 are utilized to interface with the computer system. FIG. 3 shows mouse 60 to include a button 62 and a button 63.

Using mouse 60, a cursor 56 may be placed over customize button 19. Upon clicking button 62, a customize window 71, shown in FIG. 4, appears. Additionally, a mini-window 70 appears in mini-program window 35 of extended screen display 14. Because customize window 71 is currently the active window, mini-window 70 is highlighted.

Figure 4:
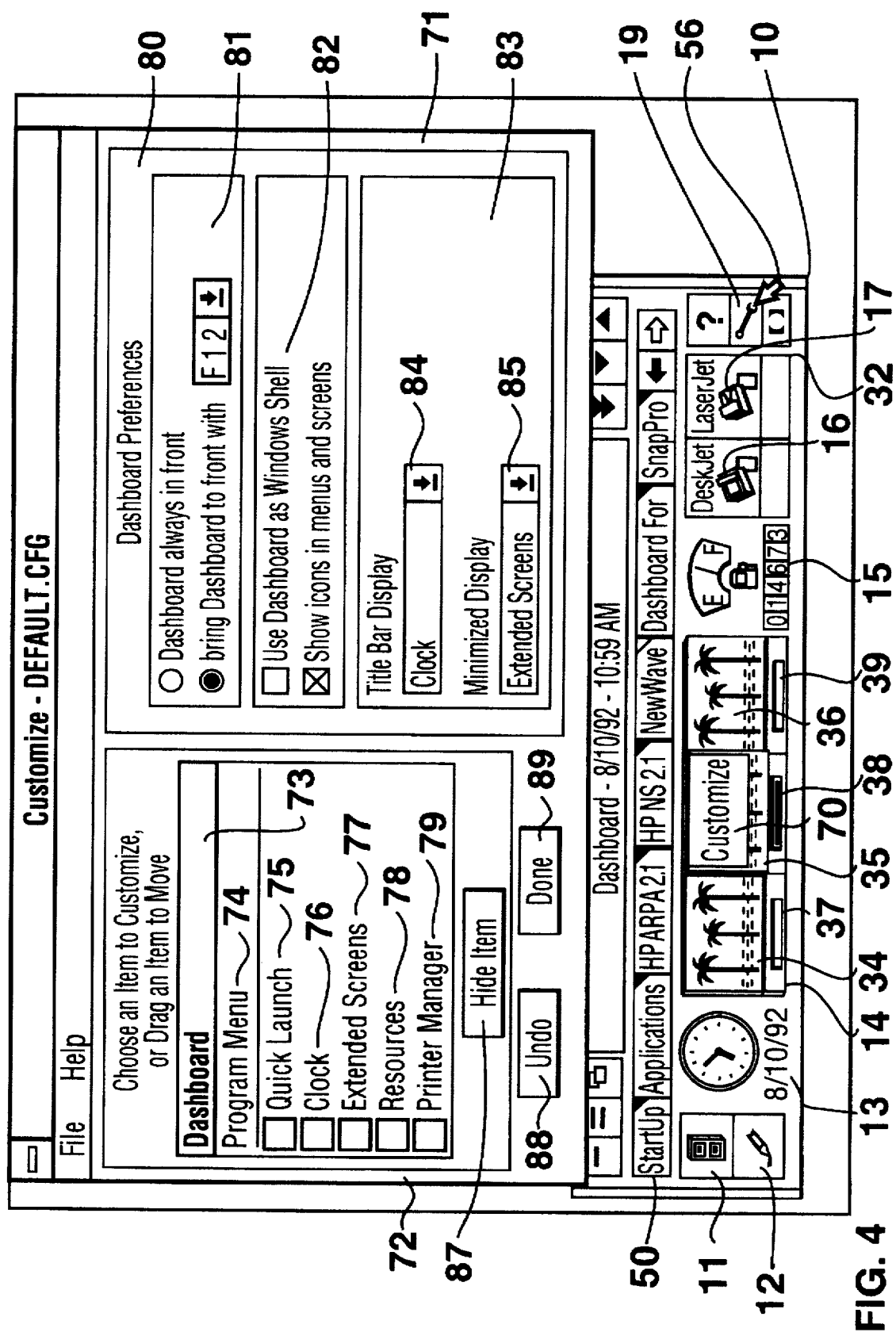
FIGS. 4 through 57 show computer screens which show implementation of a dashboard interface in accordance with the preferred embodiment of the present invention.

Within customize window 71, customize menu 72 lists items within dashboard interface 10. These include a listing 73 for dashboard interface 10, a listing 74 for the program menu, a listing 75 for Quick launch, a listing 76 for alarm clock 13, a listing 77 for extended screens display 14, a listing 78 for resource gauge 15 and a listing 79 for printer manager 32. Also shown are a hide/show button 87, an undo button 88 and a done button 89. In FIG. 4, dashboard listing 73 is highlighted. Therefore, a dashboard preferences window 80 is shown. Within dashboard preference window 80, a box 81 is used to select whether dashboard interface 10 is always at the front of the display. A box 82 is used to select whether dashboard interface 10 is run as a Windows shell or whether icons are shown in menus and screens. A selection box 84 is used to select whether the title bar displays a clock or whether a standard display is used. A selection box 85 is used to select whether the minimized display of dashboard interface 10 is a standard icon, a clock icon or an extended screens icon.

Figure 5:
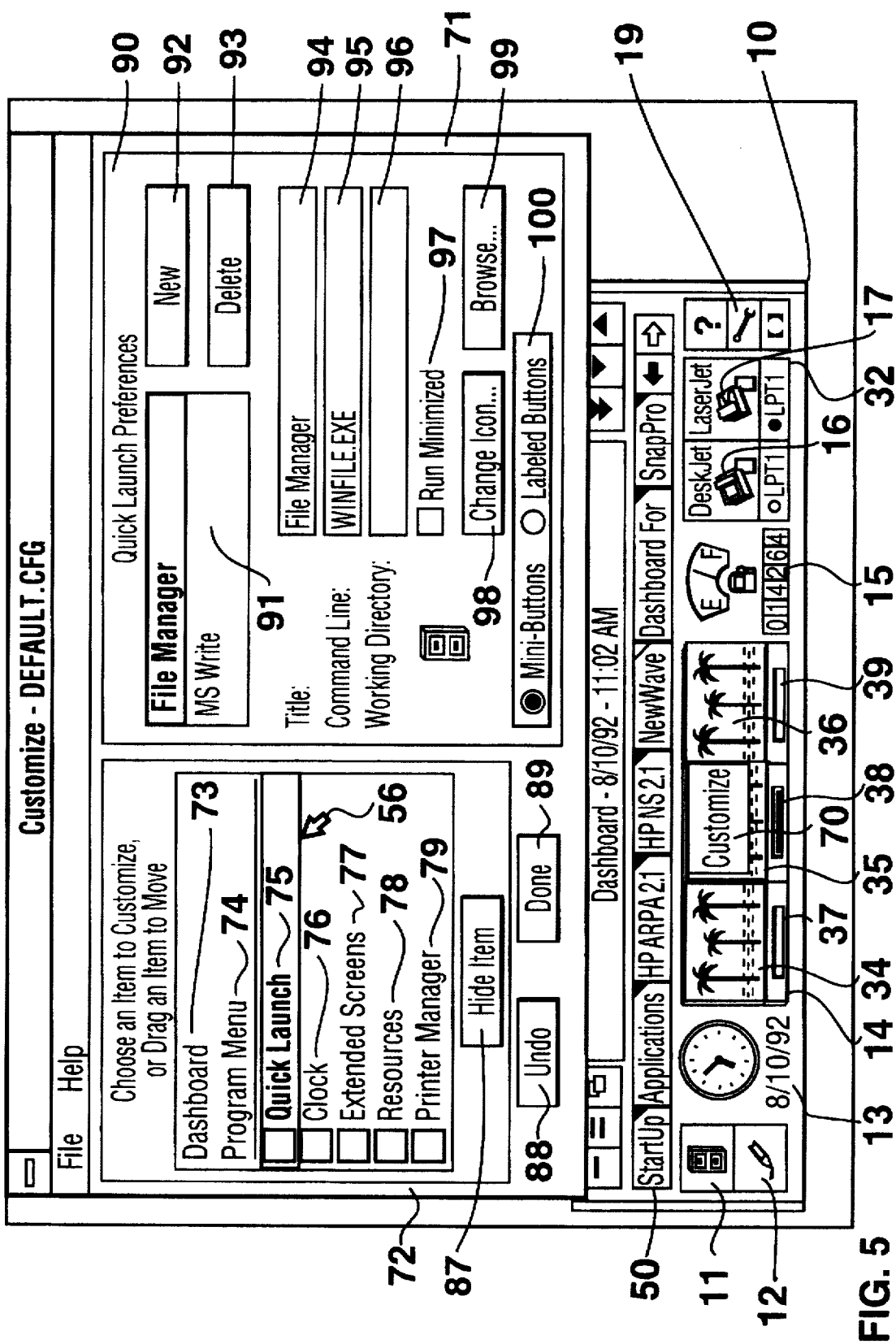

In FIG. 5, a quick launch preferences window 90 was accessed by a user placing cursor 56 over quick launch listing 75 and clicking mouse button 62. In quick launch preferences window 90, an application listing 91 shows applications for which there is a quick launch button. Currently, these include a File Manager application and an MS Write program. The highlighting of the File Manager Application indicates that this is the currently selected application. A button 92 may be used to add new quick launch buttons to dashboard interface 10. A button 93 is used to delete programs from dashboard interface 10. A title bar 94 lists the title of the application selected in application listing 91. A command line 95 lists a command line for the application selected in application listing 91. A working directory line 96 indicates a working directory for the application selected in application listing 91. Selecting a run minimized box 97 causes the application selected in application listing 91 to be launched in minimized form. A change icon button 98 allows the icon shown in the quick launch button in dashboard interface 10 for the application selected in application listing 91 to be changed. A browse button 99 allows browsing of file directories. A box 100 allows a user to select whether to display quick launch buttons as minibuttons or as labeled buttons.

Figure 6:
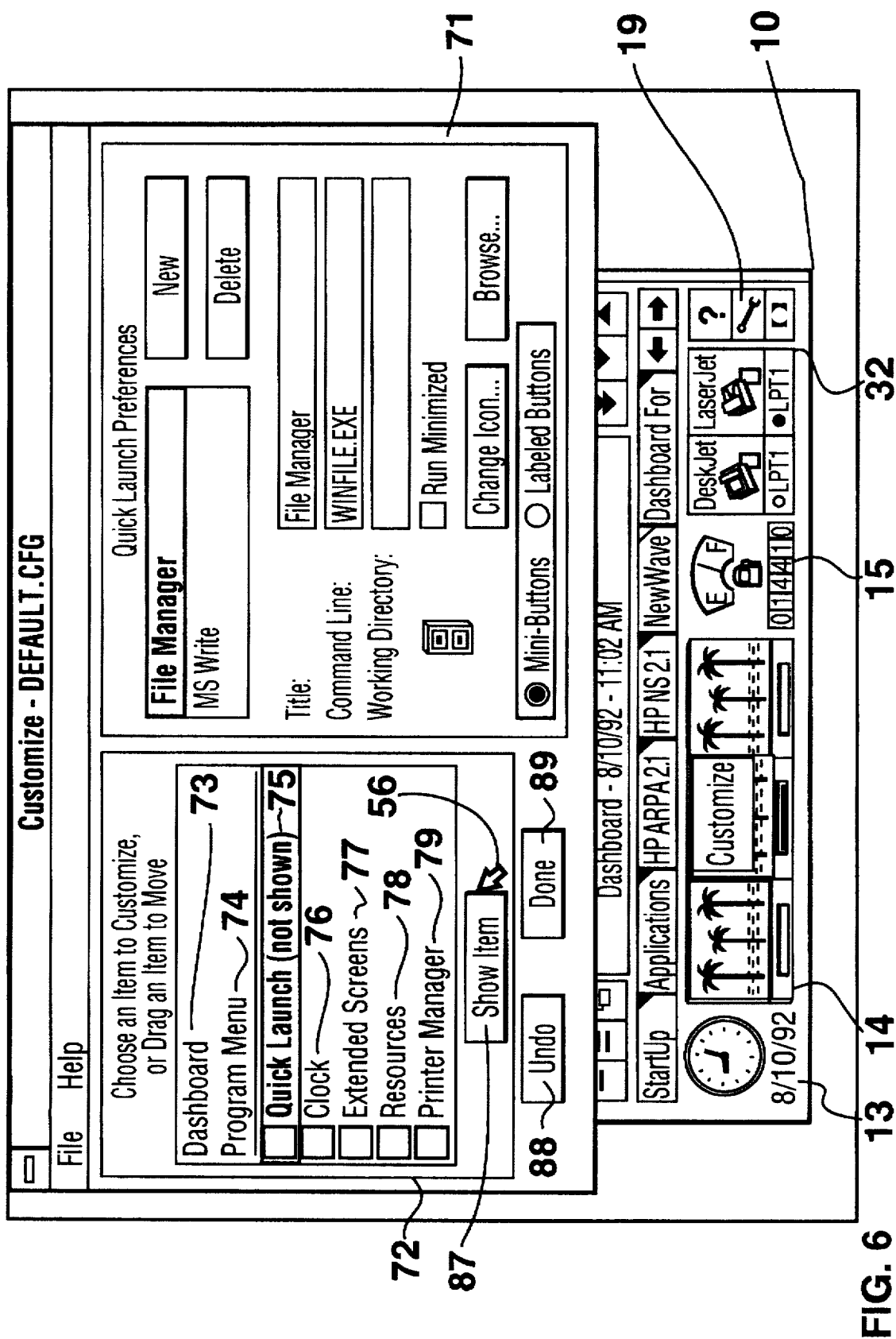
Figure 7:
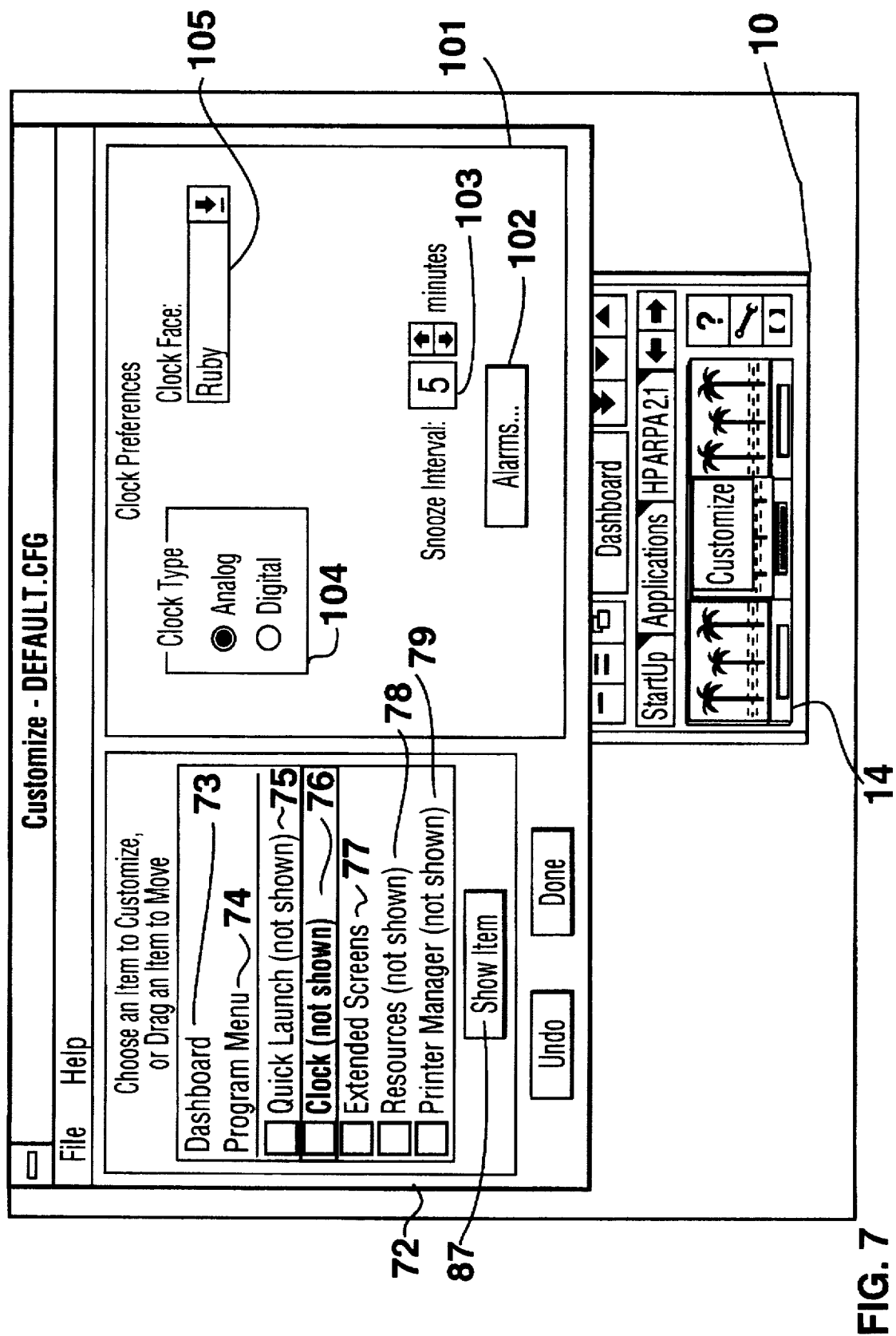

In FIG. 6, a user has placed cursor 56 over hide/show item button 87. After clicking mouse button 62, quick launch listing 75 is marked as "not shown". The result is that quick launch button 11 and quick launch button 12 are removed from dashboard interface 10. In FIG. 7, the user has additionally hidden alarm clock 13, resource gauge 15 and printer manager 32. In FIG. 7, clock listing 76 is selected. This has resulted in a clock preferences window 101 being shown. In clock preferences window 101, a clock type box 104 allows selection of an analog or a digital display clock. A clock face box 105 allows selection of a particular clock face. A box 10 allows selection of an alarm snooze interval. An alarms button 102 is used to summon an alarm dialog box.

Figure 8:
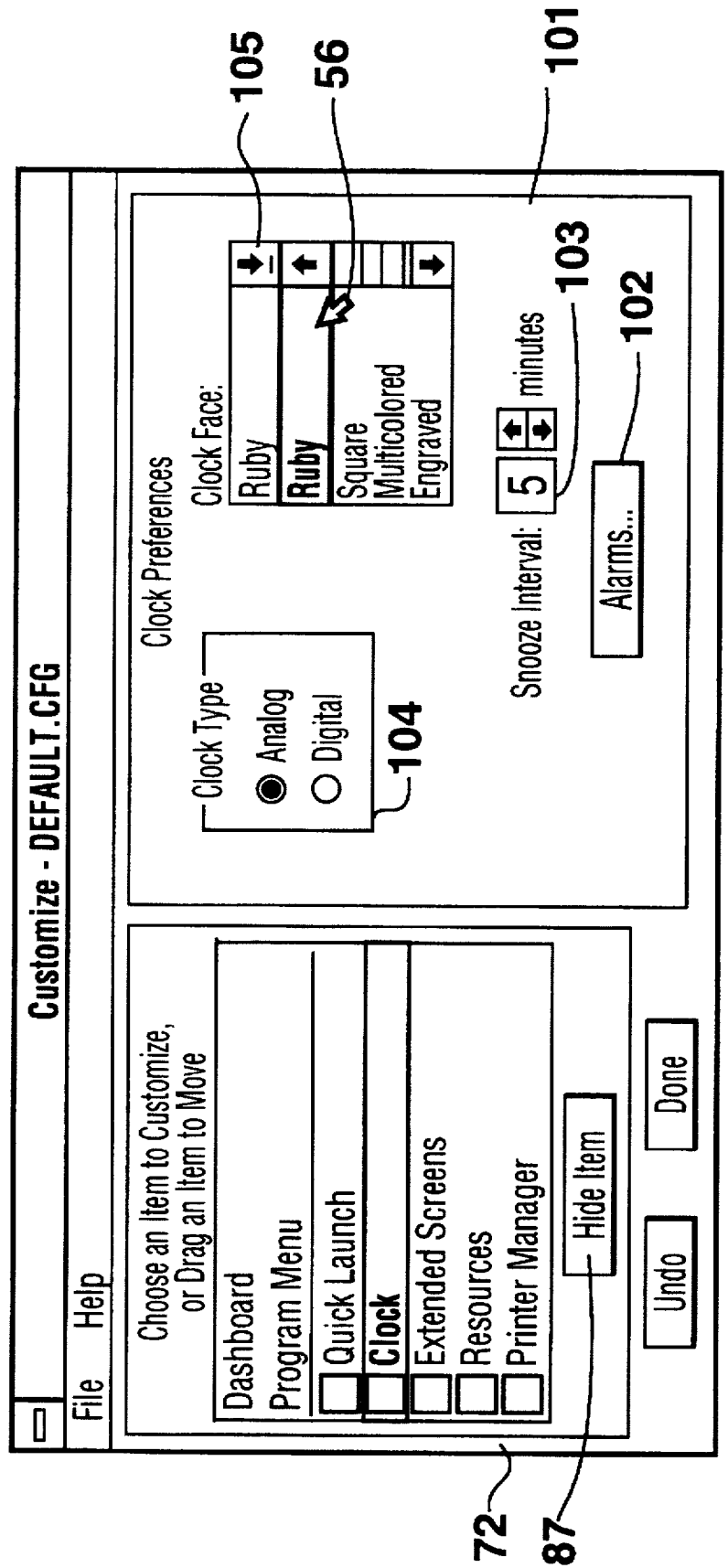

In FIG. 8, hide/show button 87 has been used so that dashboard 10 will display all the items. In addition, the various available analog clock types have been listed by placing cursor 56 over clock face box 105 and clicking mouse button 62.

Figure 9:
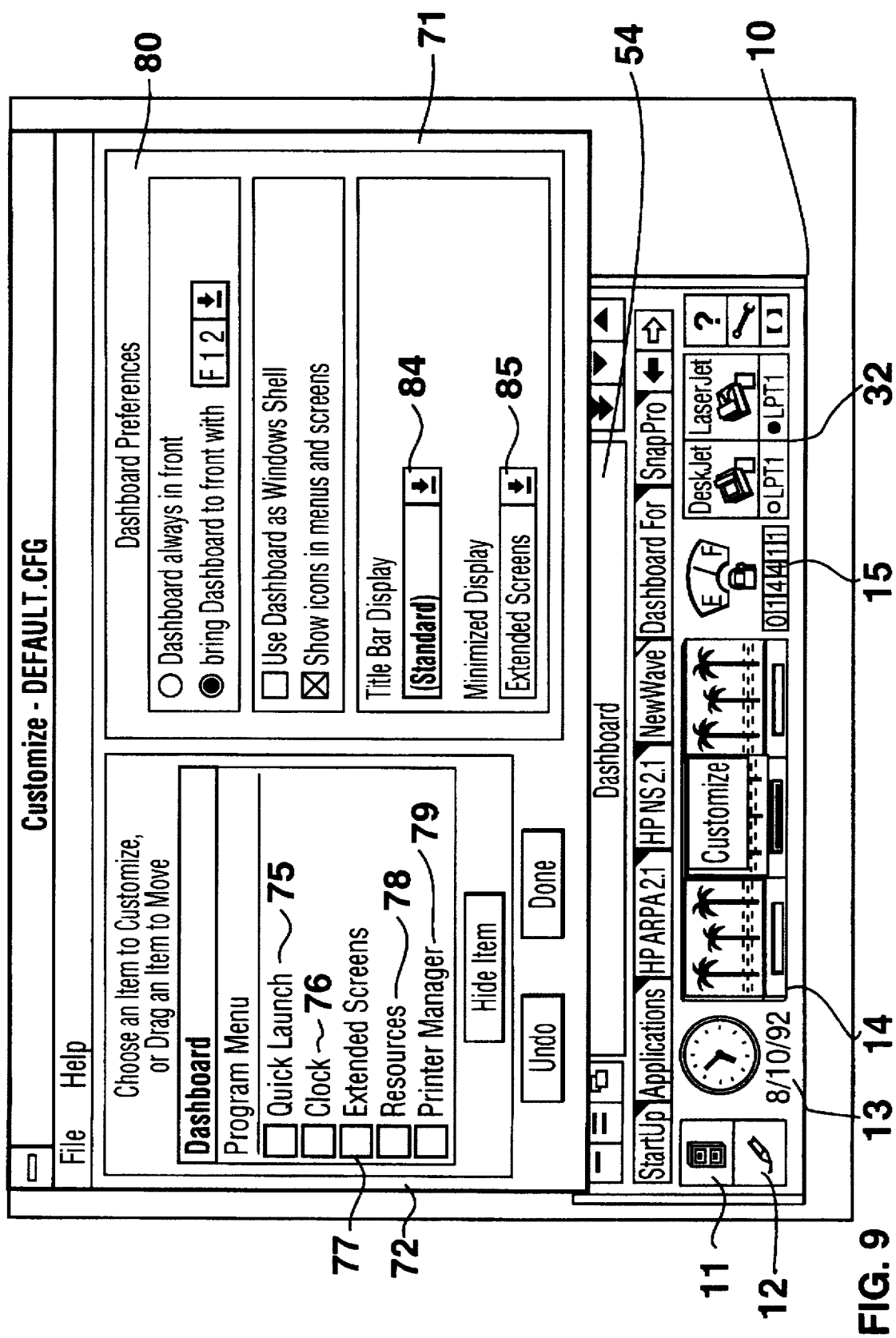

In FIG. 9, a different clock face is shown displayed in dashboard interface 10. Additionally, title bar 54 of dashboard interface 10 no longer shows the time and date. This is because selection box 84 was used to select the "standard" title bar display.

The order in which items are listed in customize menu 72, from top to bottom, determines the order in which they are displayed in dashboard interface 10, from left to right. The items displayed in dashboard 10 may be arranged by placing cursor 56 over a listing in customize menu 72, depressing mouse button 62, dragging the listing to a new position, and releasing mouse button 62.

Figure 10:
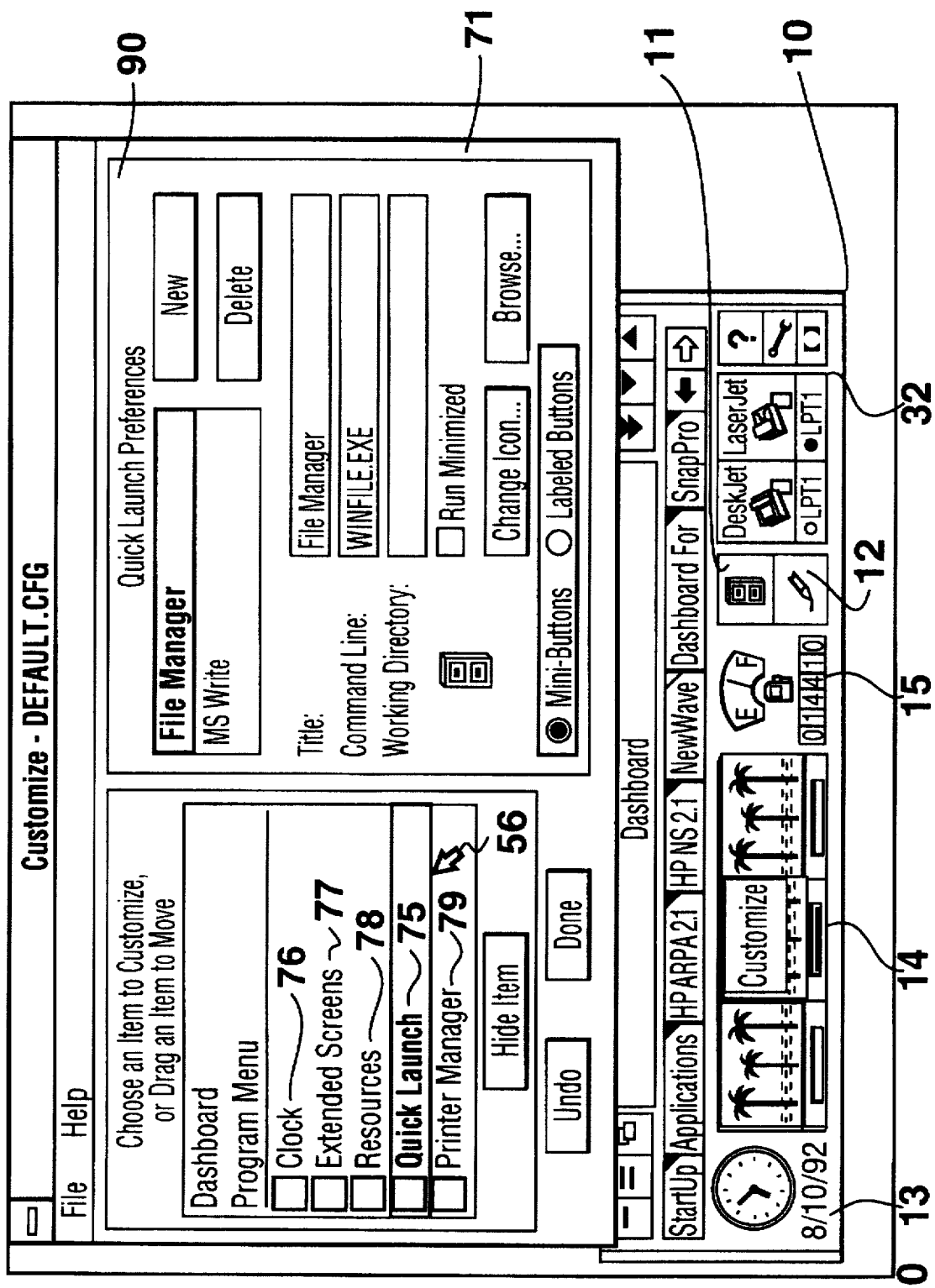

For example, in FIG. 10, quick launch listing 75 has been moved to follow resources listing 78. The result, as seen in dashboard interface 10, is that quick launch button 11 and quick launch button 12 are now displayed to the right of resource gauge 15.

Figure 11:
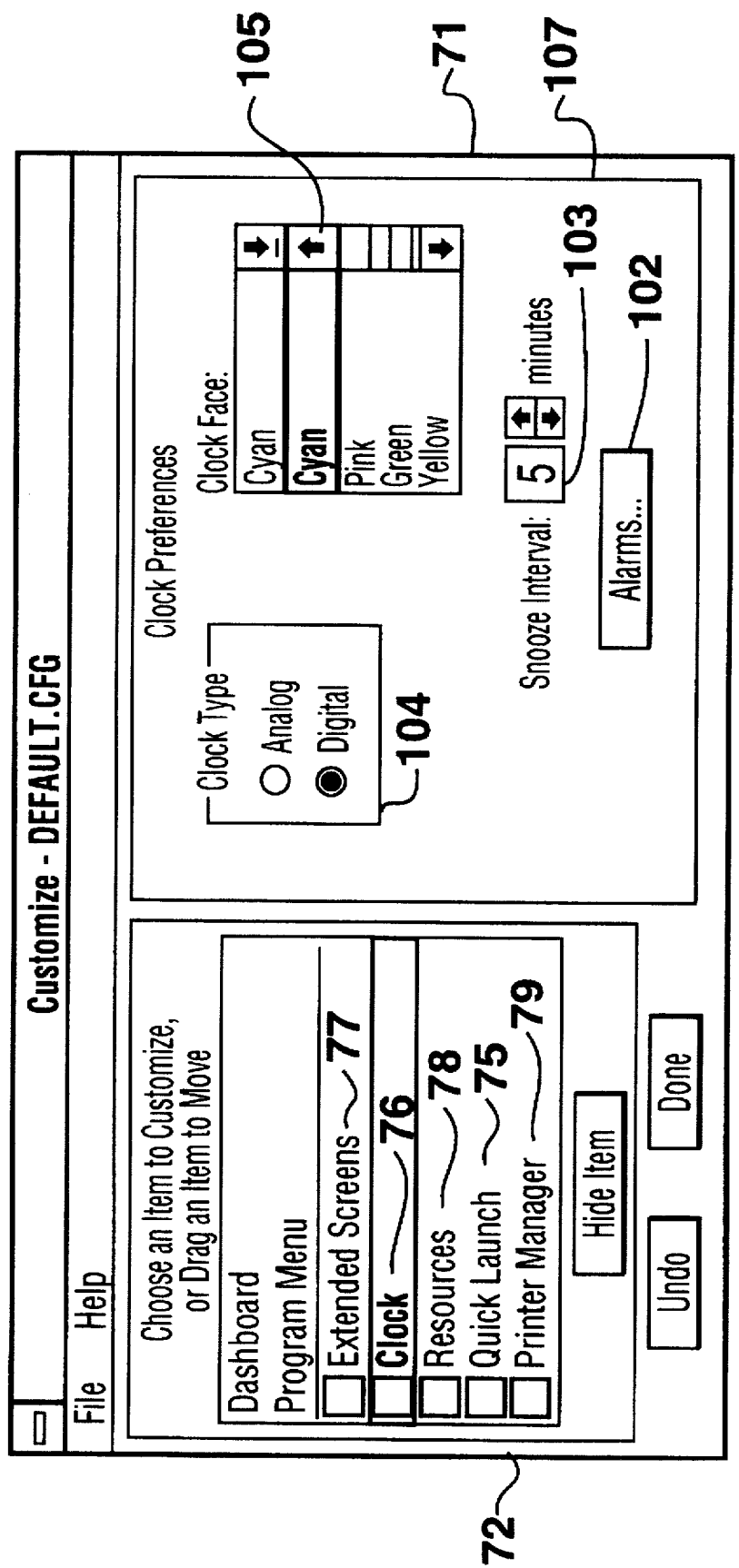
Figure 12:
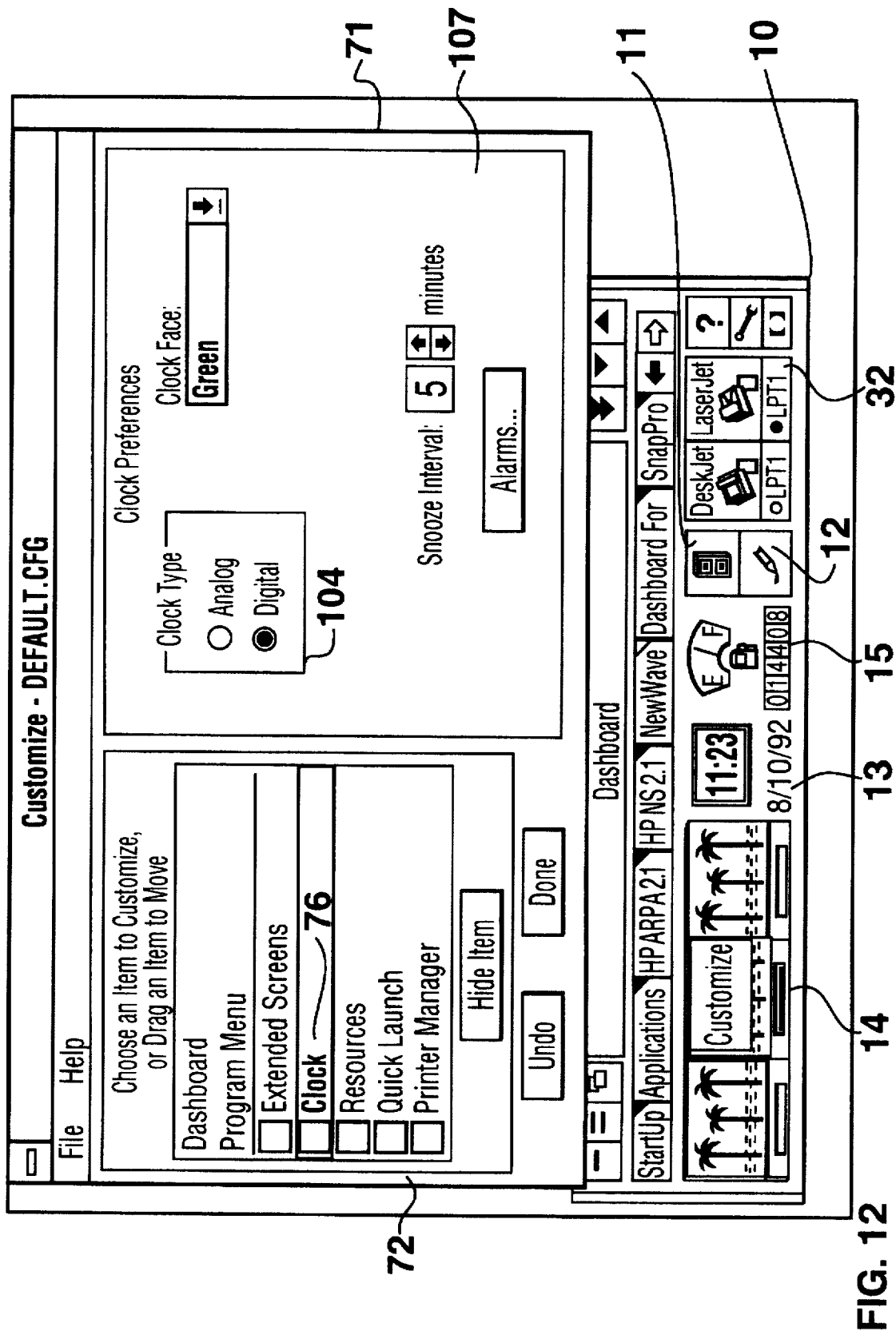

In FIG. 11, clock listing 76 has been moved to follow extended screens listing 77. The result, as seen FIG. 12, is that clock display 13 is now displayed to the right or resource gauge 15.

Also in FIG. 11, various available digital clock colors have been listed by utilizing clock type box 104 to select a digital clock, placing cursor 56 over clock face box 105 and clicking mouse button 62. In FIG. 12, a digital clock face is shown displayed in dashboard interface 10.

Figure 13:
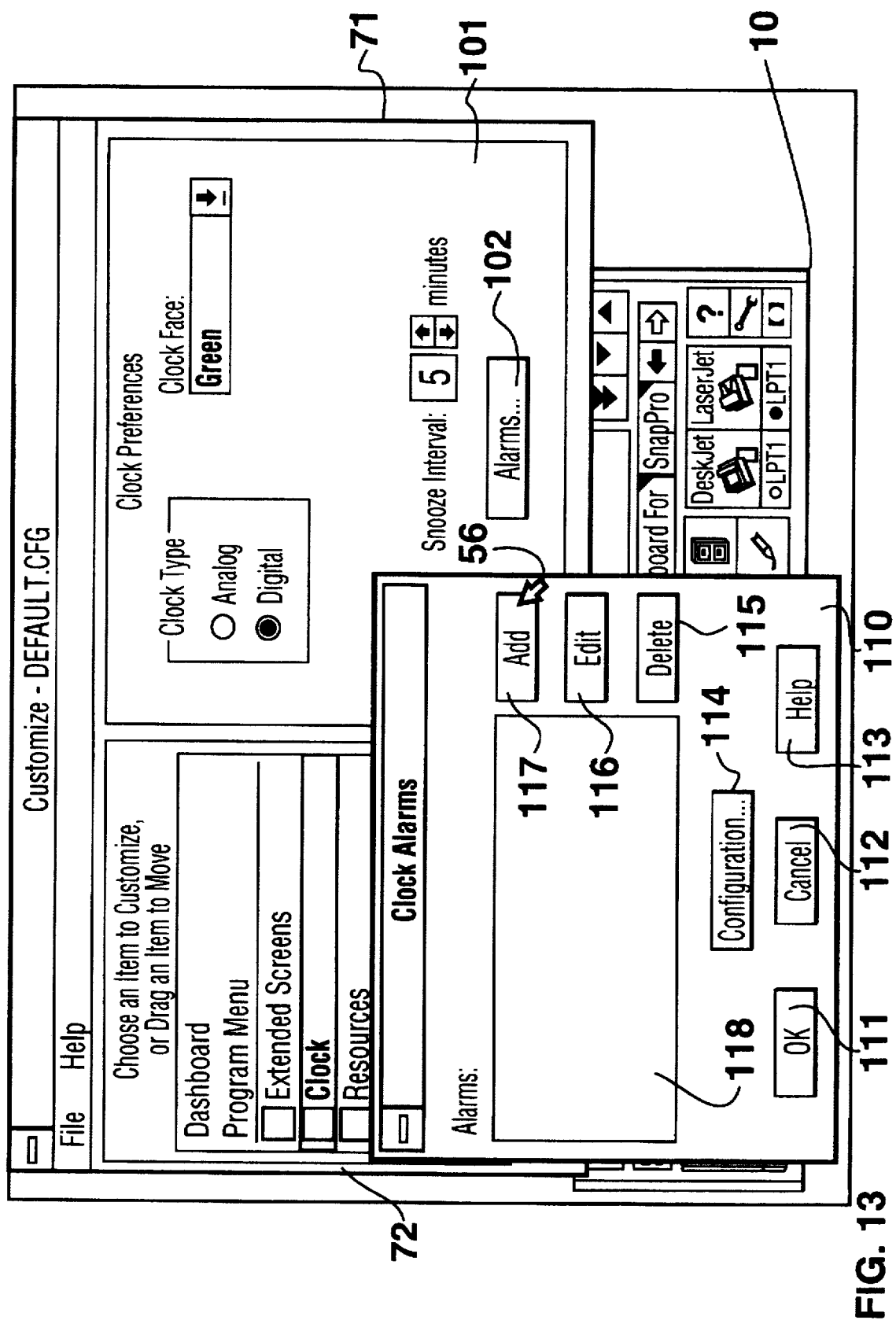

Placing cursor 56 over alarms button 102 and depressing button 62 results in the appearance of clock alarms window 110, as shown in FIG. 13. Clock alarms window 110 can also be brought up by placing cursor 56 over clock display 13 and in quick succession clicking button 62. Clock alarms window 110 includes a listing of current selected alarms 118. An add button 117 is used to add alarms. An edit button 116 is used to edit existing alarms. A delete button 115 is used to delete alarms. A configuration button 114 is used to bring up clock preferences window 101. Clock alarms window 110 also includes an OK button 111, a cancel button 112 and a Help button 113.

Figure 14:
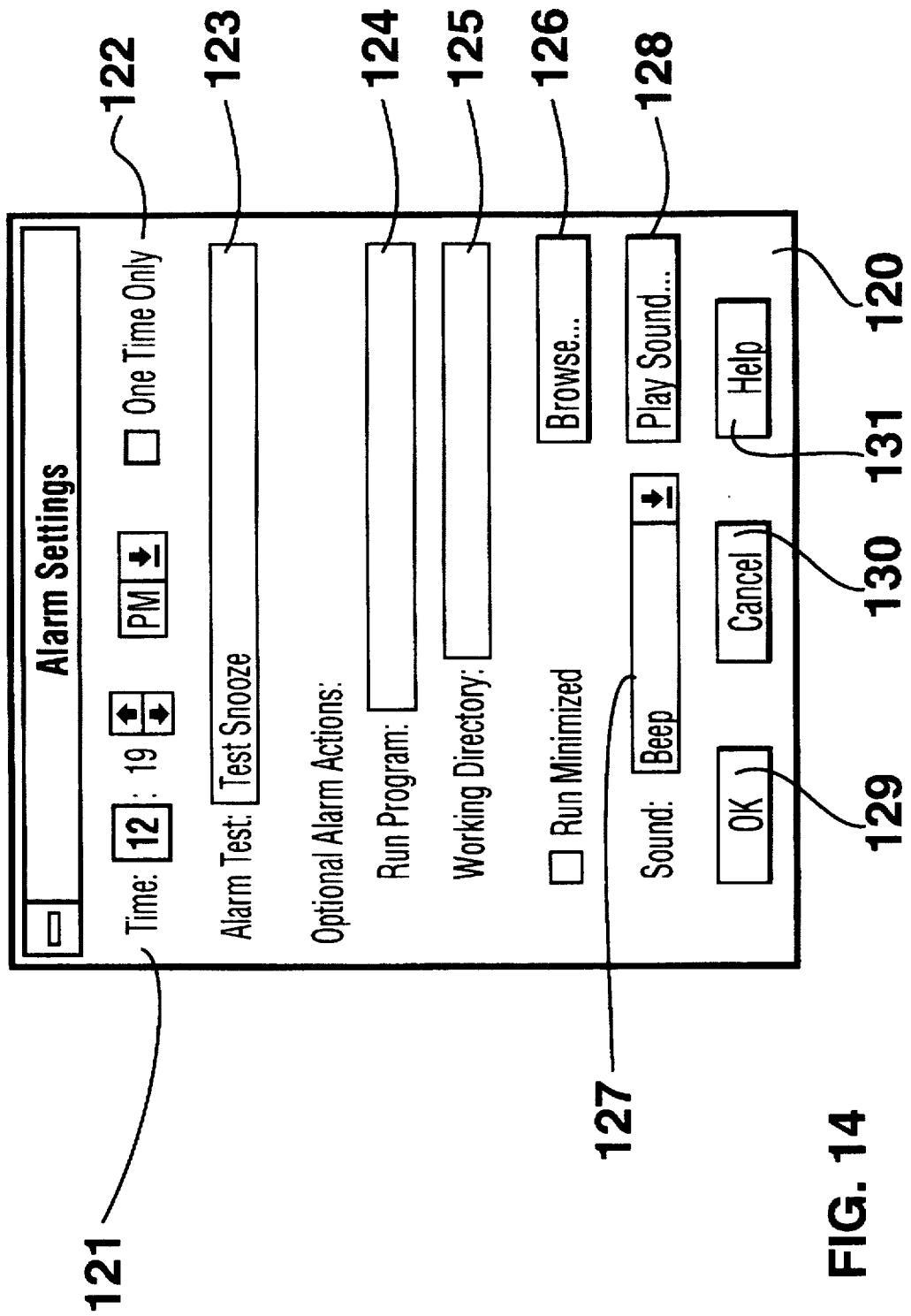
Figure 15:
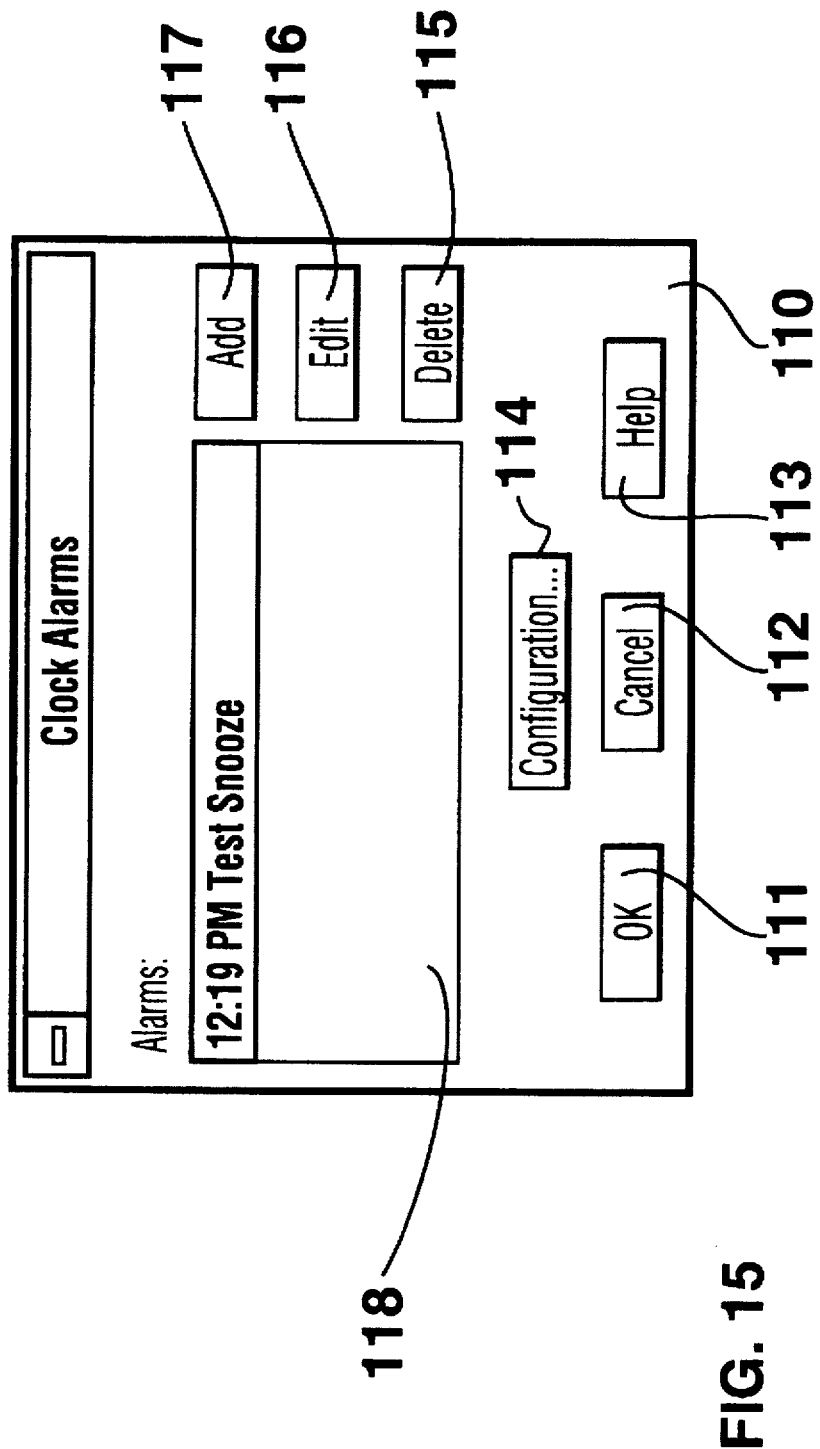

Upon selection of add button 117 using cursor 56 and mouse button 62, an alarm settings window 120 appears, as shown in FIG. 14. The alarm time is set using an time set regions 121. If the alarm is only to go off one time, box 122 is selected. An alarm text is typed into box 123. The user has typed "Test Snooze" into box 123 by the user. A run program box 124 may be used to type in a program execution file to be started upon the alarm being called. A working directory for the program may be listed in box 125. A browse button may be selected to browse the file directories. Various sounds for the alarm may be selected using box 127. Play sound button 128 may be used to play back the selected sound. Alarm settings window 120 also includes an OK button 129, a cancel button 130 and a help button 131. Upon selecting the OK button, "Test Snooze" is now added to listing 118, as shown in FIG. 15. The listing shows 12:19 PM as the alarm set time. Also an alarm mini-window 136 appears in mini-program window 35.

Figure 16:
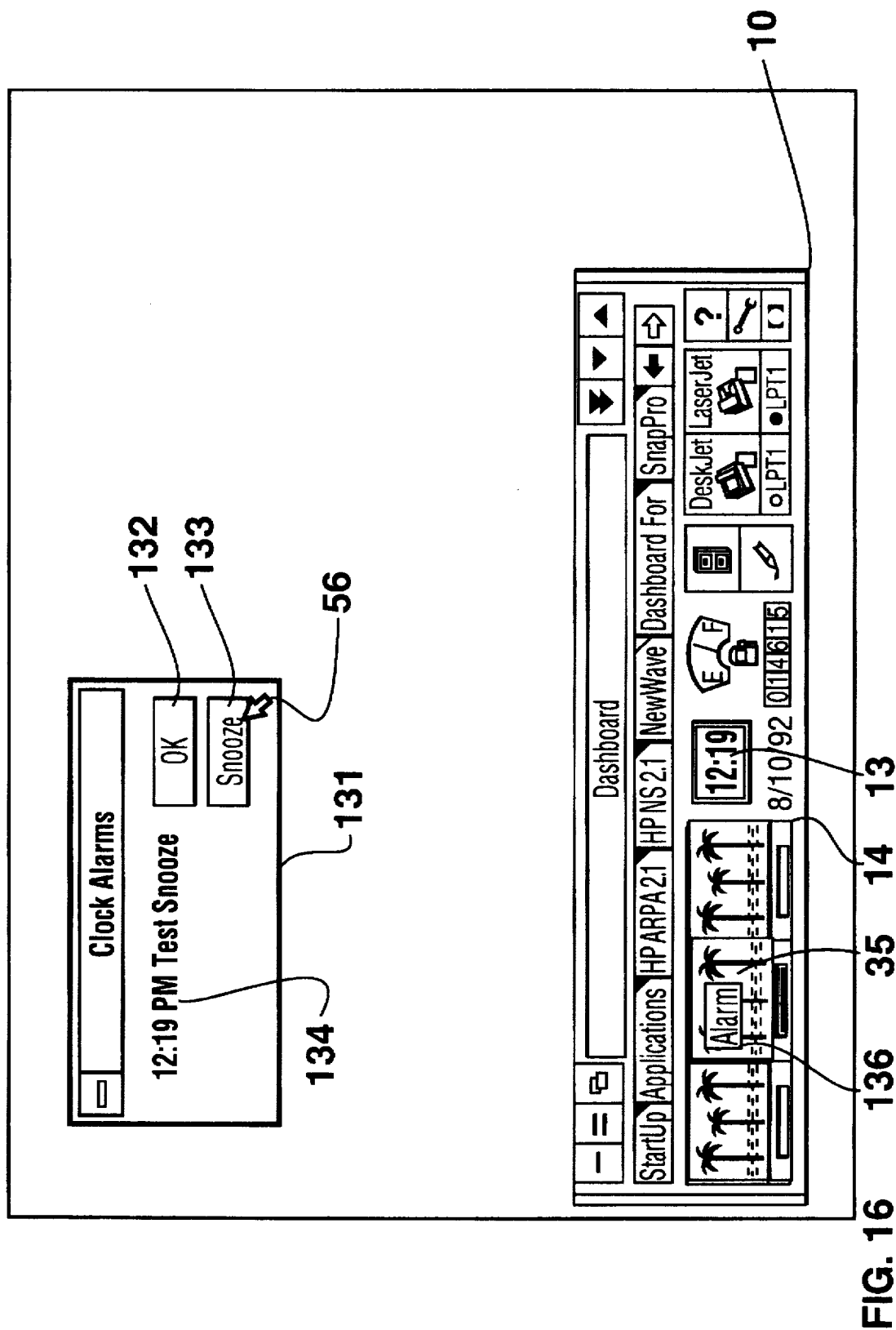
Figure 17:
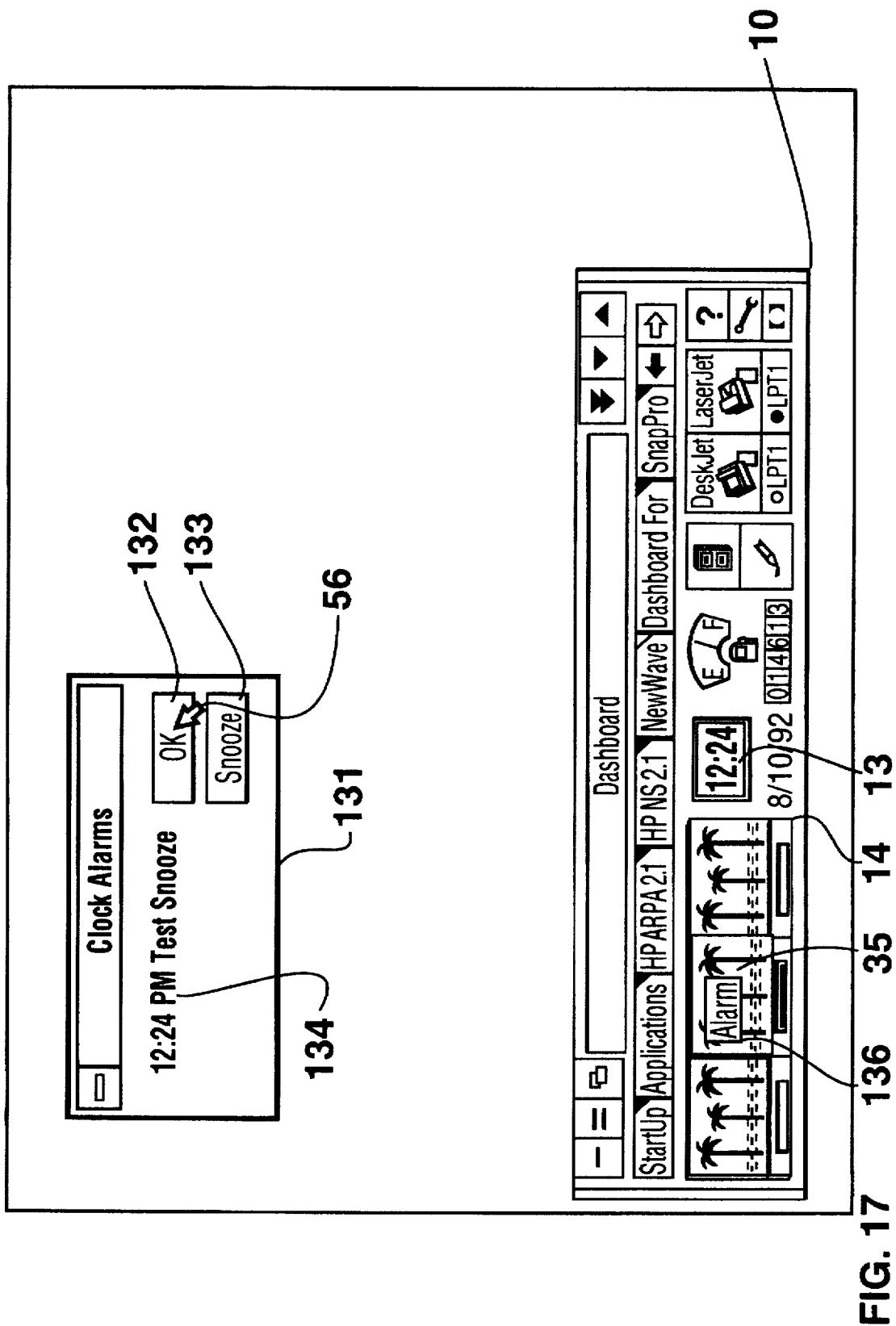
Figure 18:
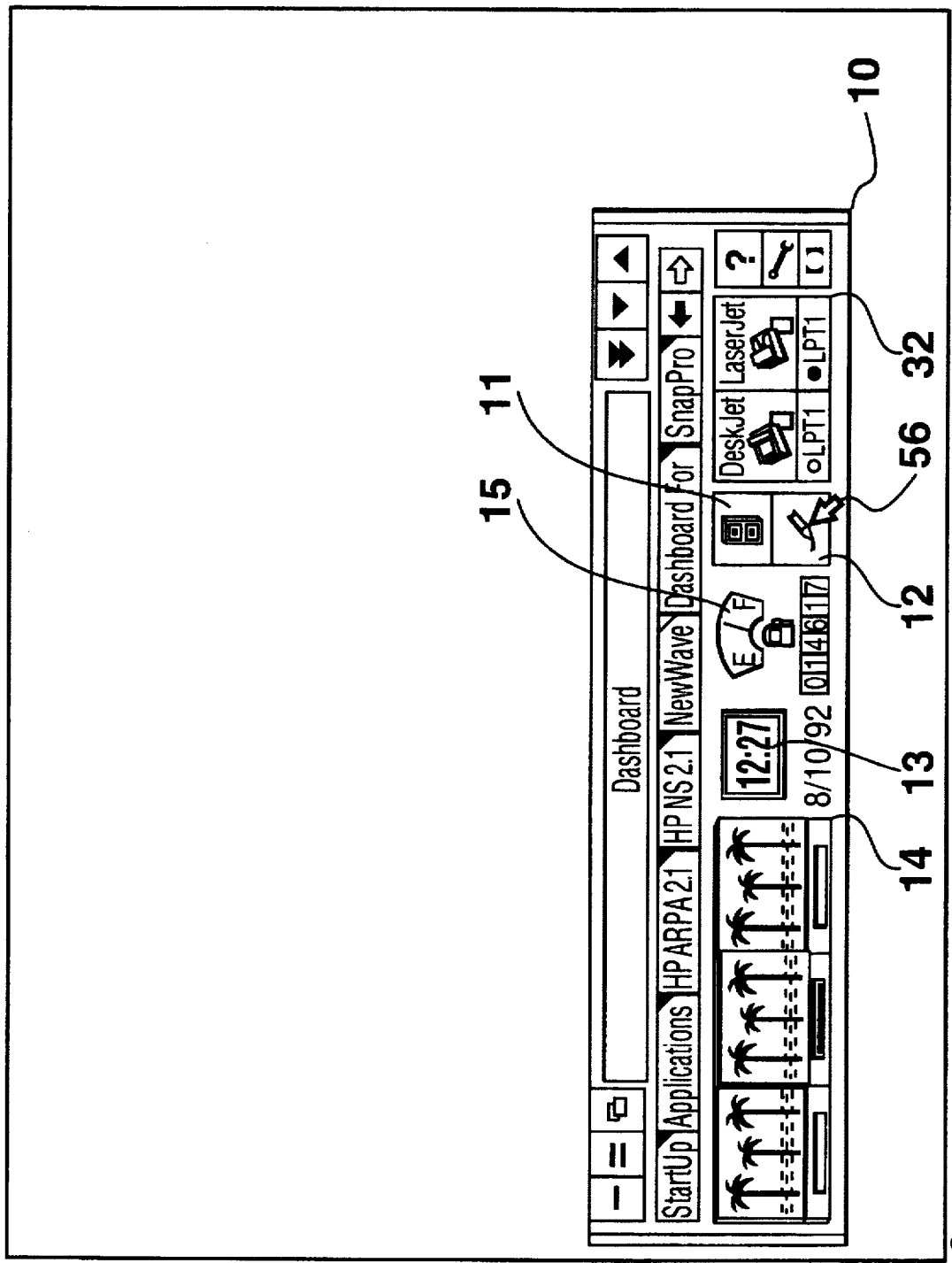

As shown in FIG. 16, at 12:19 PM, an alarm window 131 appears. Alarm window 131 includes an alarm text 134, an OK button 132 and a snooze button 133. Using cursor 56 and mouse button 62 to select snooze button 133 (or pressing "S" on the keyboard) results in alarm window 131 disappearing for the snooze interval shown in box 103 of FIG. 7. At the end of the snooze interval alarm window 131 re-appears, as shown in FIG. 17. Using cursor 56 and mouse button 62 to select OK button 132 results in alarm window 131 disappearing, as shown in FIG. 18.

Figure 19:
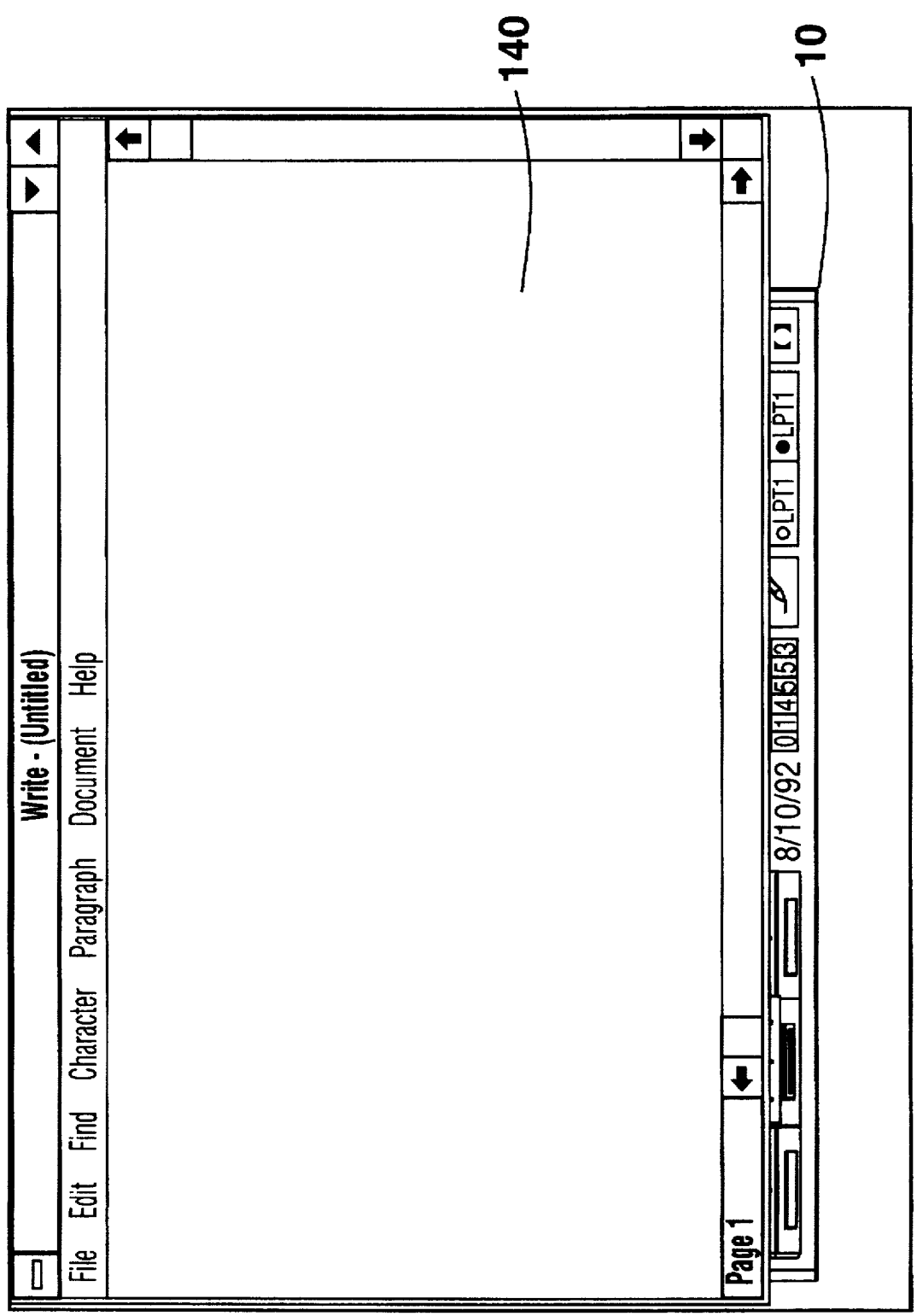

Quick launch button 11 and quick launch button 12 may be used to quickly launch applications. For example, by placing cursor 56 over quick launch button 56 and once clicking mouse button 62, the program MS Write is launched. This is shown in FIG. 19 where a window 140 for the program MS Write appears.

You can set up a quick launch button to load a data file at the same time it launches the program. To do this, enter the name of the data file as part of the command line in the quick launch preferences window.

Figure 20:
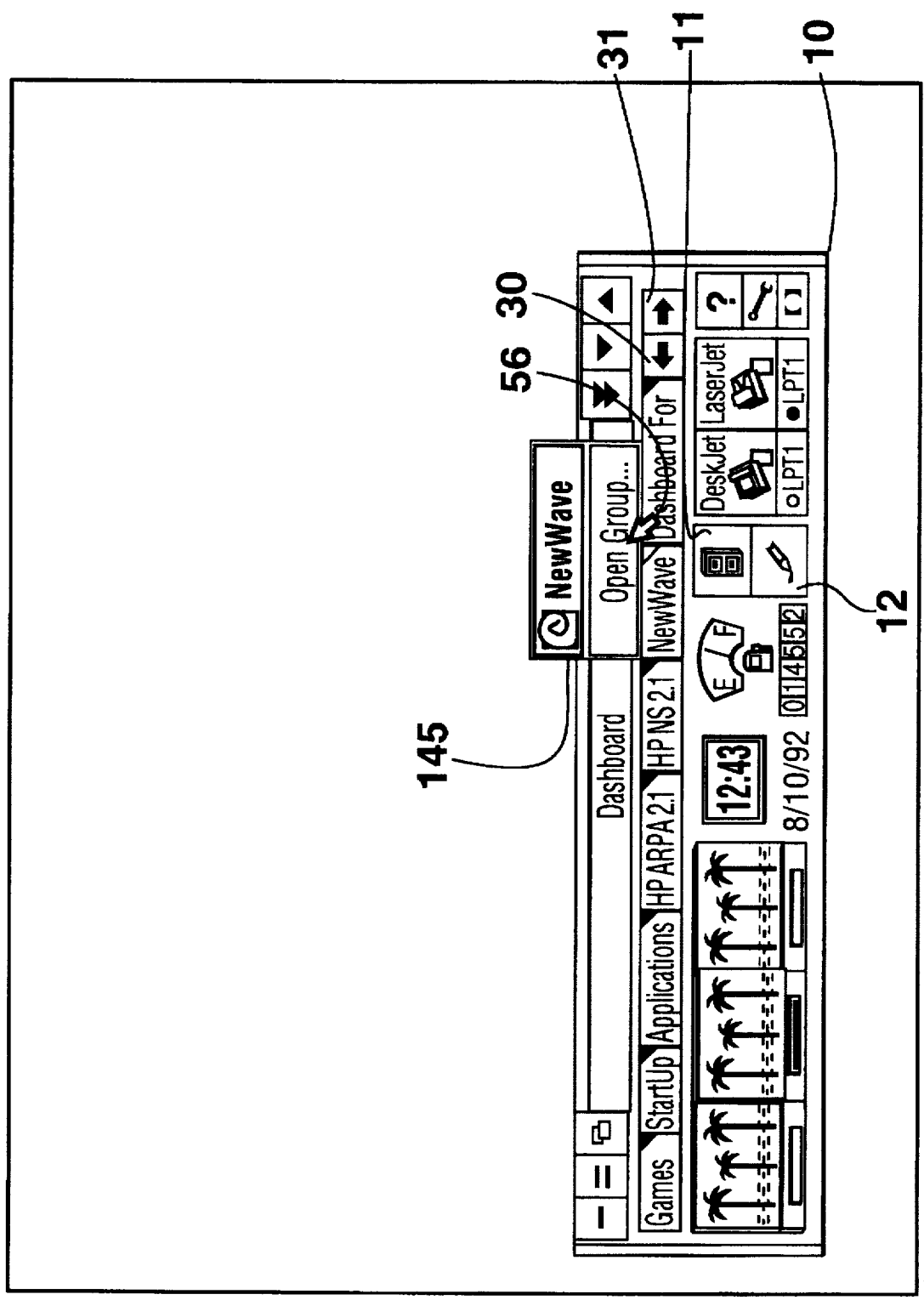

Adding a quick launch button is simple to do. For example, in FIG. 20, by placing cursor 56 over program group button 25 and clicking mouse button 62, a listing of executable programs in NewWave group is shown. In FIG. 20, program group tabs have been shifted to the left by clicking button 62 while cursor 56 was placed over shift button 30.

Figure 21:
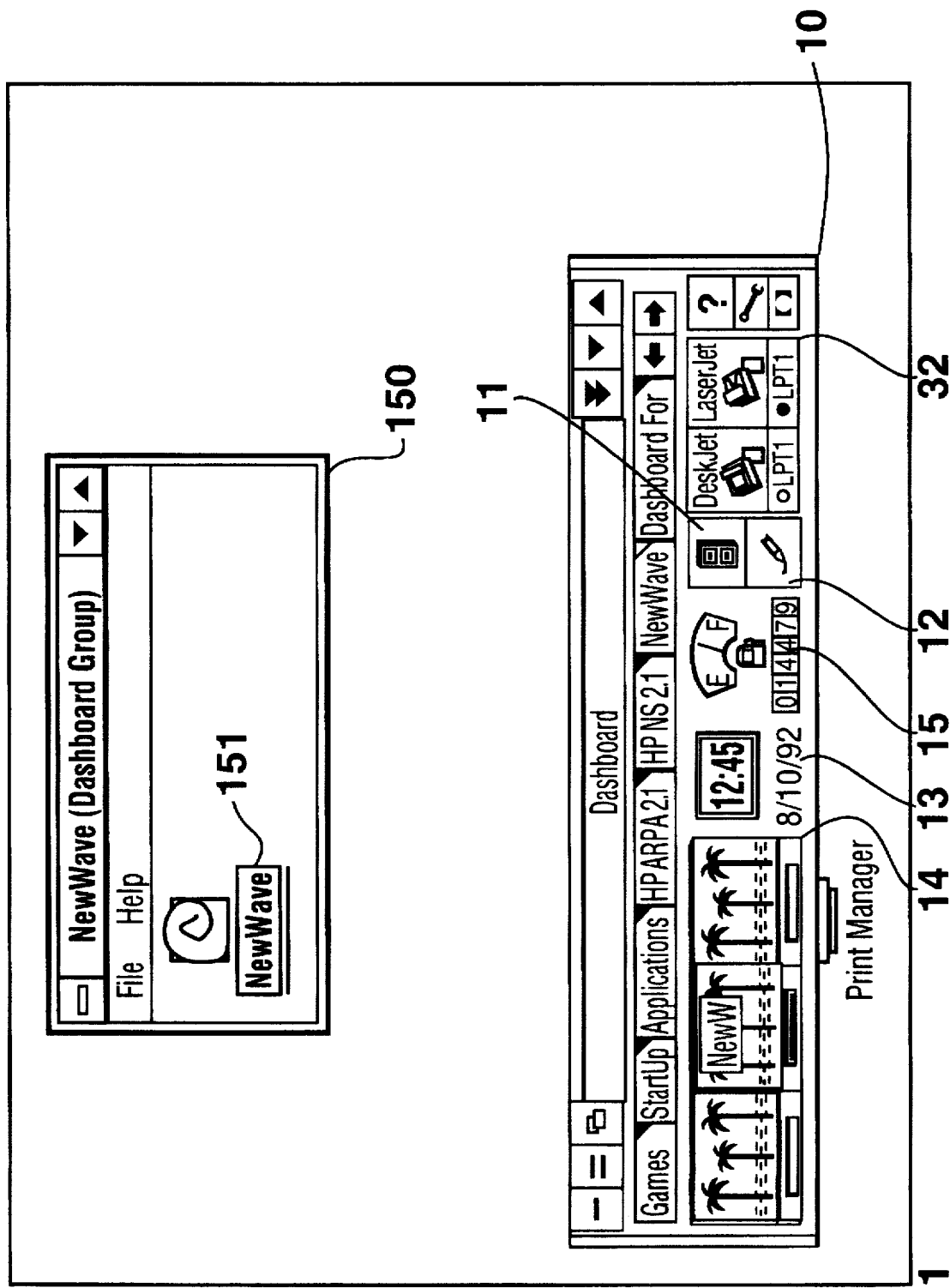

Placing cursor 56 over the tag "Open Group" and clicking button 62 results in the appearance of a NewWave (Dashboard Group) window 150, as shown in FIG. 21. Within the NewWave window 150 is an icon 151 for the NewWave application.

Figure 22:
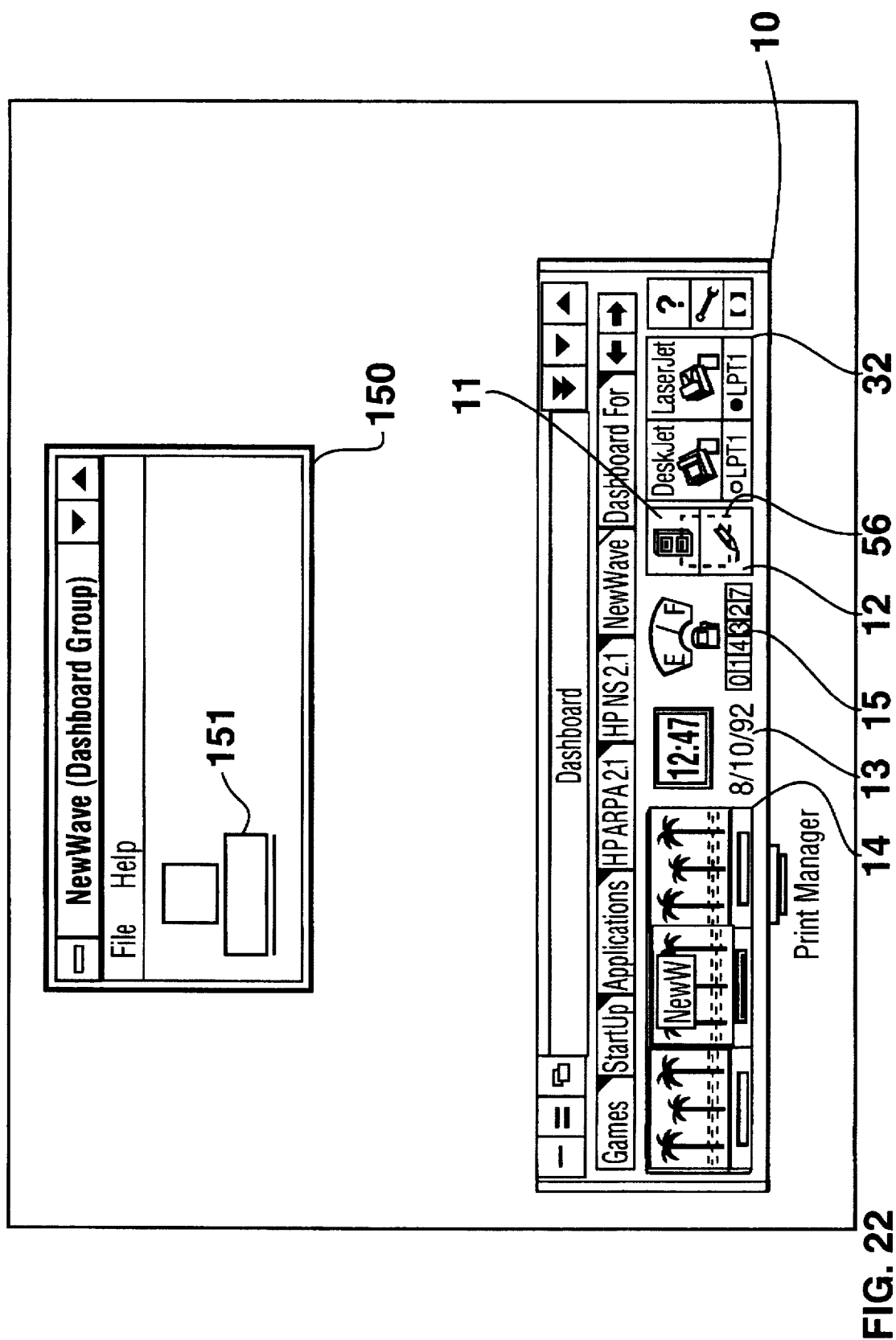
Figure 23:
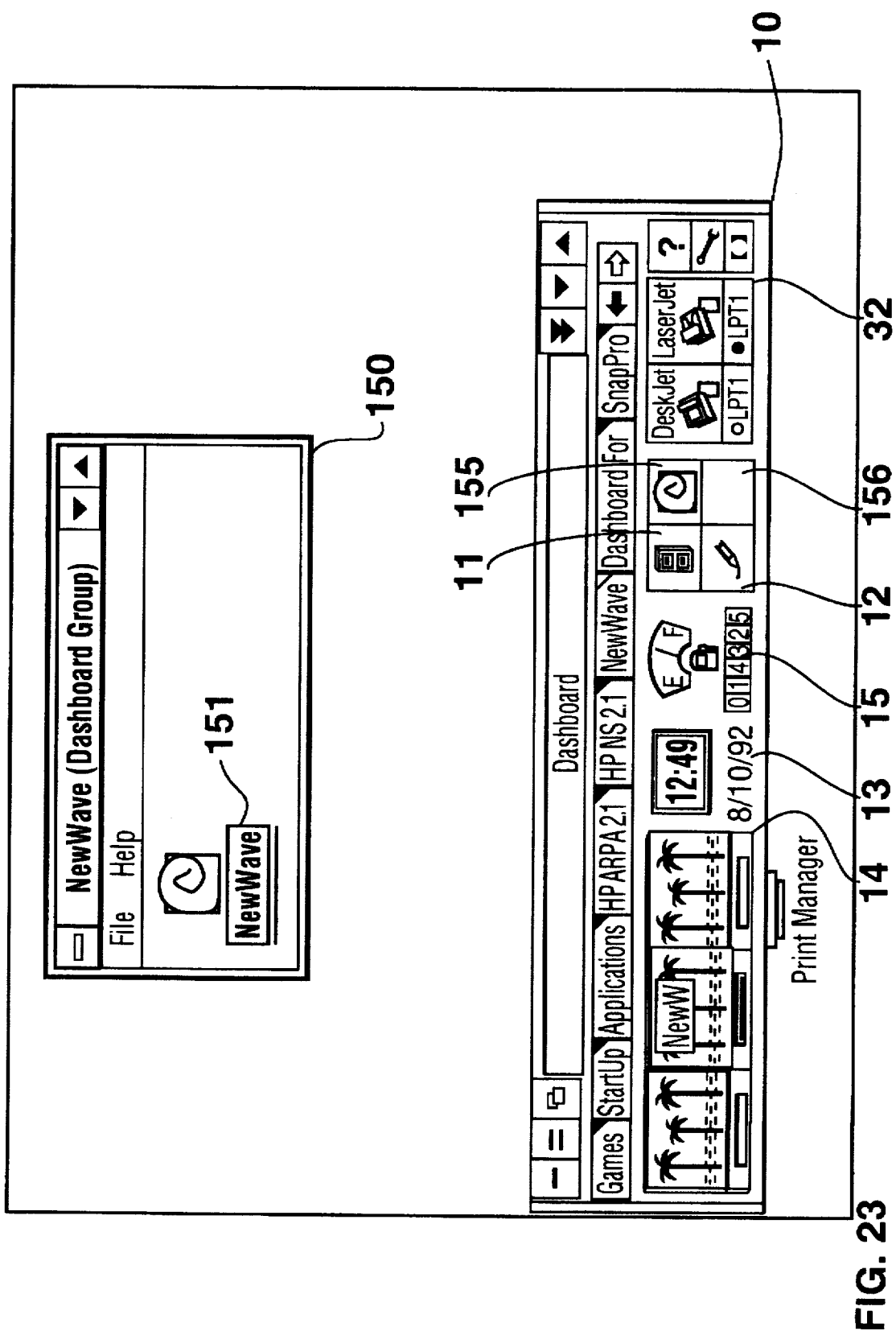

Cursor 56 may be placed over icon 151 and mouse button 62. Then mouse 60 may be moved so as to place cursor 56 over the area of dashboard 10 occupied by quick launch button 11 and quick launch button 12. When this is done, as shown in FIG. 22, cursor 56 appears as a box with dashed lines. Upon releasing mouse button 62, a new quick launch button 155 appears for the NewWave Application, as shown in FIG. 23. A blank quick launch button location 156 also appears. Blank quick launch button location 156 is the location into which the next added quick launch button will be placed.

Alternately, a new quick launch button can be added as follows: From quick launch preferences window 90, select new button 92. In the window that appears, enter a descriptive title for the program in the title box. It does not have to be the program's real title. It can be anything. In the command line box, enter the path and file name for that program, with other command-line information necessary. Enter the information in the working directory box. Select the browse button to select the program's path and file name as the command line. If the program contains an icon file, its icon appears on the quick launch button by default. Select the change icon button to change the default icon. To add another quick launch button, select new button 92 again and then repeat the process. The new quick launch buttons will appear on dashboard interface 10.

Figure 24:
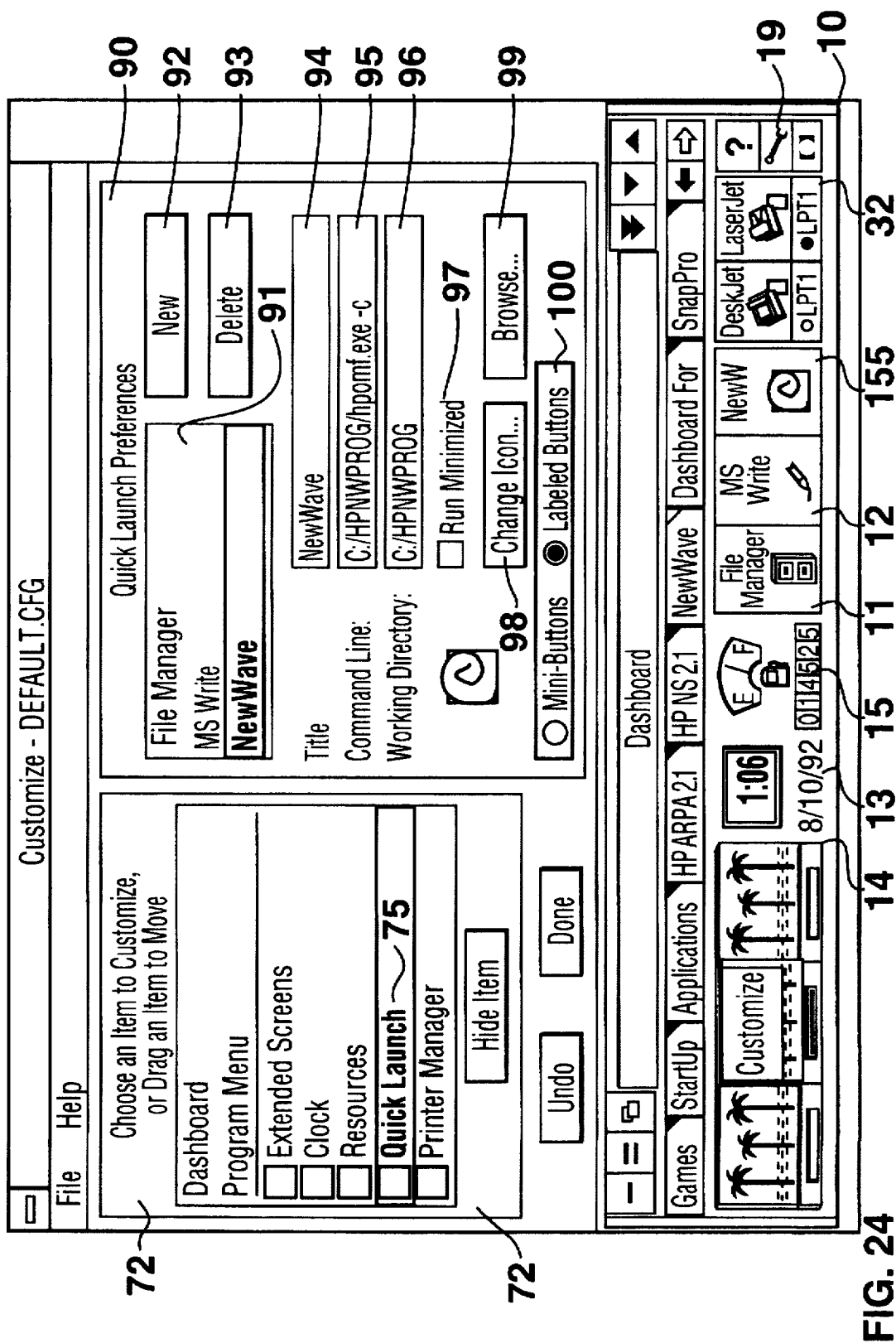

In FIG. 24, by selecting customize button 19, customize window 71 has been brought up. After selecting quick launch listing in customize menu 72, box 100 has been used to select labeled buttons. The result is that quick launch button 11, quick launch button 12 and quick launch button 155 are now larger and include a label.

The application order shown in application listing 91 determines the left to right ordering of quick launch buttons 11, 12 and 155. The relative position of the quick launch buttons may be changed by placing cursor 56 over a listing in application listing 91, depressing mouse button 62, dragging the listing to a new position, and then releasing mouse button 62.

Figure 25:
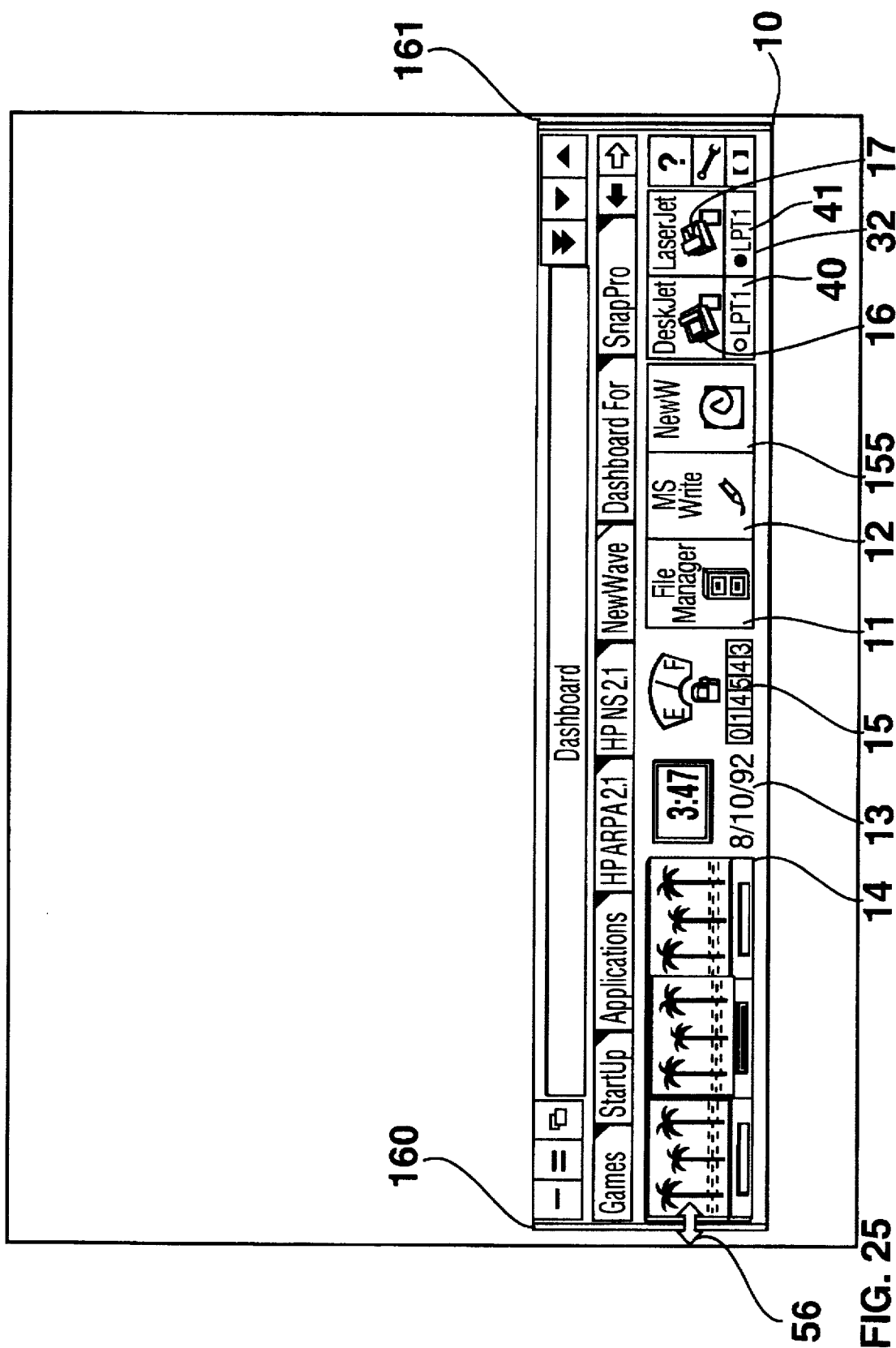

Bar 160 and bar 161 are used to change the horizontal size of dashboard interface 10. As shown by FIG. 25, when cursor 56 is placed over bar 160 or bar 161, cursor 56 changes shape so as to include two arrows pointing horizontally in opposite directions. By depressing mouse button 62 and moving cursor 56, the horizontal size of dashboard interface 10 is adjusted.

Figure 26:
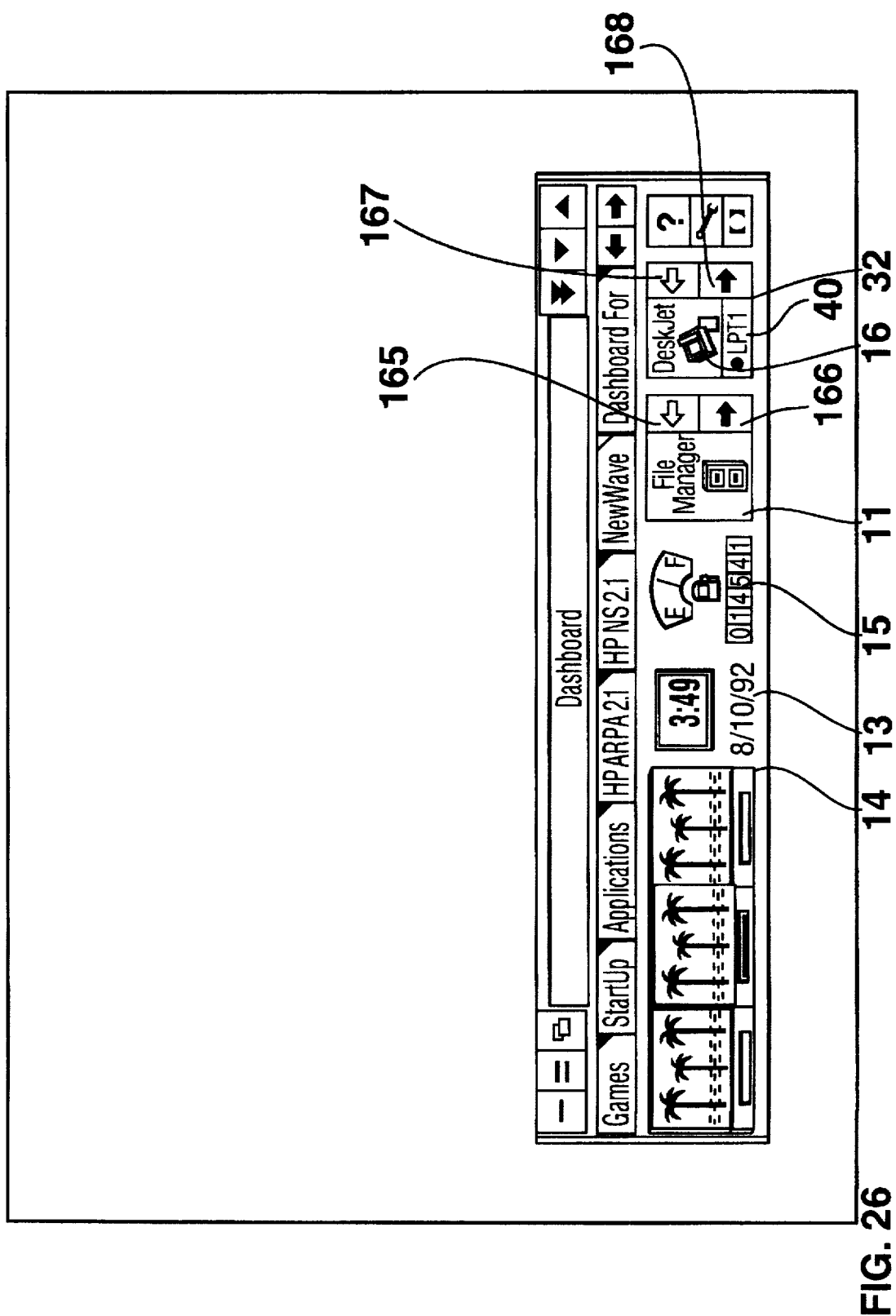

For example, in FIG. 26 dashboard interface 10 has been reduced in size. In order to do this only one quick launch button, quick launch button 11, is displayed. The other quick launch buttons may be accessed using scroll button 165 and scroll button 166. Additionally only one printer icon, printer icon 16, is displayed. The printer icon which is not shown may be accessed using scroll button 167 and scroll button 168.

Figure 27:
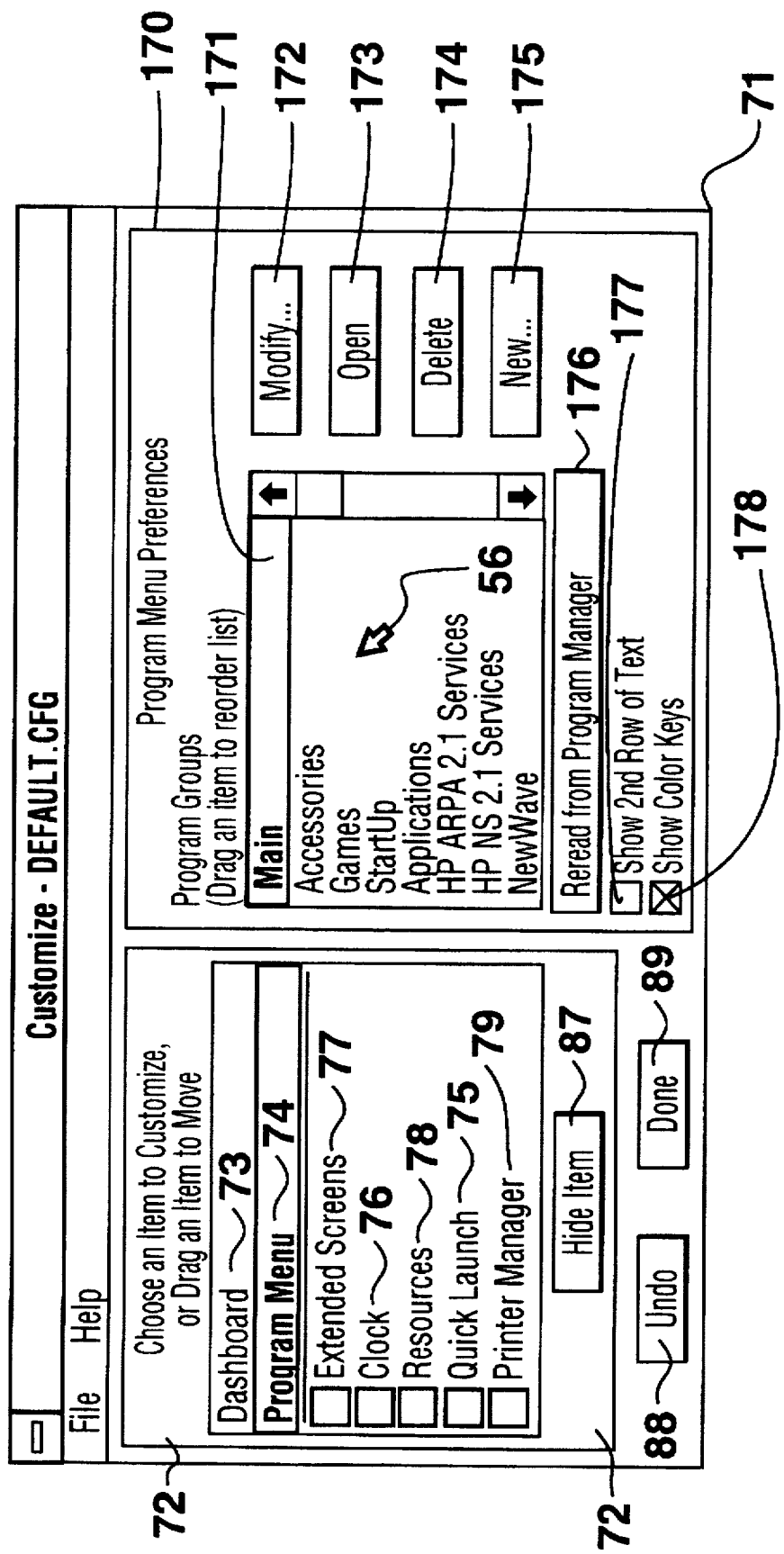

FIG. 27 shows customize window 71. Program menu listing 74 is selected from customize menu 72. Therefore the program menu preferences window 170 is displayed. A program groups listing 171 shows program groups which are listed within program menu 50. The order in which listings appear in program groups listing 171 determines the order in which program group buttons are displayed in program menu 50. To move a program group button in program menu 50, place cursor 56 over the associated listing in program groups listing 171, depress mouse button 62, drag the listing to a new position in program groups listing 171, and release mouse button 62.

Figure 28:
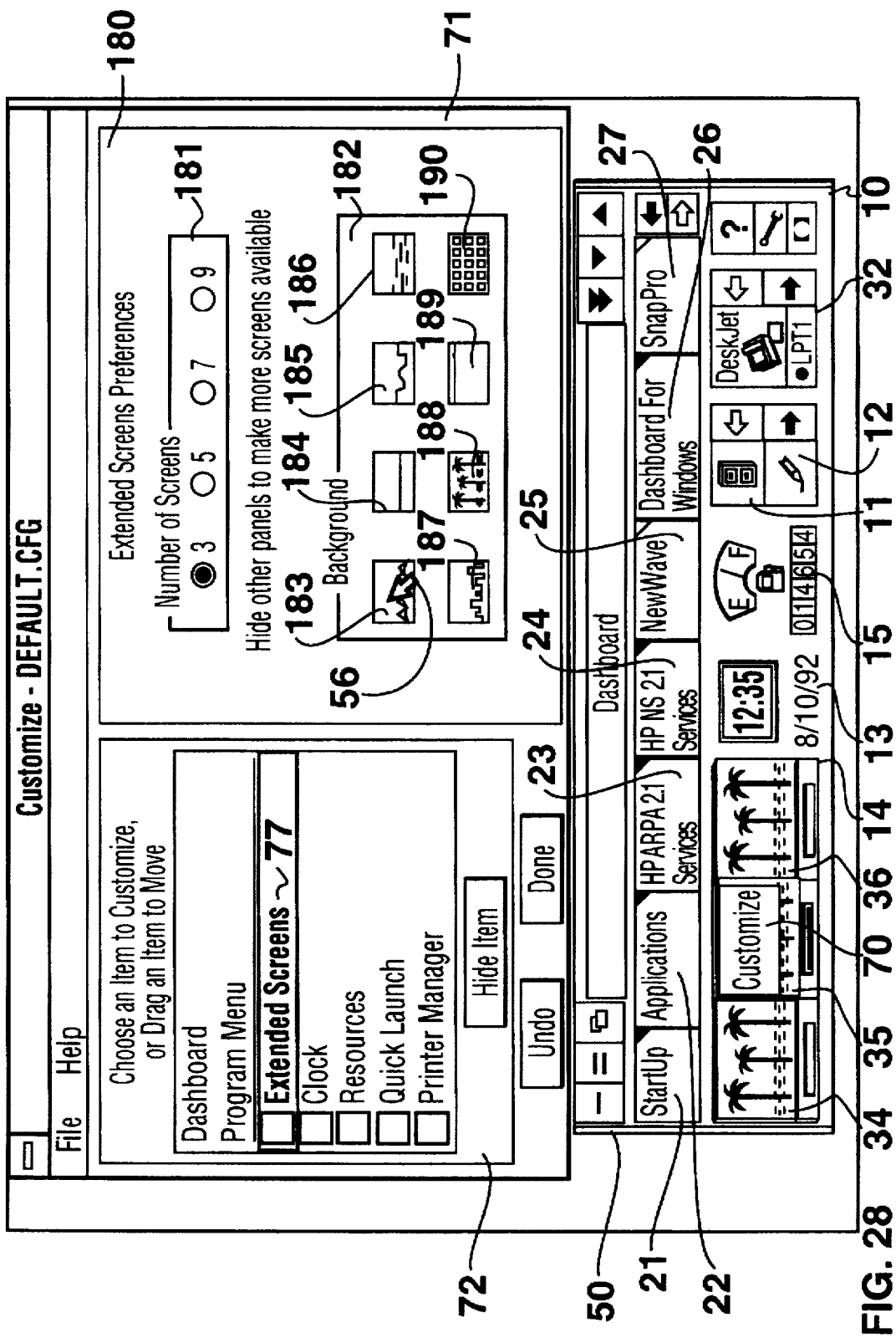

Selection of a modify button 172 brings up a modify program group window which allows changes to be made in the group description, color key and group file of the selected program group. Selection of an open button 173 opens a window for the selected program group. Selection of a delete button 174 results in deletion of the selected program group. Selection of a new button 175 opens a new program group window which allows creation of a new program group tab. Selection of a reread button 176 cause a read of program groups by the program manager. Selection of a box 178 causes program menu 50 each to include a color coded region. A selection of a box 177 results in the vertical expansion of each of program group button in program menu 50 to show a second row of text. FIG. 28 shows each of the program group buttons in program menu 50 expanded to show a second row of text.

Dashboard interface 10 facilitates opened or iconized applications being easily and quickly arranged in three, five or seven extended screen areas. Extended screen display 14 displays miniature versions (i.e. mini-program windows) of multiple full-screen views making it possible to manage several different views of programs simultaneously. The extended screens are also interactive, that is opening or closing an application is automatically reflected by extended screen display 14. When items in extended screen display 14 are moved are resized, the corresponding full-screen views are changes too.

FIG. 28 shows program menu listing 77 selected from customize menu 72. Therefore, extended screens preferences window 180 is shown.

Number of screens selection box 181 allows a user to select a number of extended screens to be displayed by extended screen display 14. A background box 182 allows a user to select background for mini-program window 34, miniprogram window 35, and mini-program window 36. Background box 182 includes a background 183, a background 184, a background 185, a background 186, a background 187, a background 188, a background 189 and a background 190. For example, background 183 is selected by placing cursor 56 over background 183 and depressing mouse button 62.

Figure 29:
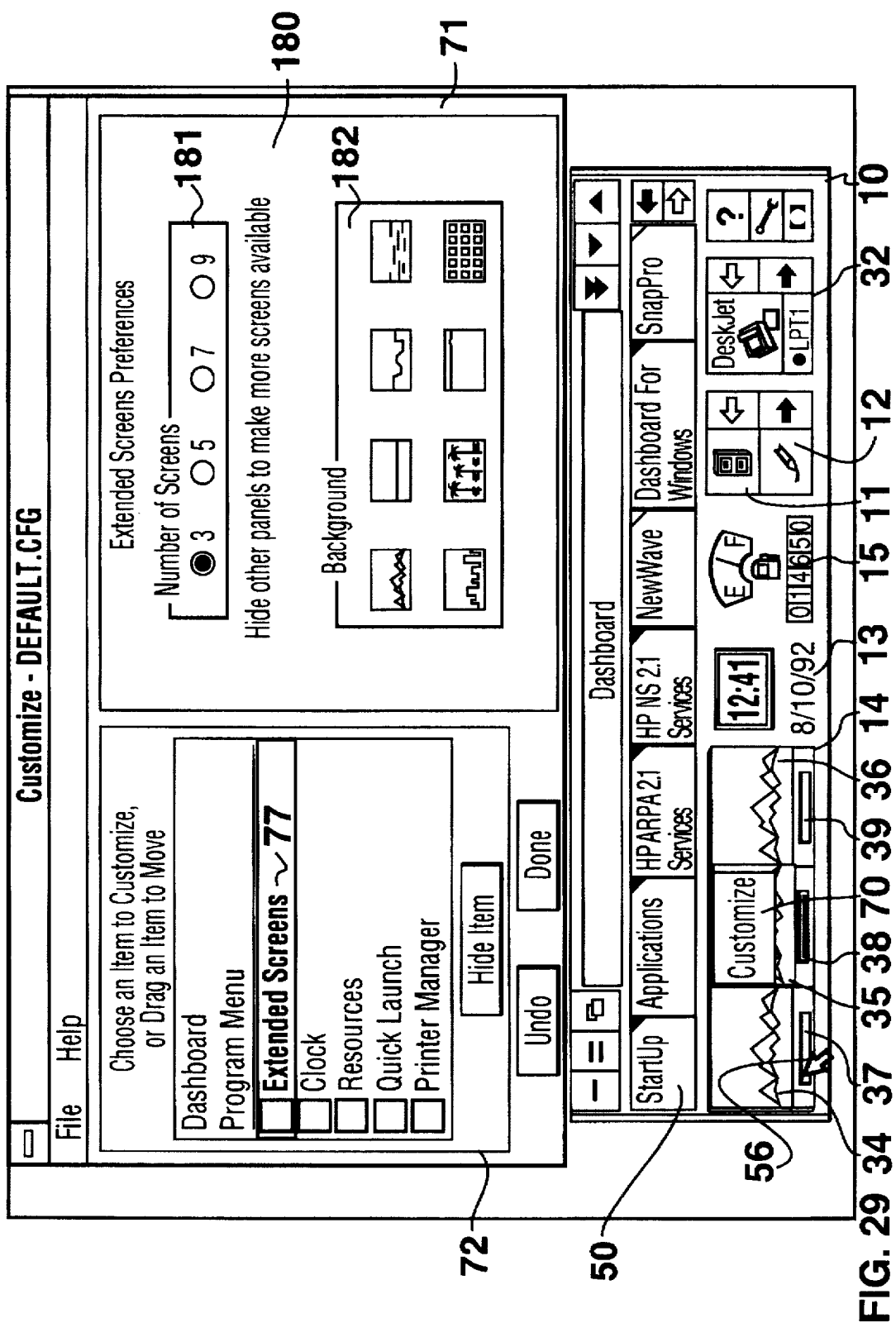

In FIG. 29, mini-program window 34, mini-program window 35, and mini-program window 36 are shown with background 183. A highlight in selection bar 38 indicates that mini-program window 35 is the active (i.e. the displayed) virtual computing screen. Also, the mini-program window for the active virtual computing screen is highlighted. As is seen from FIG. 29, mini-window 70 represents customize window 71. To select the virtual computing screen represented by mini-program window 34, cursor 56 is placed over selection bar 37 and mouse button 62 is clicked.

Figure 30:
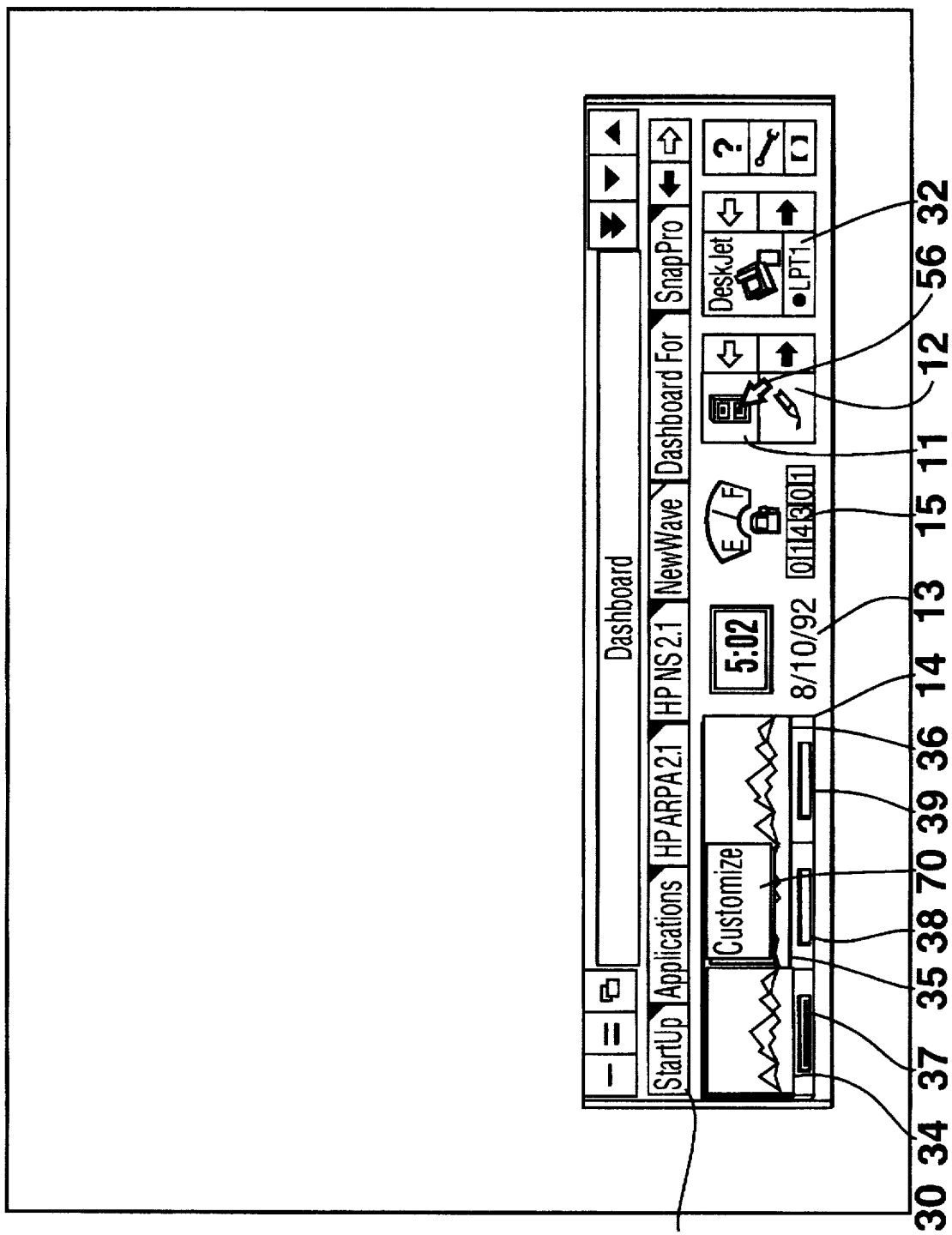

As shown in FIG. 30, a highlight in selection bar 37 indicates that mini-program window 34 shows the displayed virtual computing screen. A program may be opened within the displayed virtual computing screen, for example, by placing cursor 56 over quick launch button 11 and clicking mouse button 62.

Figure 31:
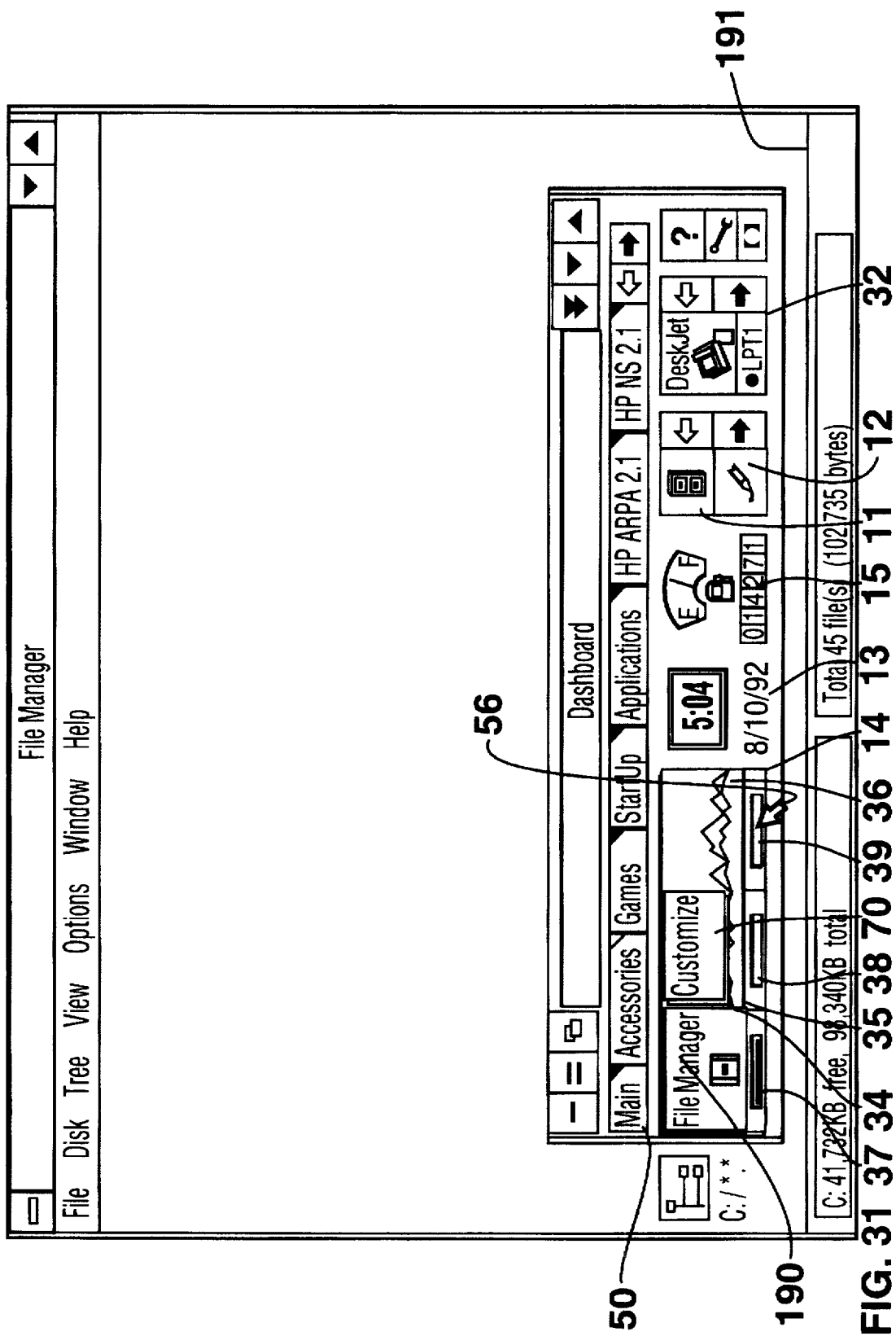

As shown in FIG. 31, clicking quick launch button 11 results in the opening of a File Manager window 191. Dashboard interface 10 has been brought to the front of the display by selecting function key 12 (F12) on the keyboard, as specified in box 81 of dashboard preference window 80 (shown in FIG. 4). An associated mini-window 190 is shown in mini-program window 34. Placing cursor 56 over selection bar 39 and clicking mouse button 62 results in selection of the virtual computing screen represented by mini-program window 36.

Figure 32:
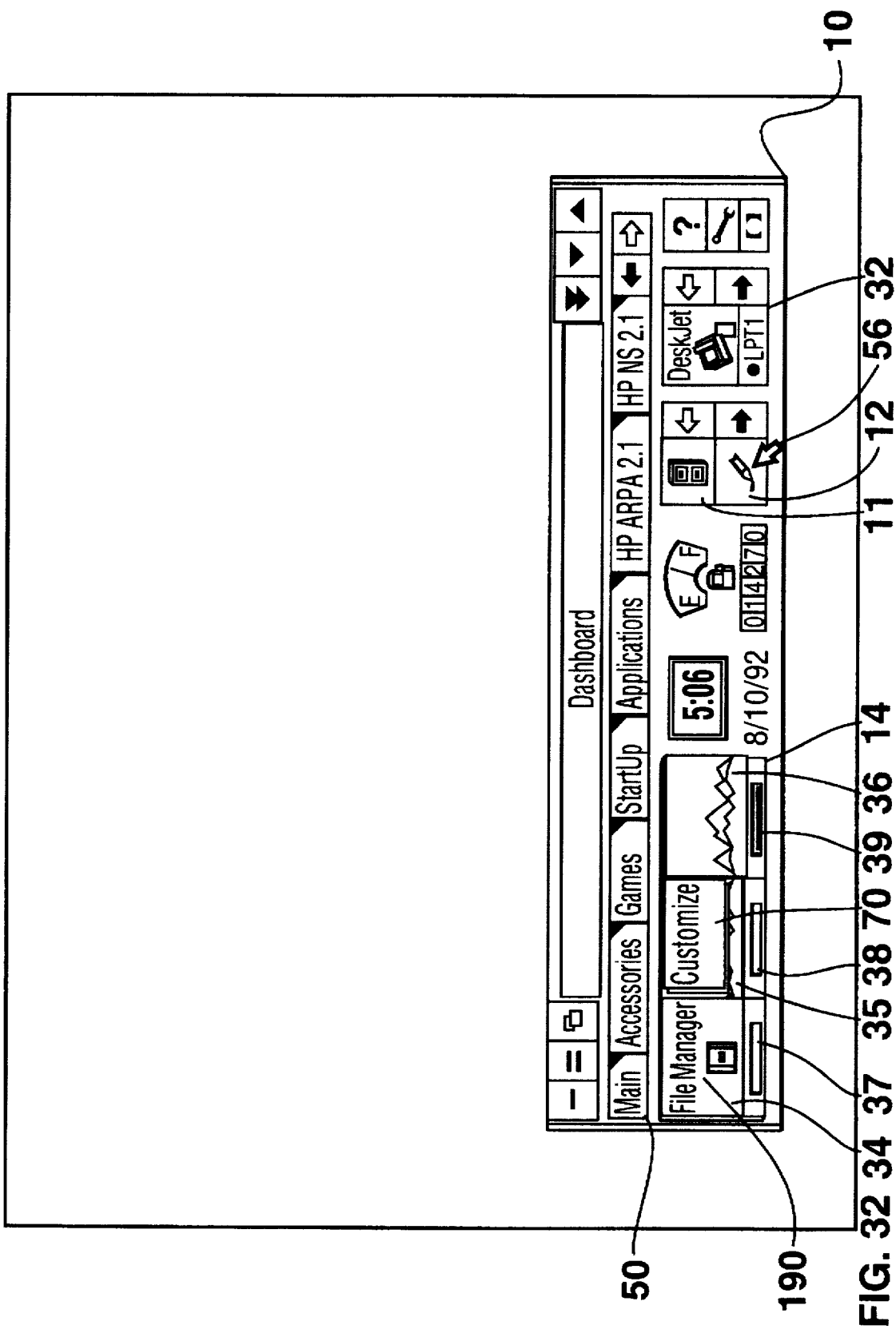

FIG. 32 shows a display of the virtual computing screen represented by mini-program window 36. The highlight in selection bar 39 indicates the selection. Placing cursor 56 over quick launch button 12 and clicking mouse button 62 results in a launch of MS write and the appearance of window 140.

Figure 33:
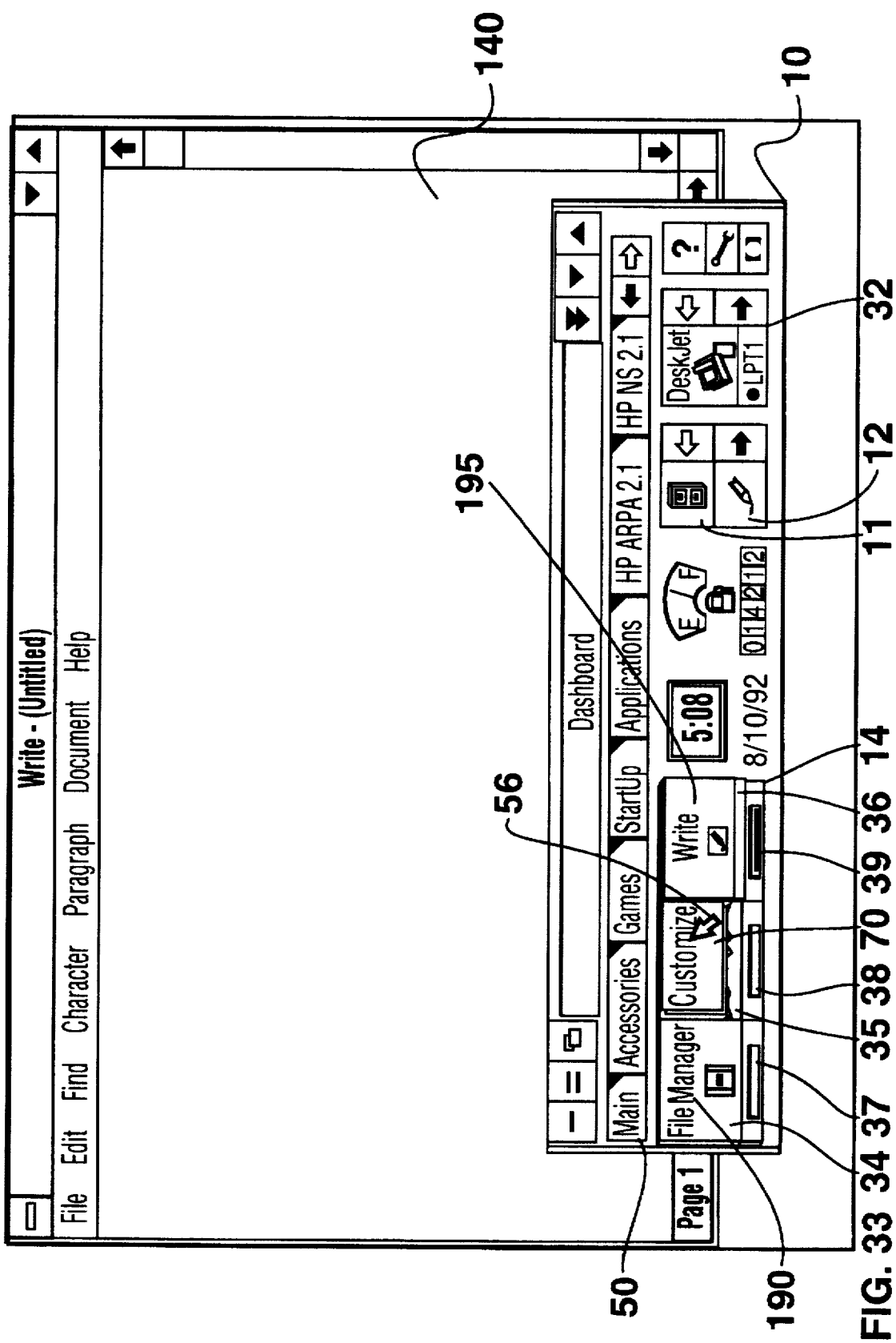

An associated mini-window 195 appears in mini-program window 36. Each mini-window represents an open program. The size and location of the mini-window on the extended screen are proportional to that program window on the real screen. Moving the mini-window will move the program window on the screen. As seen in mini-window 190 and mini-window 195, shown in FIG. 33, when a mini-window is sufficiently large, an icon for the represented program appears as well as the name of the program.

Placing cursor 56 over mini-window 70 and clicking mouse button 62 makes customize window 71 the active window. Placing cursor 56 over mini-window 70 and twice clicking mouse button 62, makes customize window 71 the active window and displays customize window 71.

Figure 34:
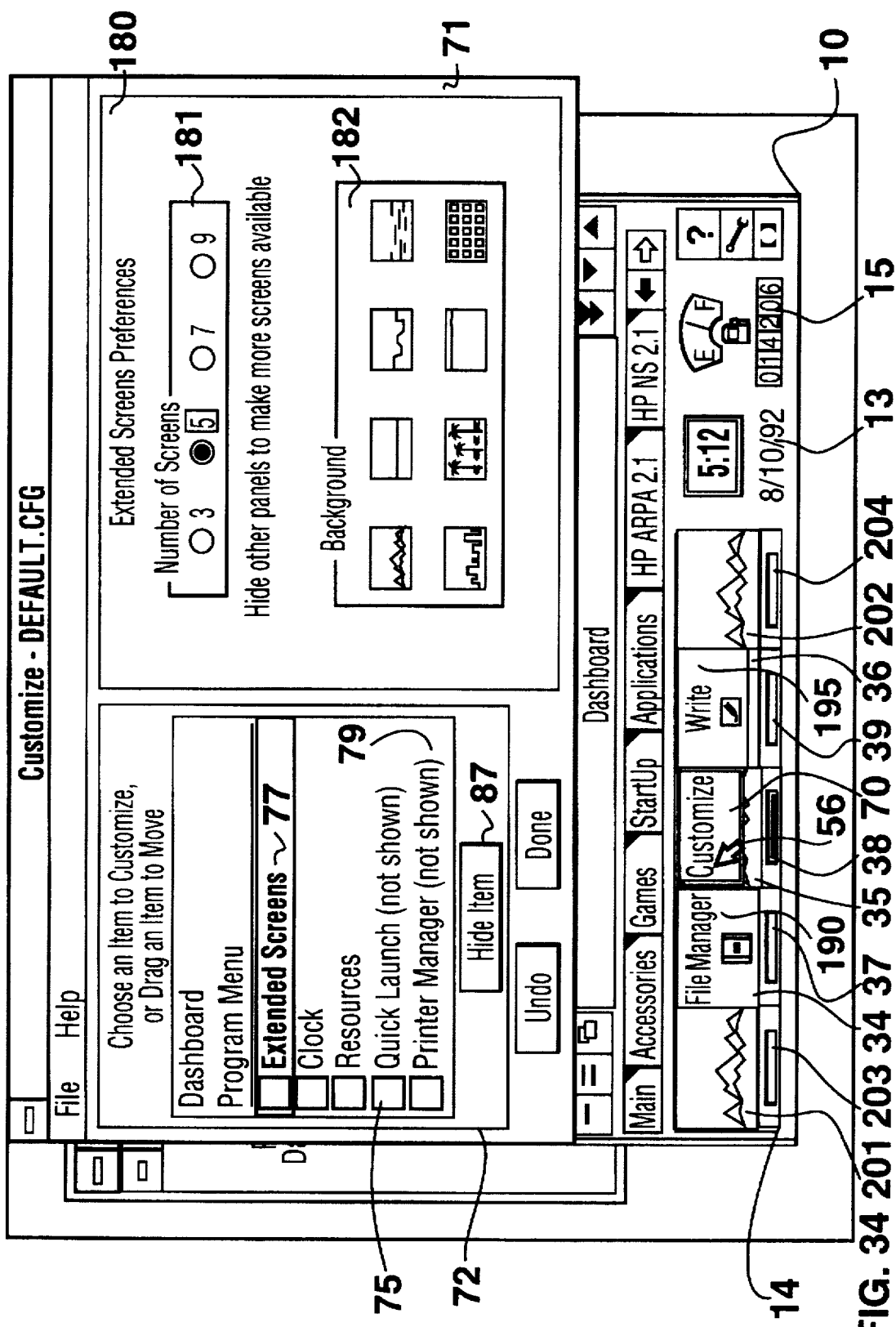

In FIG. 34, customize window 71 is active and displayed. Using hide/show item button, quick launch buttons 11 and 12, and printer manager 32 have been removed from dashboard interface 10. Number of screens selection box 181 has been used to select use of five extended screens. This has resulted in the addition of a mini-program window 201, a selection bar 203, a mini-program window 202 and a selection bar 204 to extended screens display 14.

The extended screens display 14 and the full screens are completely interactive. Moving mini-windows within extended screens display 14 results in the associated windows being moved in the display. For example, by placing cursor 56 over mini-window 70 and depressing mouse button 62, mini-window 70 may then be dragged to mini-program window 202. Likewise, by placing cursor 56 over mini-window 190 and depressing mouse button 62, mini-window 190 may then be dragged to mini-program window 201. The result is shown in FIG. 35.

Figure 35:
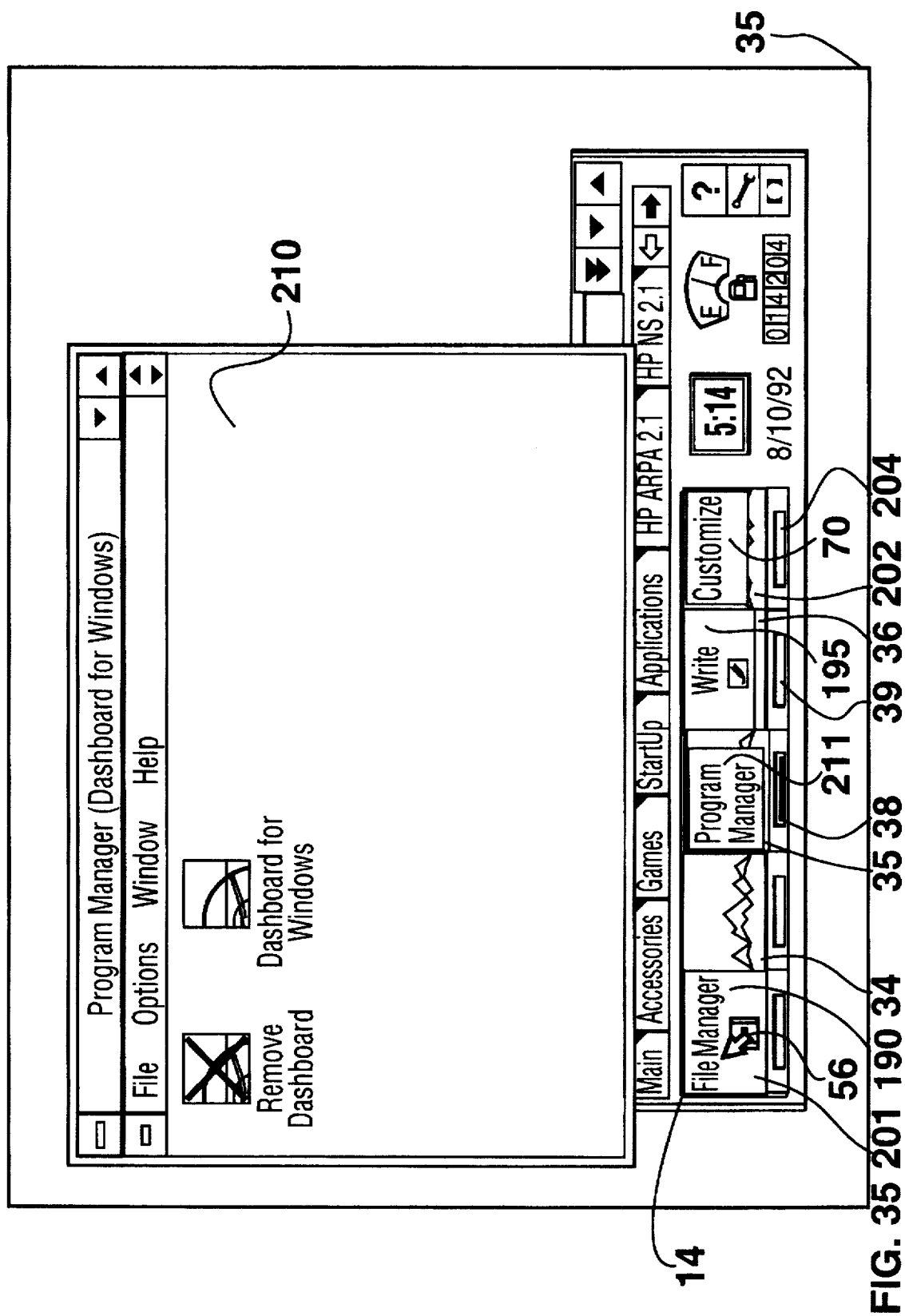
Figure 36:
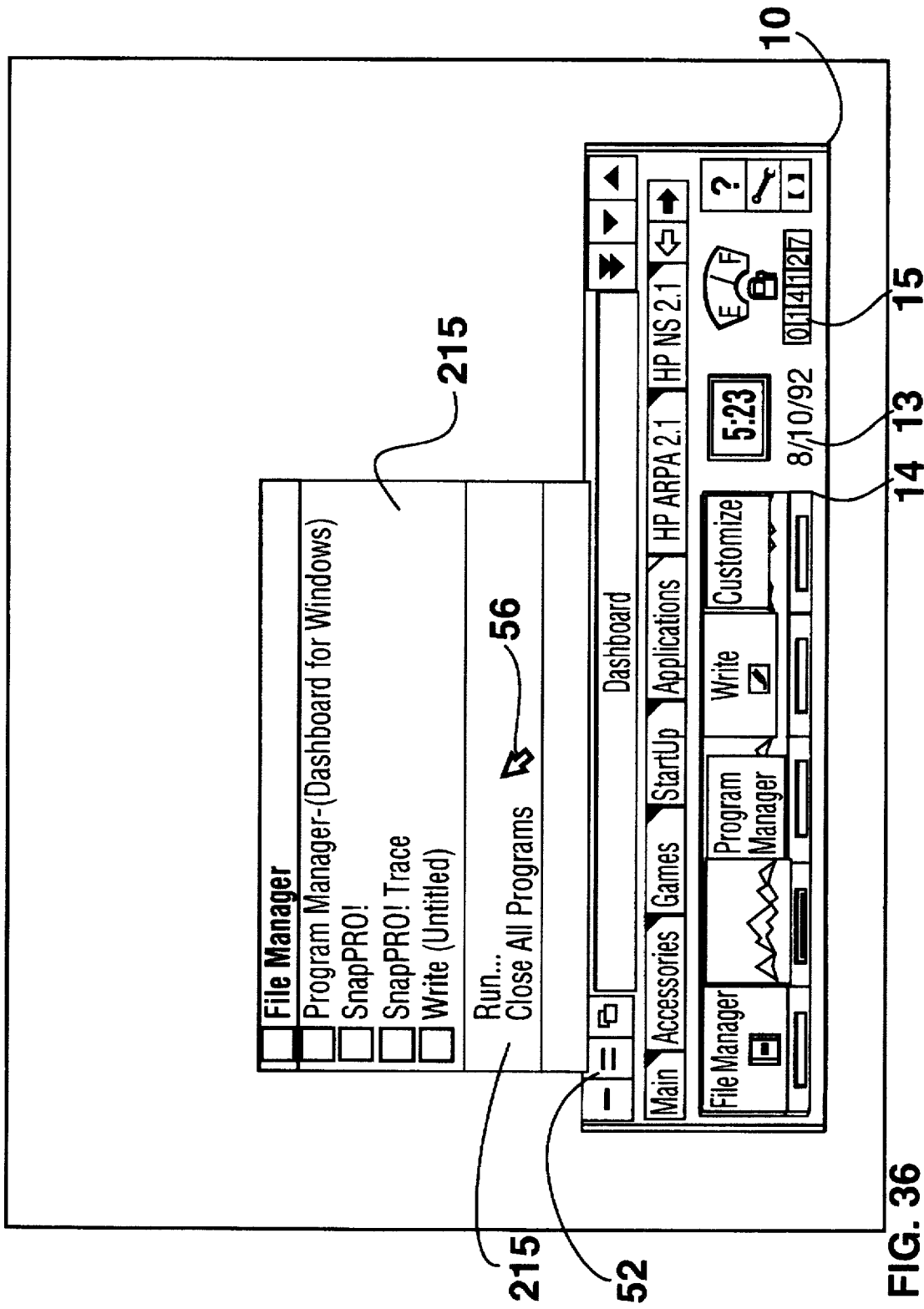

In FIG. 35, program manager has been opened, for example, using a menu 215 (shown in FIG. 36) accessible by selecting task menu button 52. Menu 215 displays a simple list of all programs currently executing. Menu 215 also includes a run command and a close all programs command.

FIG. 35 shows window 210 and mini-window 211. File manager mini-window 190 has been selected by placing cursor 56 over mini-window 190 and clicking mouse button 62.

Figure 37:
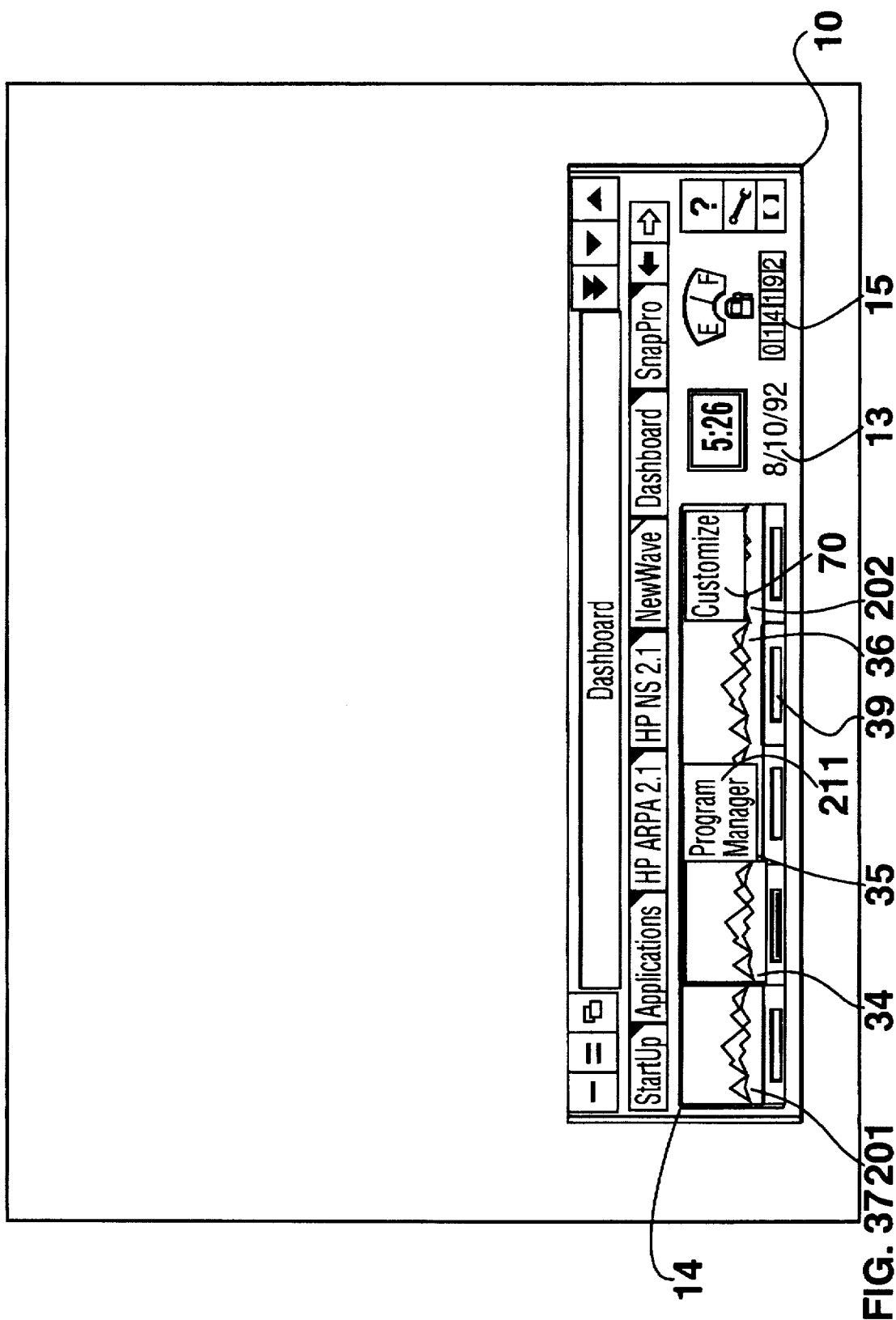

As illustrated by FIG. 36, menu 215 is again accessed by placing cursor 56 over task menu button 52 and clicking mouse button 62. Placing cursor 56 over the close all programs selection and clicking mouse button 62 results in File Manager program and the MS Write program being closed. This is illustrated by FIG. 37 where mini-window 190 and mini-window 195 are no longer seen in extended screens display 14.

Figure 38:
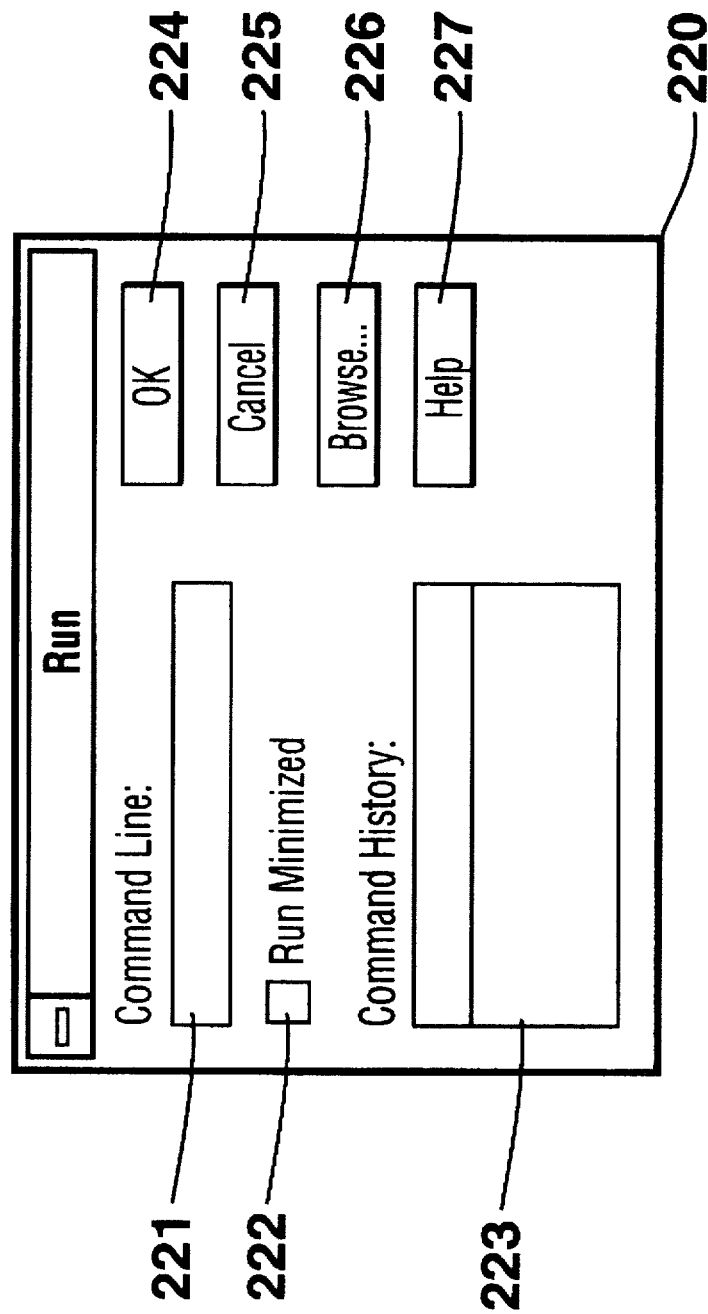

Placing cursor 56 over the selection in menu 215 which is listed as "Run" results in a Run window 220 appearing, as shown in FIG. 38. Run window 220 includes a command line 221, an OK button 224, a cancel button 225, a browse button 226 and a help button 227. Selection of a run minimized box 222 will result in a program being started in a minimized form. A box 223 lists a command history.

Figure 39:
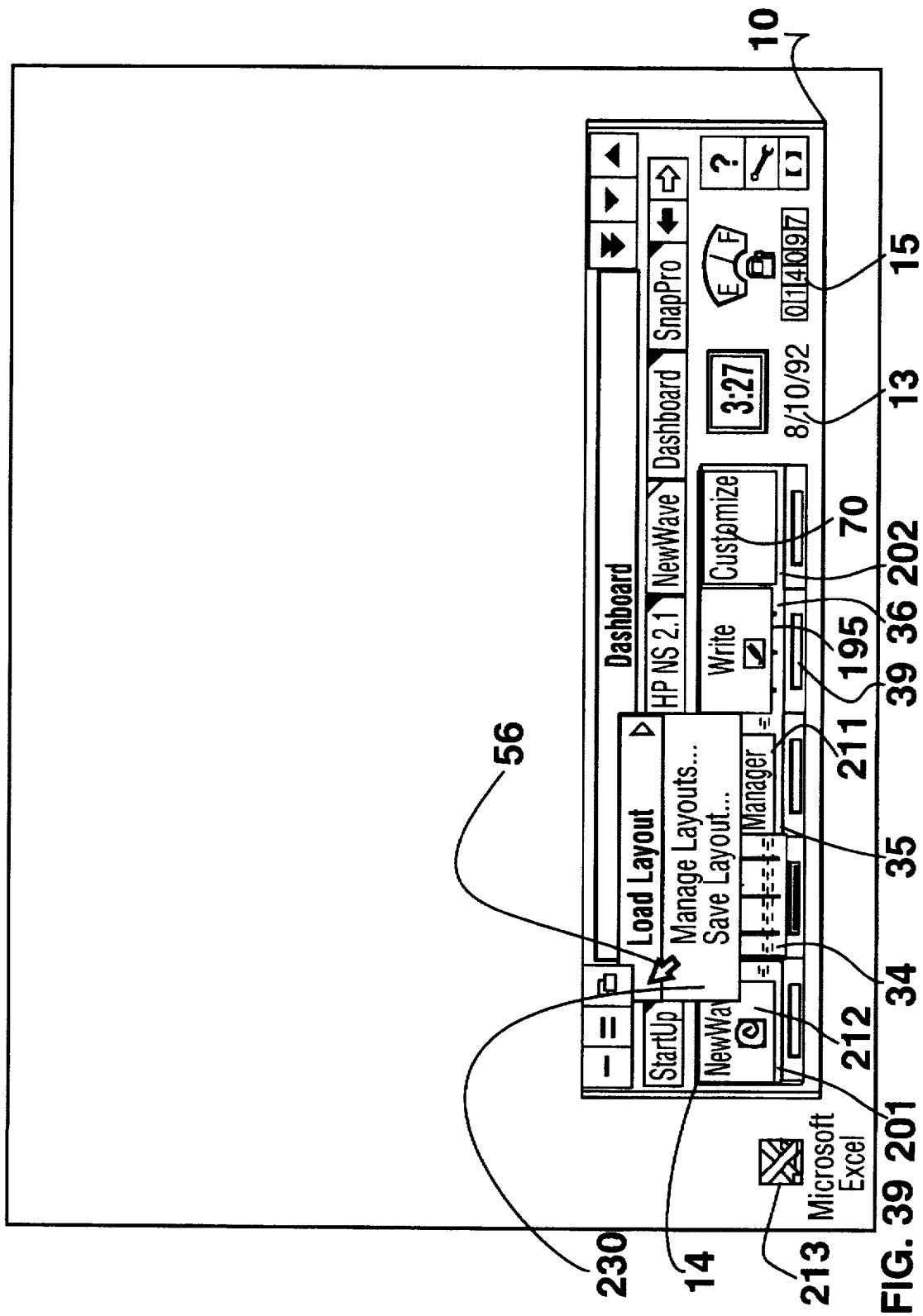

Layouts of opened applications may be saved using a menu 230 shown in FIG. 39. Menu 230 is brought up by selecting layout menu button 53. The layout shown in FIG. 39 is saved as layout 3, to be recalled at a later time. As is seen from FIG. 39, the saved layout includes an open window for the NewWave application represented by mini-window 212 in mini-program window 201. The saved layout also includes an Excel program running in icon form, as represented by icon 213 within the virtual computing screen represented by mini-program window 34. Additionally, the saved layout includes MS Write as represented by mini-window 195 shown in miniprogram window 36.

Figure 40:
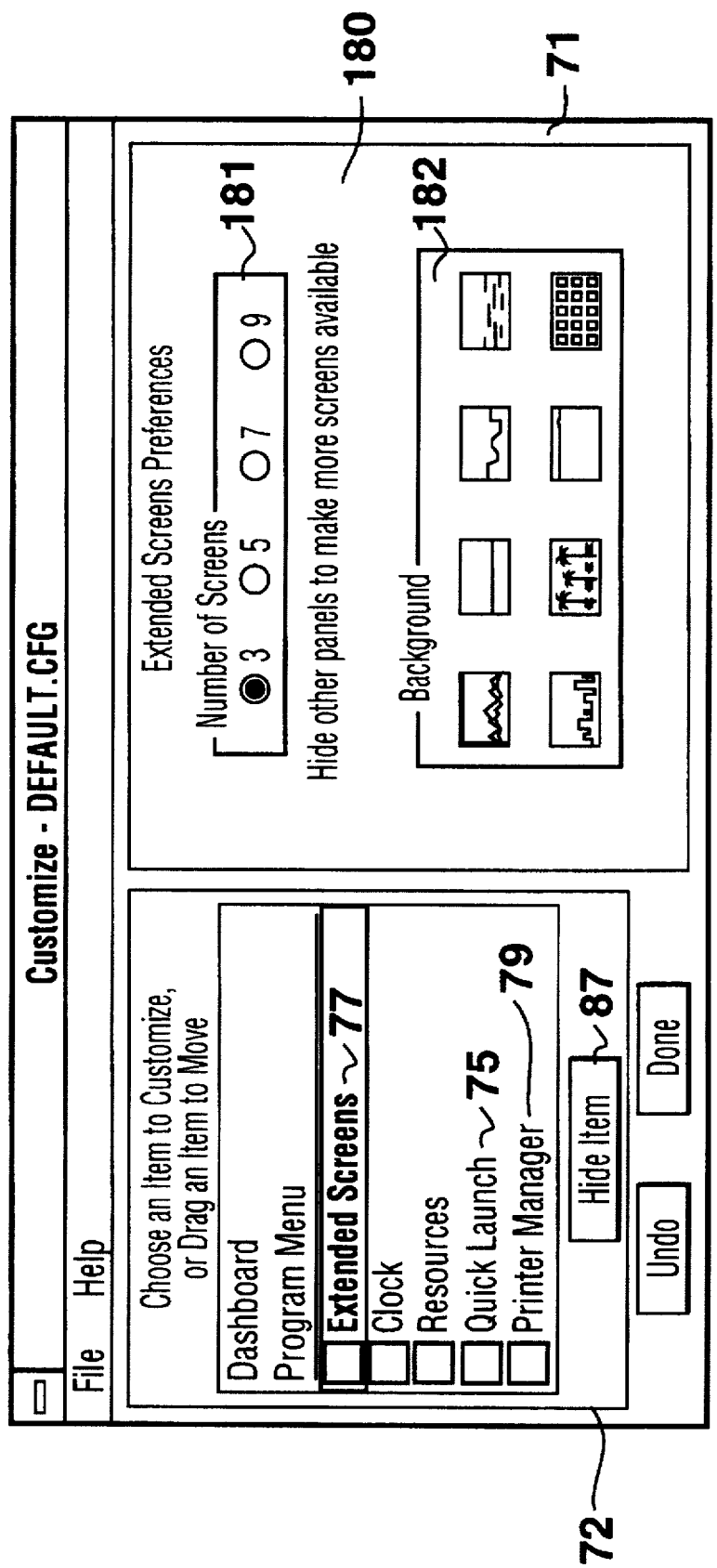

In FIG. 40, customize window 71 is active and displayed. Using hide/show item button, quick launch buttons 11 and 12, and printer manager 32 are again displayed by dashboard interface 10. Number of screens selection box 181 has been used to select the use of three extended screens. The result is the removal of mini-program window 201, selection bar 203, mini-program window 202 and selection bar 204 from extended screens display 14.

Figure 41:
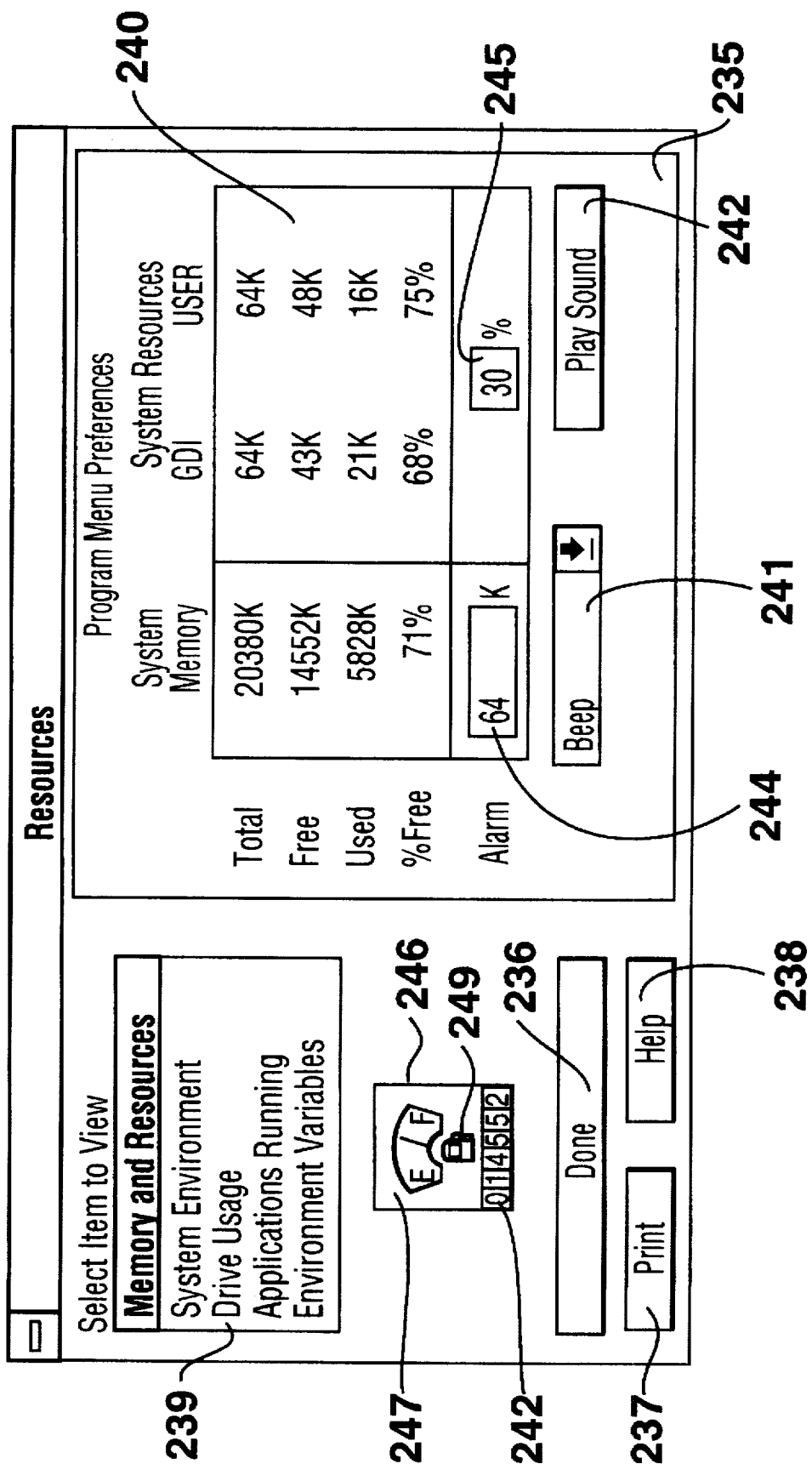

FIG. 41 shows a resources window 235 which may be obtained by placing cursor 56 over resource icon 15 and double clicking mouse button 62. Resources window 235 includes a done button 236, a printer button 237 and a help button 238. An icon 246 includes a "fuel gauge" which shows available system resources and includes an "odometer" 248 which shows available system memory. Icon 246 also includes an alarm signal 249. Icon 246 is identical to resource gauge 15 which appears on dashboard 10. A table 240 gives additional information about system memory usage and system resource usage.

The Windows operating system uses the memory available in your computer to run programs, but it also reserves a portion of memory for its own use for what is known as system resources. The two key components of system resources, called USER and GDI (short for Graphics Device Interface), both reserve their own 64 K bytes of memory. Each running program uses up a portion of system resources memory, and when the available pool of GDI and USER memory runs low, it is impossible to open new programs. In other words, even though a system has sufficient free memory for a program to load, not having enough memory left in the two 64 K sections reserved by Windows means new programs cannot be opened.

Resource gauge 15, keeps track amount of available system resources. Like the gas gauge in an automobile, the needle drops toward empty as the system resources get low. Resource Gauge window 235 can be accessed to get a summary of the resource usage by the GDI and USER components.

In addition to the memory set aside as system resources, the Windows operating system manages the rest of the computer's memory for running programs. Each running program also uses up a portion of this available memory. And much like your system resources, when out of memory, it is impossible to open any new programs.

Within resource gauge window 235, box 244 contains a memory alarm limit and box 245 contains a system resources memory alarm limit. When available system memory dips below the memory alarm limit or available system resources dip below the system resources memory alarm limit, The computer system sounds the sound listed in box 241. In addition, alarm signal 249 blinks red, and eventually remains red. The sound in box 241 may be tried by selecting play sound button 242.

Figure 42:
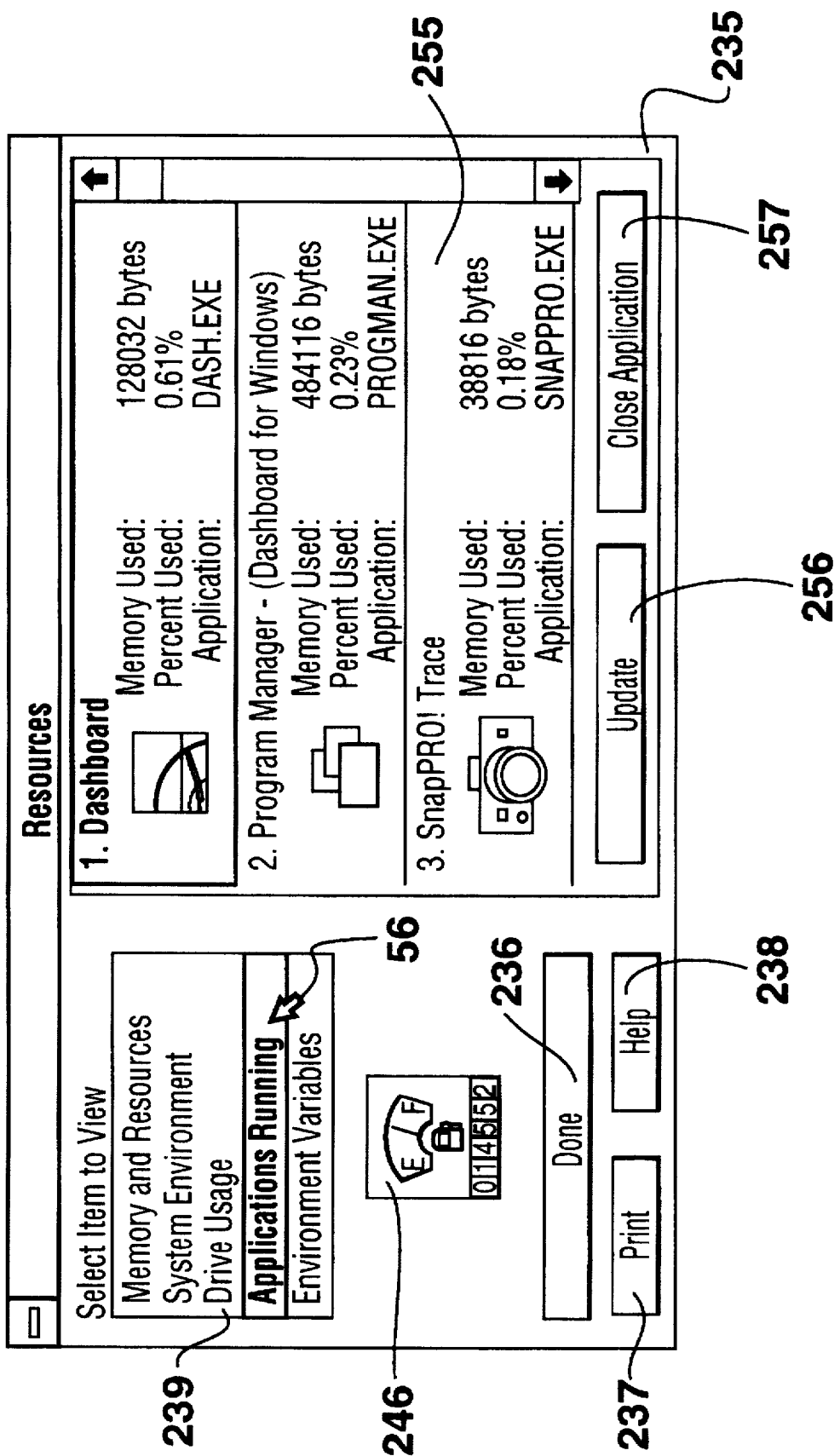

Placing cursor 56 over the "Applications Running" entry in menu 239 and clicking mouse button 62 results in a window 255 appearing, as shown in FIG. 42. Window 255 lists resource usage information for each application currently running. An update button allows updating of each application and a close application 257 allows a selected application to be closed.

Figure 43:
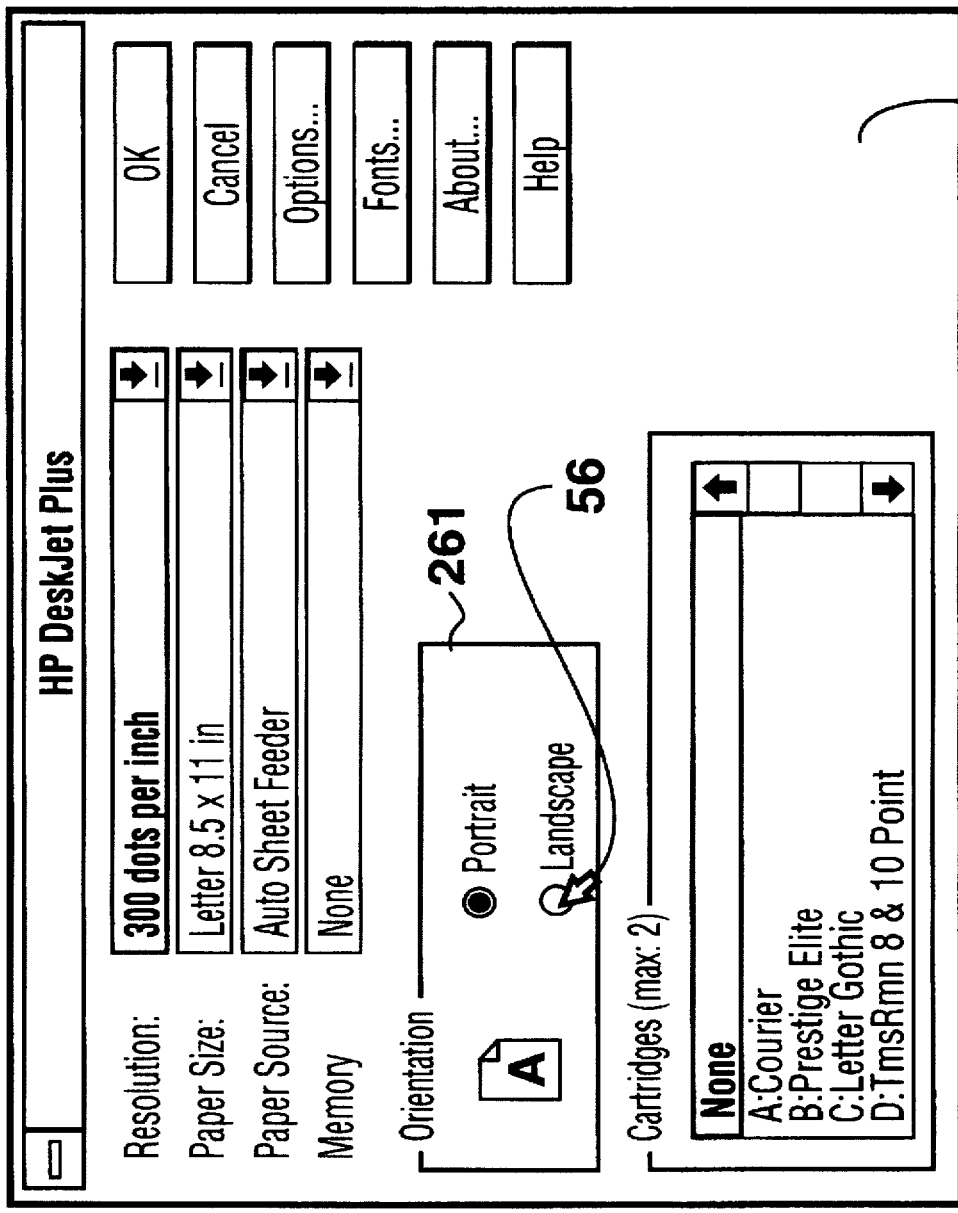
Figure 44:
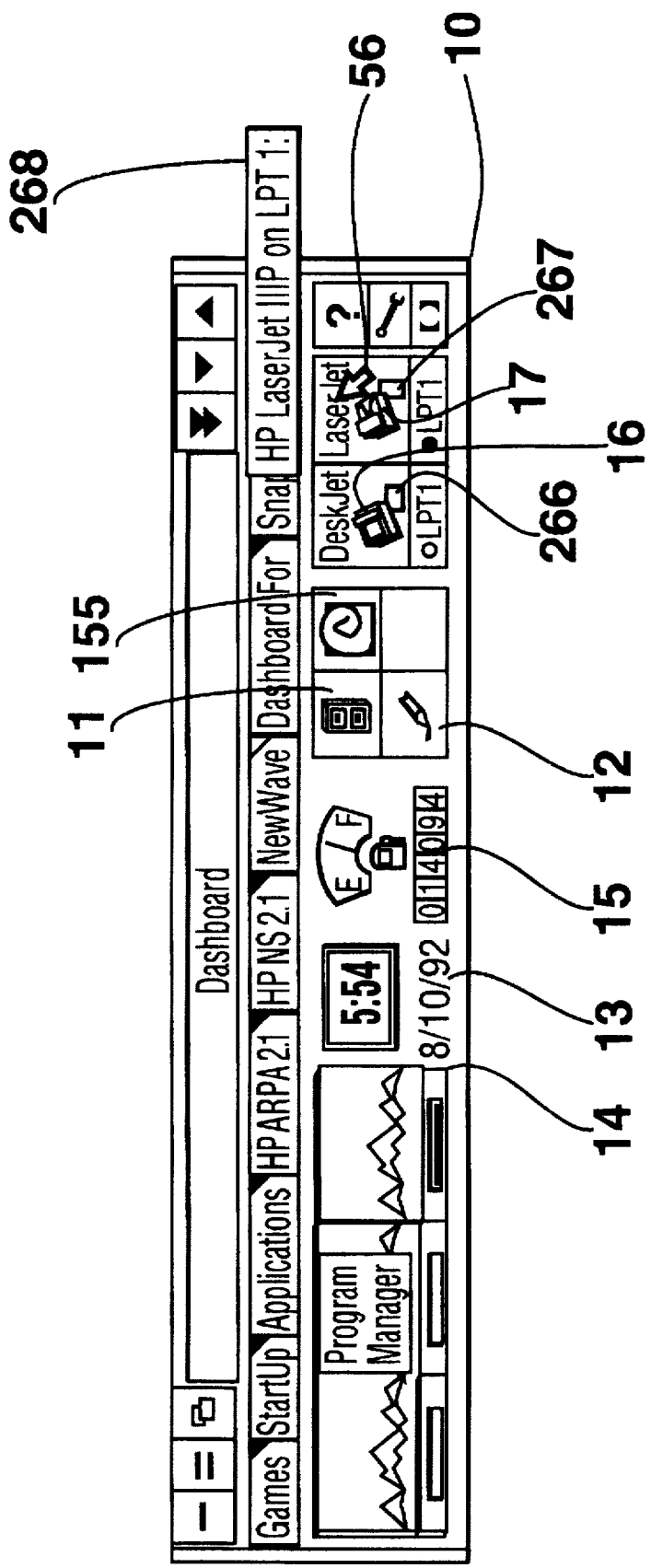

Double clicking on a printer icon results in the appearance of a configuration menu for the printer. For example, placing cursor 56 over printer icon 16 and double clicking mouse button 62 results in the appearance of a configuration window 260 for the HP Deskjet plus printer, as shown in FIG. 43. Configuration window 260 includes a orientation selection box 261. The selected paper orientation is shown in the printer icons of printer manager 32. For example, as shown in FIG. 44, a paper shape 266 within printer icon 16 is shown to be longer in the horizontal direction, indicating the HP Deskjet printer is currently configured in landscape orientation. A paper shape 267 within printer icon 17 is shown to be longer in the vertical direction, indicating the HP Laserjet printer is currently configured in portrait orientation. Also, by placing cursor 56 over printer icon 17 and once clicking mouse button 62, identification information for the printer is displayed in a box 268.

Figure 45:
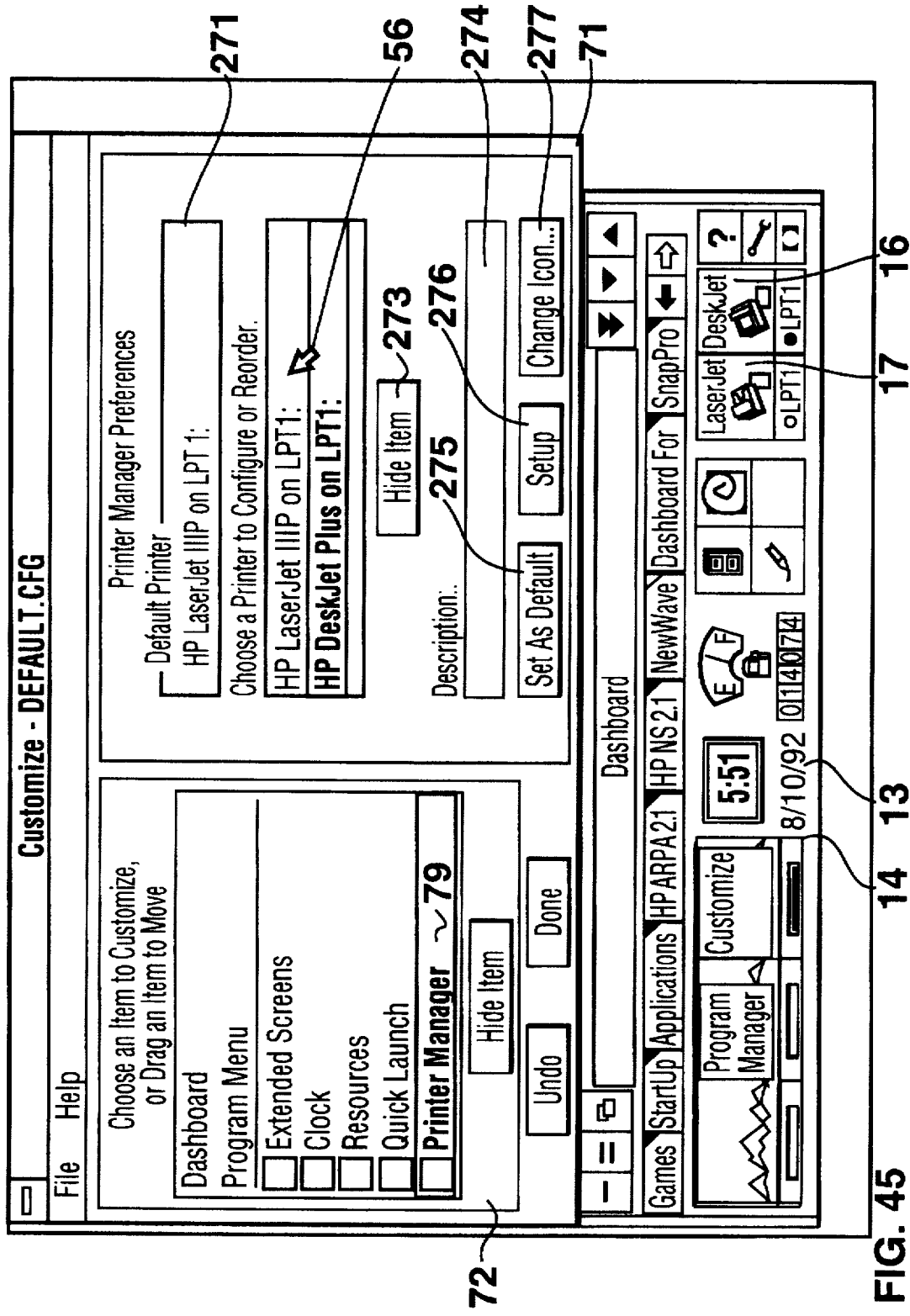

Additional printer control may be accomplished using customize window 71. For example, FIG. 45 shows printer manager listing 79 selected in customize menu 72, resulting in the display of printer manager preferences 270. The current default printer is listed in a box 271. A selection box 272 allows selection of a printer to configure or reorder. Changing of the order which printer icons appear on dashboard interface 10 is done by selecting and dragging entries in selection box 272 to a different ordered location. As shown in FIG. 45, printer icon 17 has in this way been moved to the left of printer icon 16 on dashboard interface 10.

Figure 46:
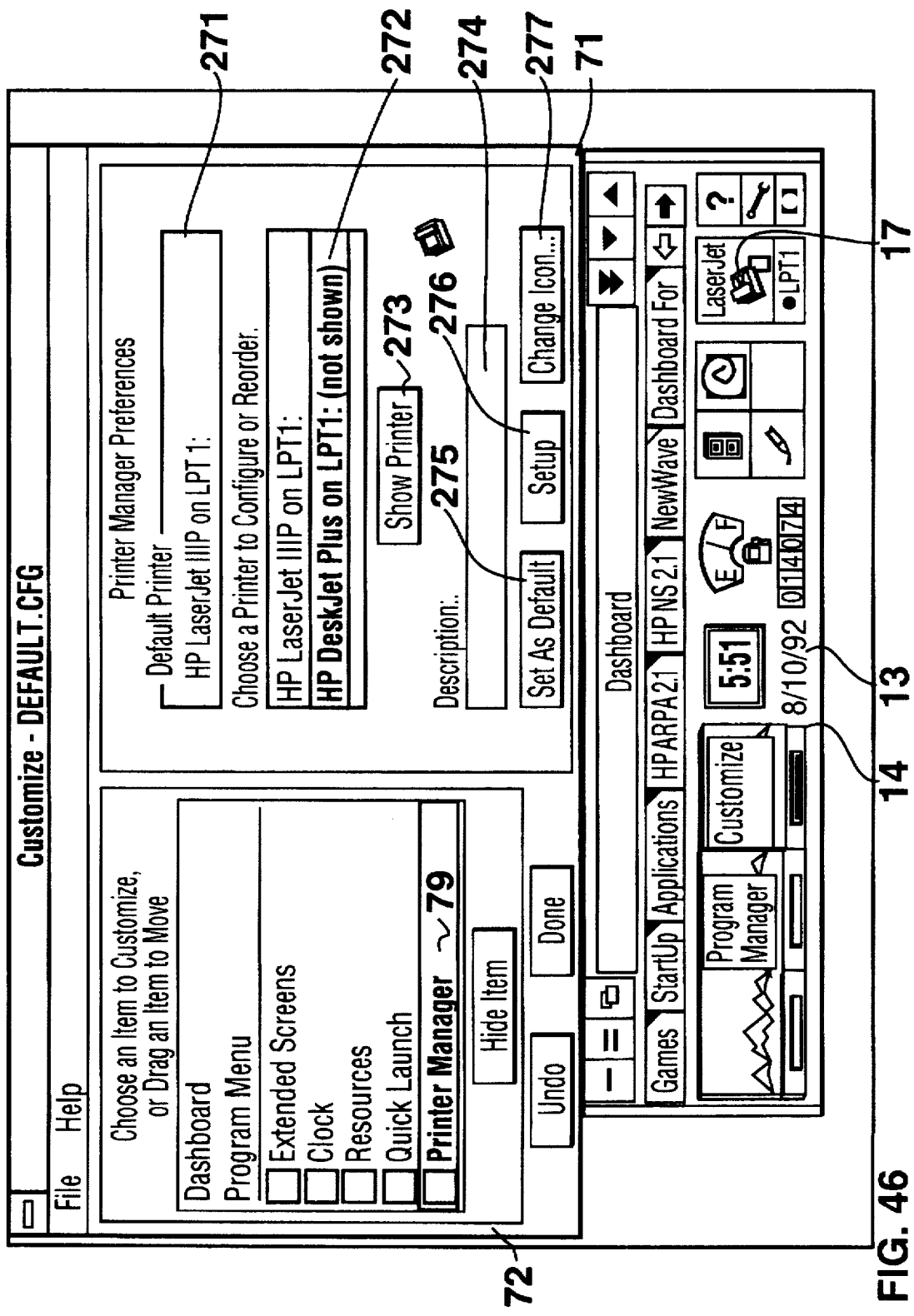

A hide/show printer button 273 is used to hide or show on dashboard interface 10 a printer icon for the printer selected in selection box 272. For example, in FIG. 46, printer icon 16 is no longer displayed. Printer manager preferences additionally include a set as default button 275, a setup button 276, and a change Icon button 277. After selecting change icon button 277, it is possible to scroll through different icons and choose one for the selected printer. Selecting a displayed OK button will cause that icon to appear on the dashboard interface 10.

With Printer Manager 32, printing or faxing a file may be done by dragging and dropping from the File Manager for the Windows operating system onto the dashboard printer icons. To print directly from dashboard interface 10, first open the File Manager. Then, select a file to print. Hold mouse button 62 down while dragging the file to the icon desired printer displayed on the dashboard interface 10. Release mouse button 62 and drop the file onto the printer icon. This will trigger printing. Depending on which program the file was created in, the program may launch and ask for your confirmation to print.

To see more printer icons on dashboard interface 10 at the same time, use sizing bar 160 or sizing bar 161 (shown in FIG. 25) to expand the width dashboard interface 10. However, if the printers icons are on the right-hand side of dashboard interface 10, resizing may not show enough of them because, when you re-size, items on the left-hand side of dashboard interface 10 have priority over those on the right. For example, if there are several quick launch buttons at the left side of dashboard interface 10, they will take higher priority when expanding dashboard display 10. In this case, customize window 71 may be used to reorder the panels so the printer manger 32 is to the left of the quick launch buttons.

Figure 47:
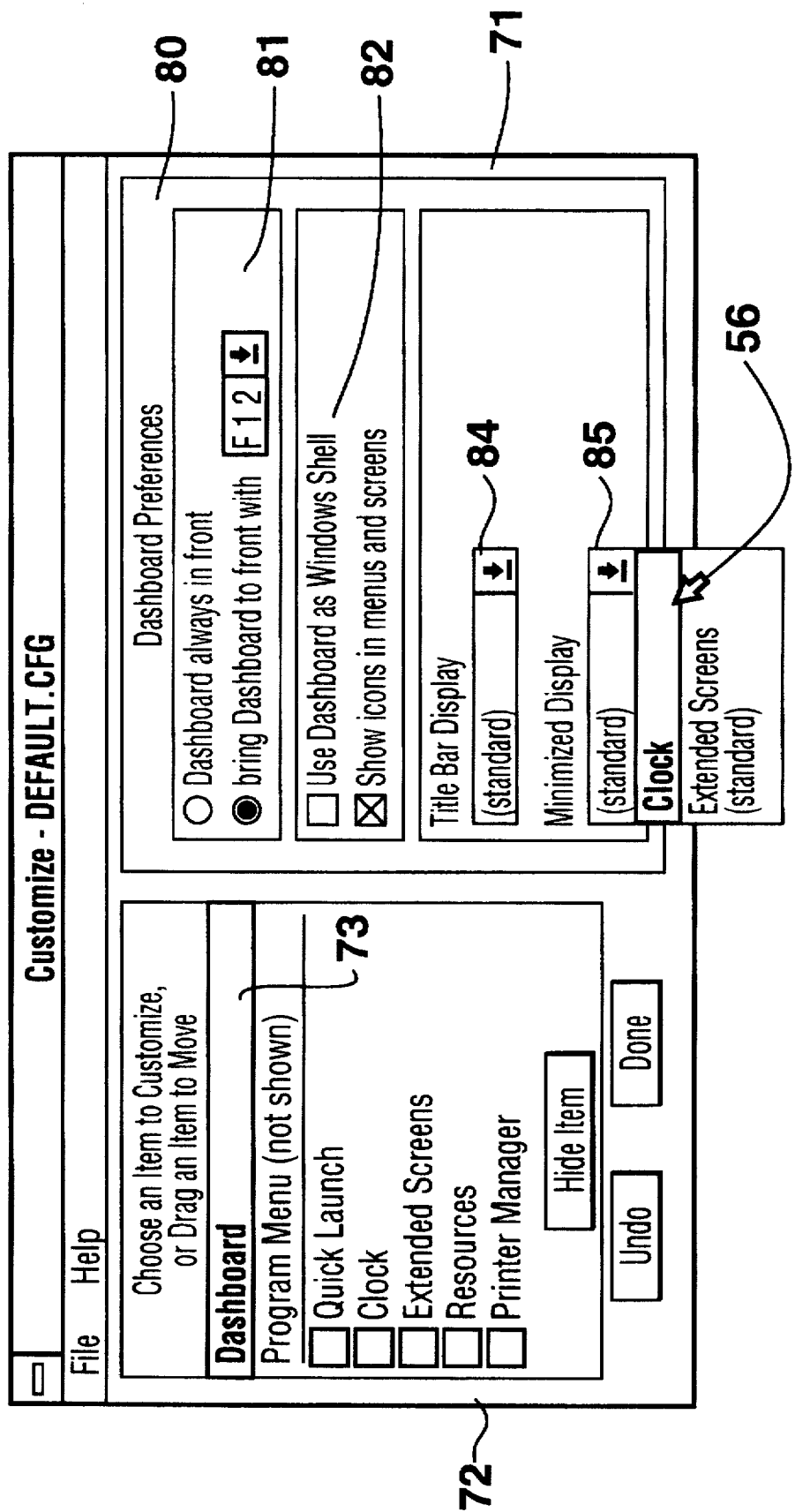
Figure 48:
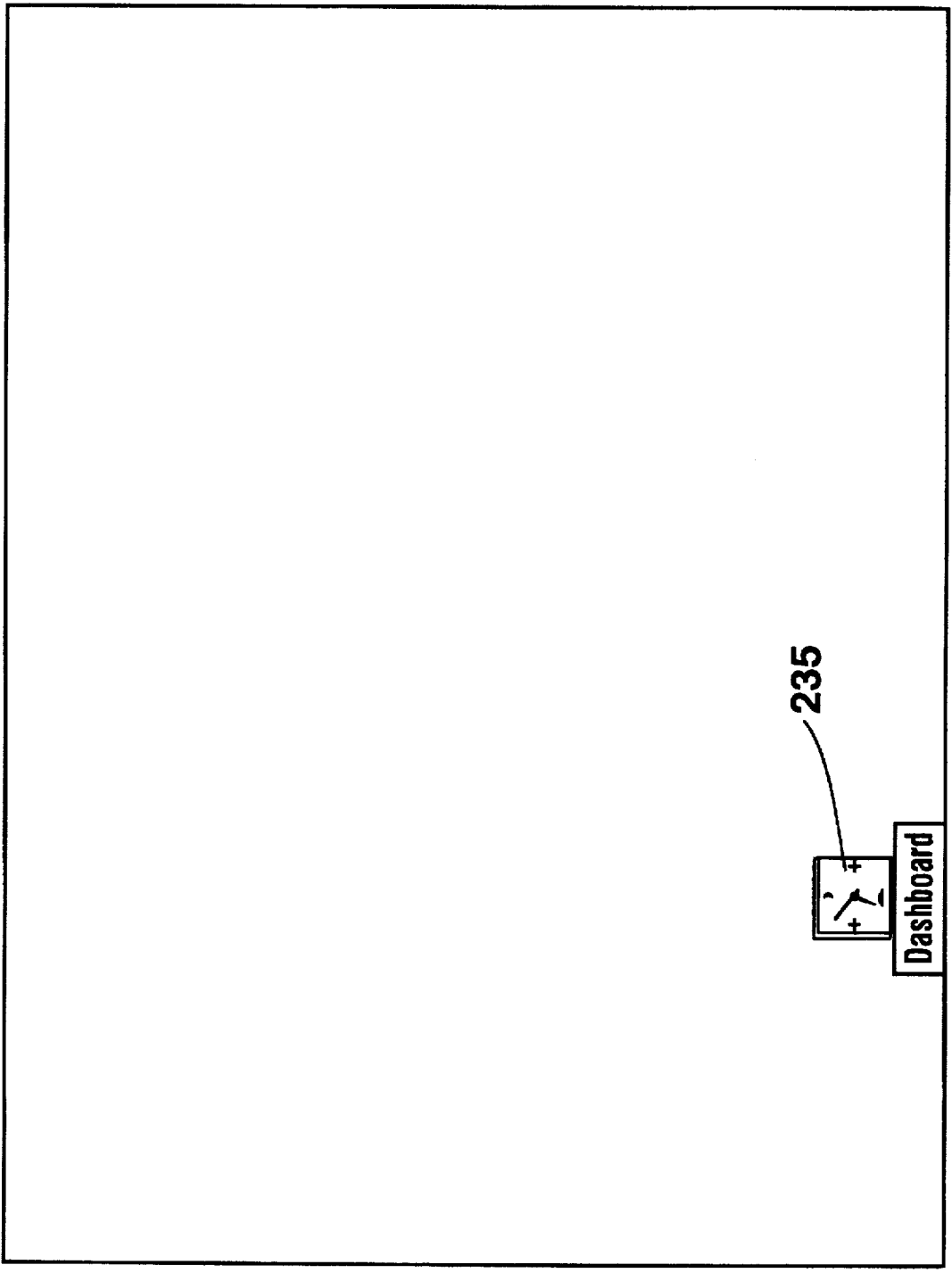

FIG. 47 shows customize window 71 being used to choose an icon for the minimum display of dashboard 10. For example, when the clock is selected, dashboard icon 235 for dashboard 10 is a clock, as shown in FIG. 48.

Figure 49:
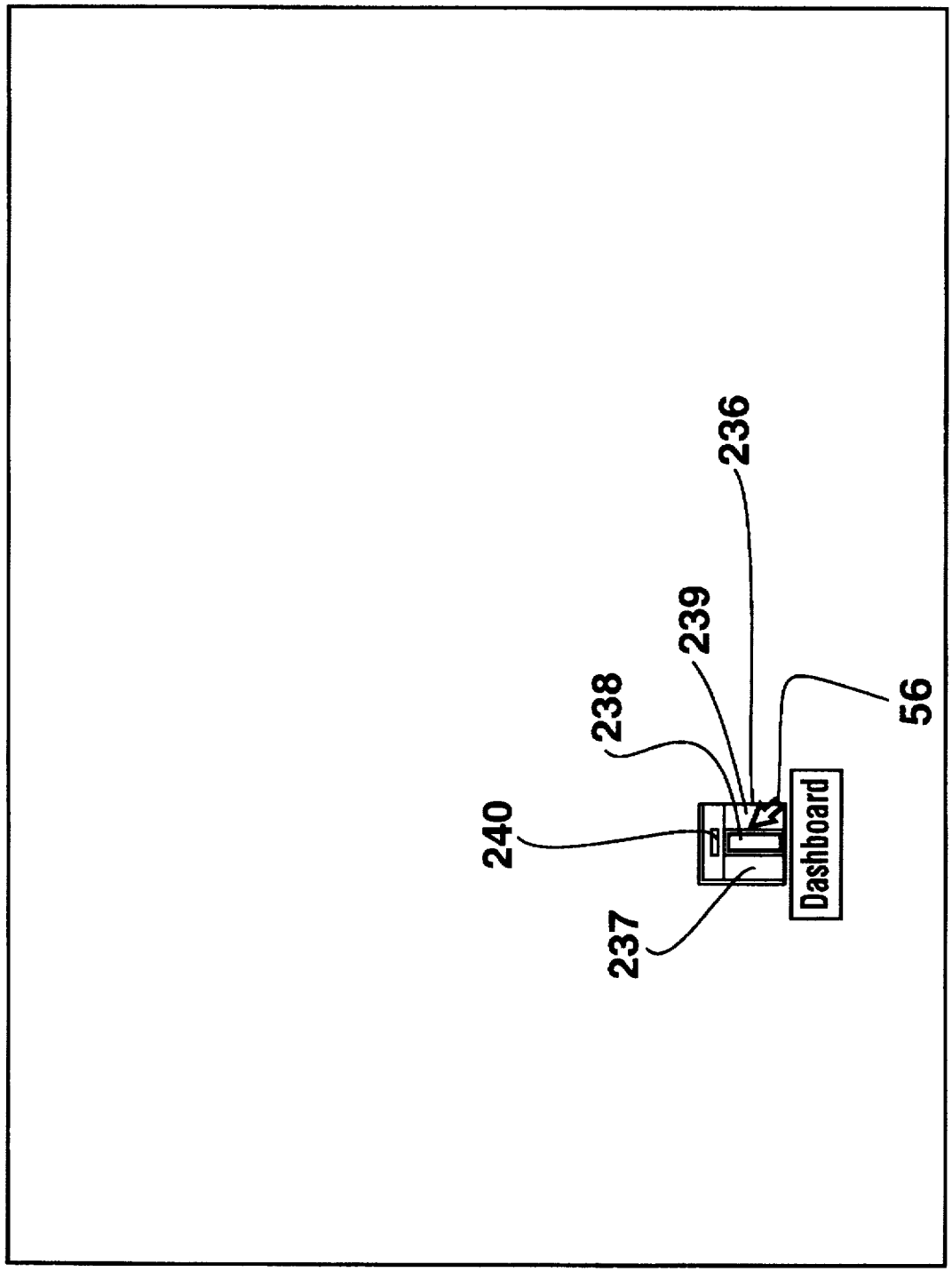
Figure 50:
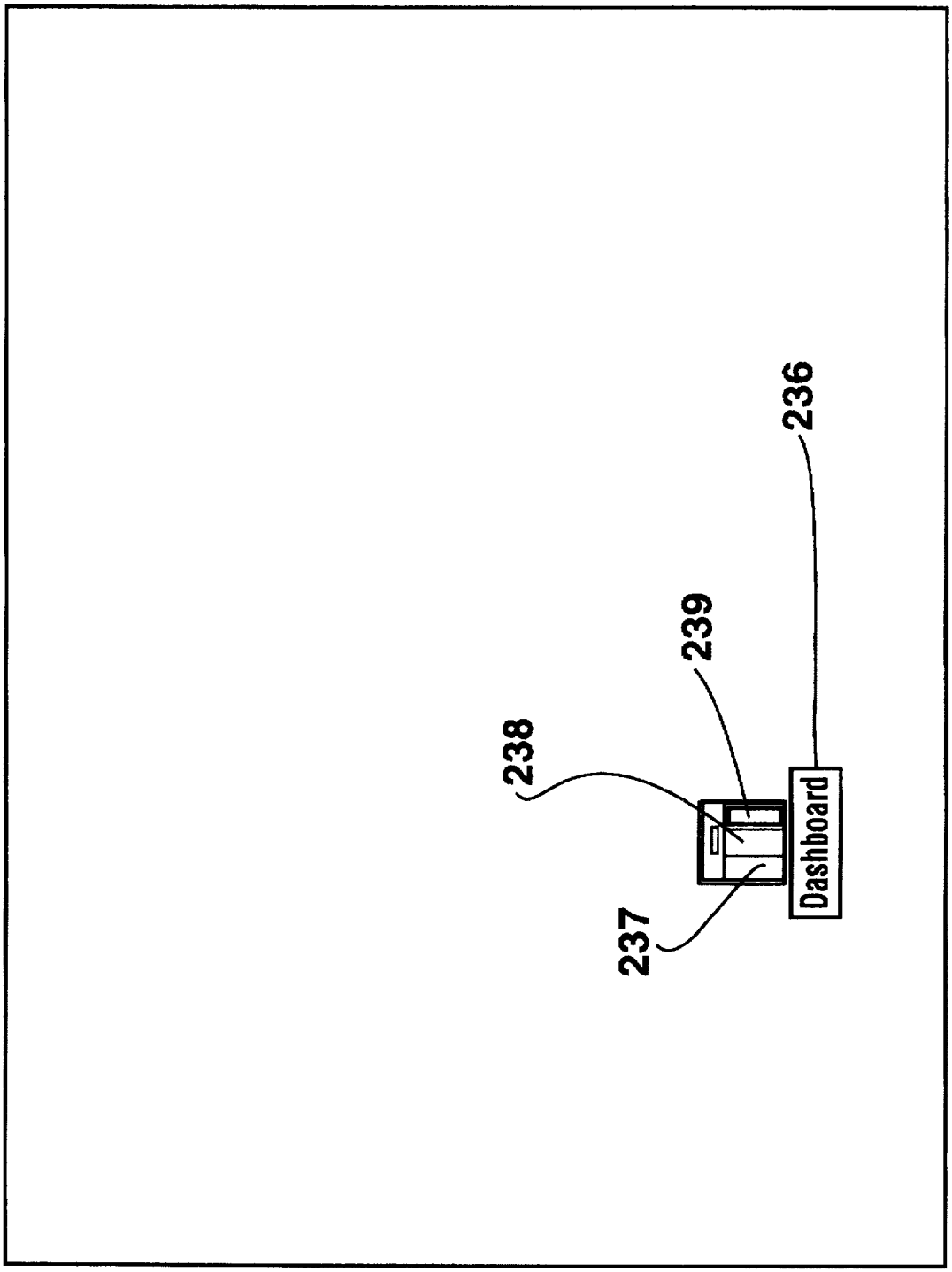
Figure 51:
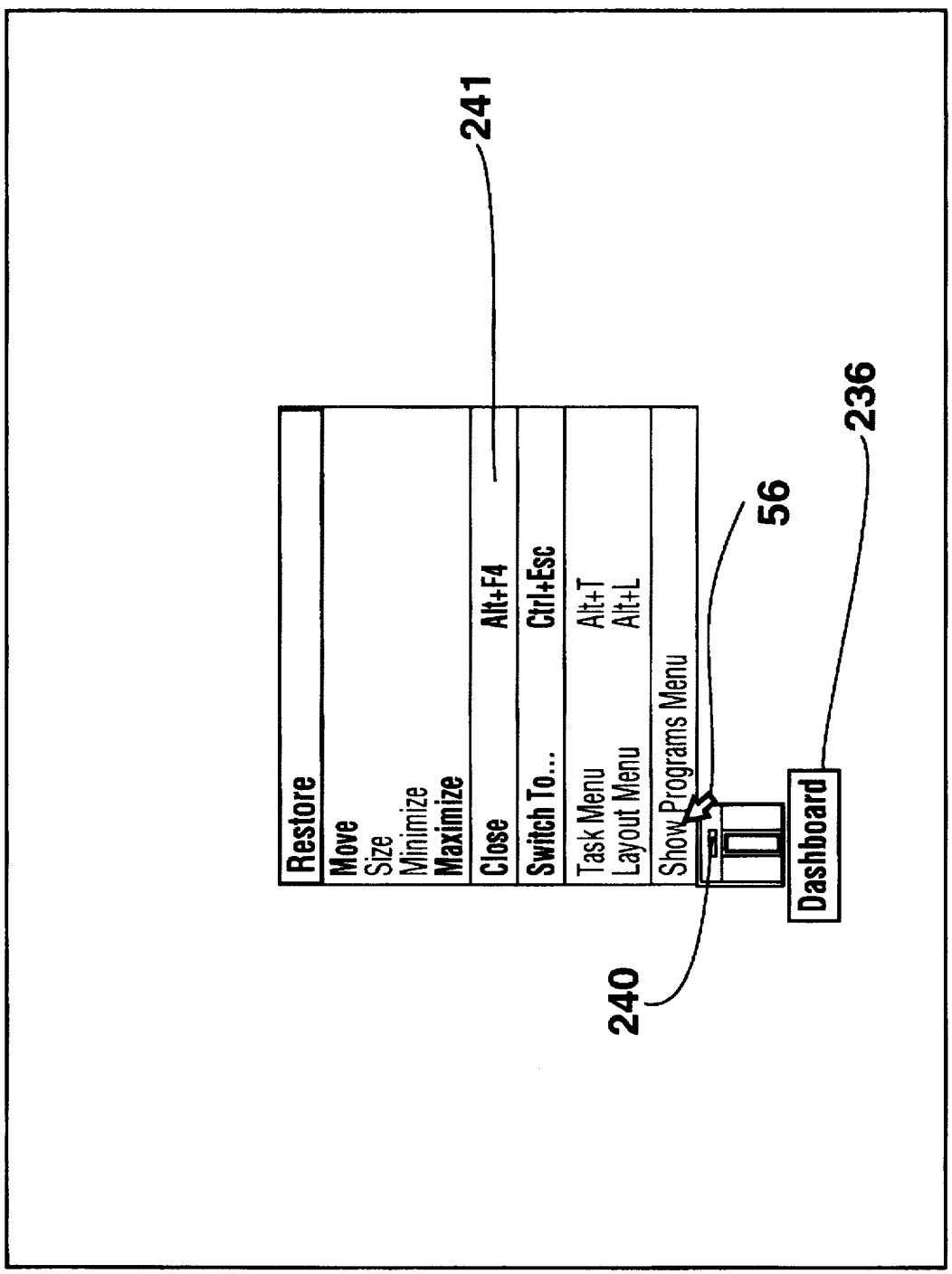

When the Extended screens is selected, dashboard icon 236 allows switching between extended screens. For example in FIG. 49, dashboard icon 236 includes a selection bar 237, a selection bar 238 and a selection bar 239. Each of selection bars 237 through 239 represents an extended screen. In FIG. 49, selection bar 238 is highlighted, indicating the middle extended screen is shown. To select the rightmost extended screen cursor 56 is placed over selection bar 238 and mouse button 62 is clicked. The result is shown in FIG. 50. Selecting a button 241 on icon 240 results in the appearance of a dashboard control menu 241, as shown in FIG. 51.

Figure 52:
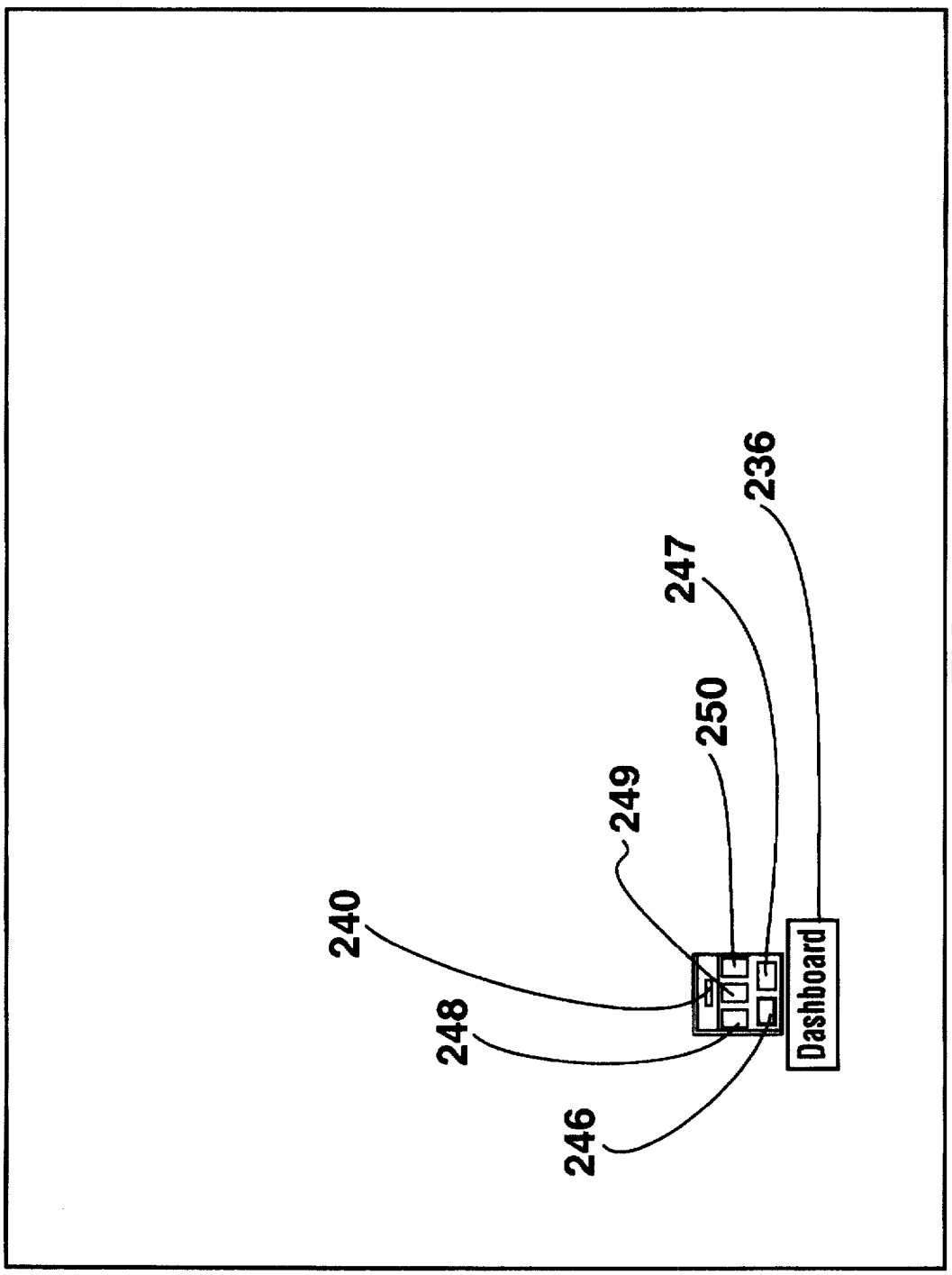

FIG. 52 shows icon 236 for dashboard interface 10 when there are five extended screens. Each of selection bars 246, 247, 248, 249 and 250 represent an extended screen.

Figure 53:
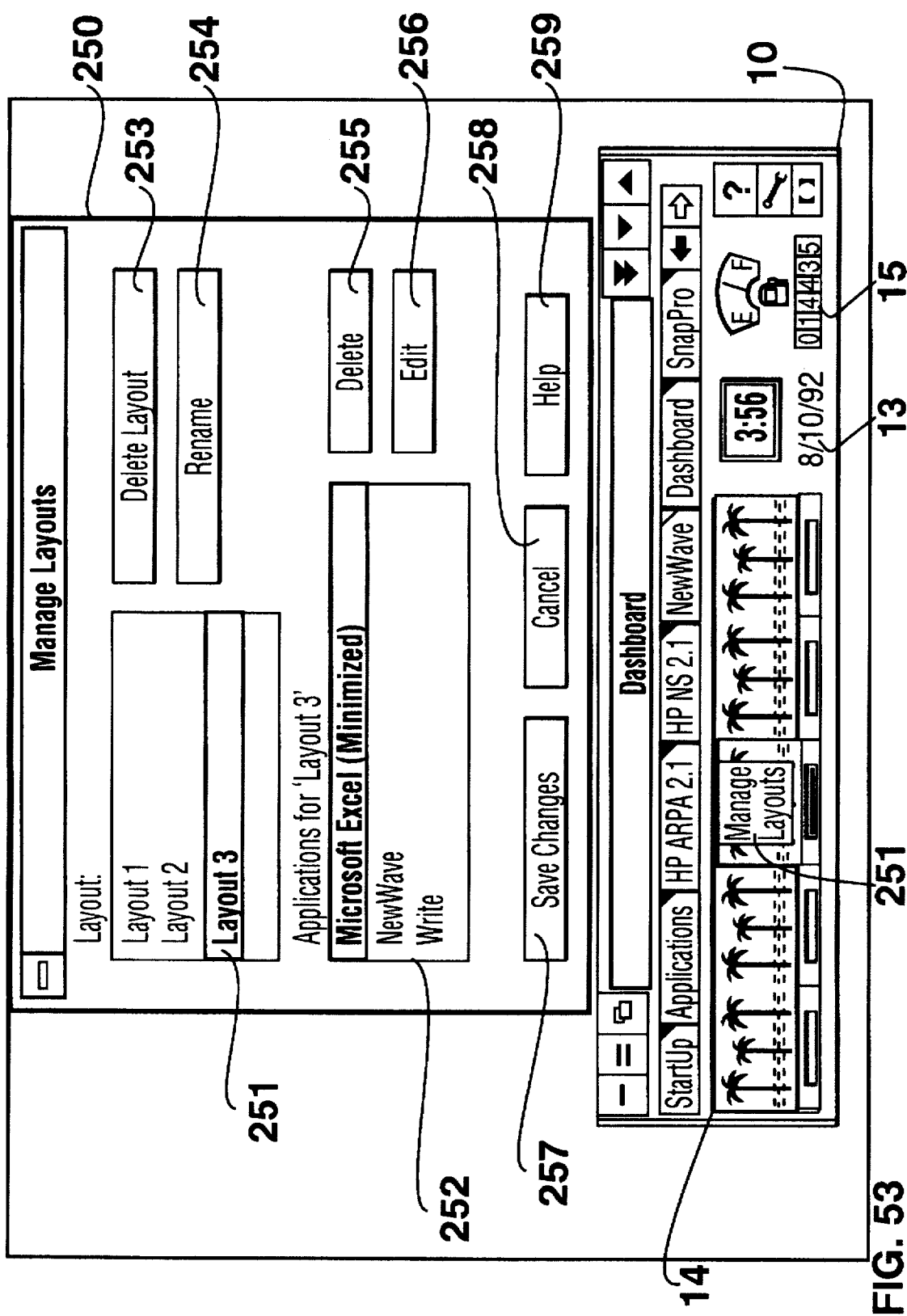
Figure 54:
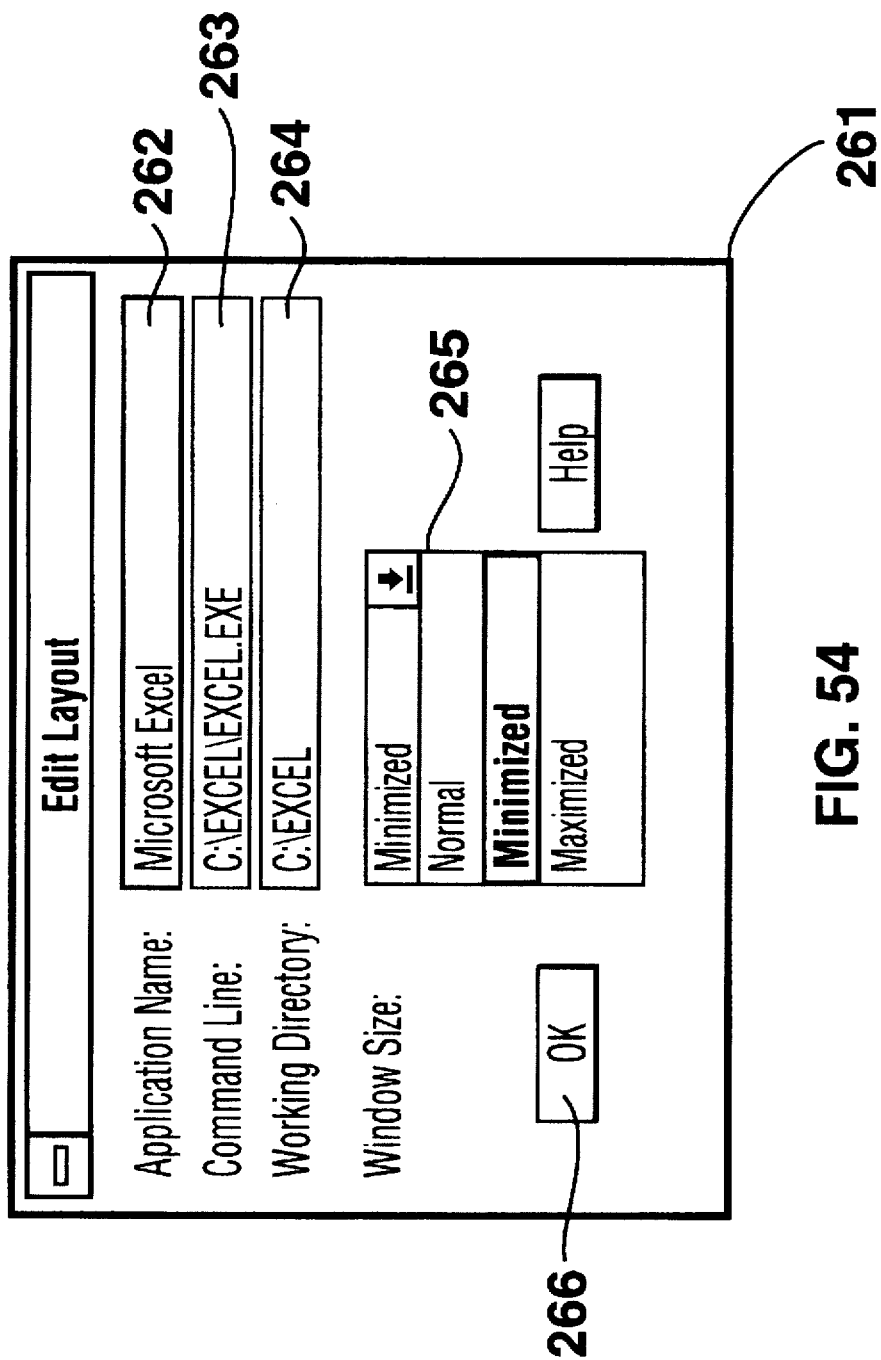

As shown in FIG. 53, selecting manage layouts in menu 230 (shown in FIG. 39), results in the appearance of manage layouts window 250. Selecting "Layout 3" in layout box 251 results in the applications for "Layout 3" being listed in applications box 252.

A layout selected in layout box 251 is deleted by selecting delete layout button 253. The layout selected in layout box 251 is renamed by selecting rename button 254. Manage layouts window 250 also includes a cancel button 258 and a help button 259.

A selected application may be deleted from a selected layout by selecting the application in applications box 252 and selecting a delete button 255.

Selection of an edit button 256 results in the appearance of an edit layout window 261, shown in FIG. 254, for the application selected in applications box 252. Edit layout window 261 includes an application name box 262, a command line box 263, a working directory box 264 and a window size box 265.

After selecting "Normal" in window size box 265, an OK button is selected. Similarly, the NewWave application listed in application box 252 is selected and edited to run in minimized form.

Figure 55:
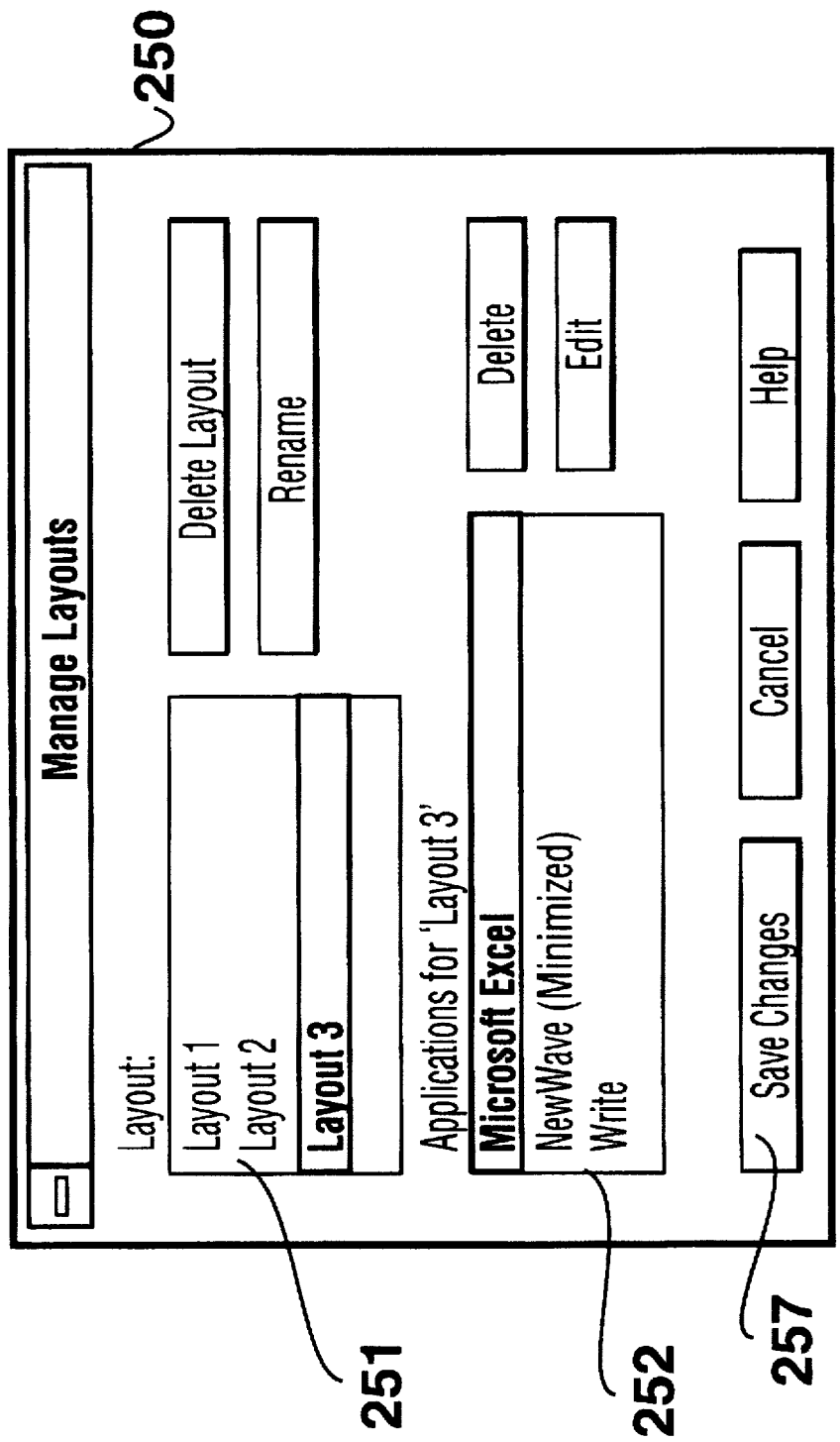

FIG. 55 shows the results in the listings within applications box 252 of manage layouts window 250. Selecting save changes button 257 results in these changes to "Layout 3" being saved.

Figure 56:
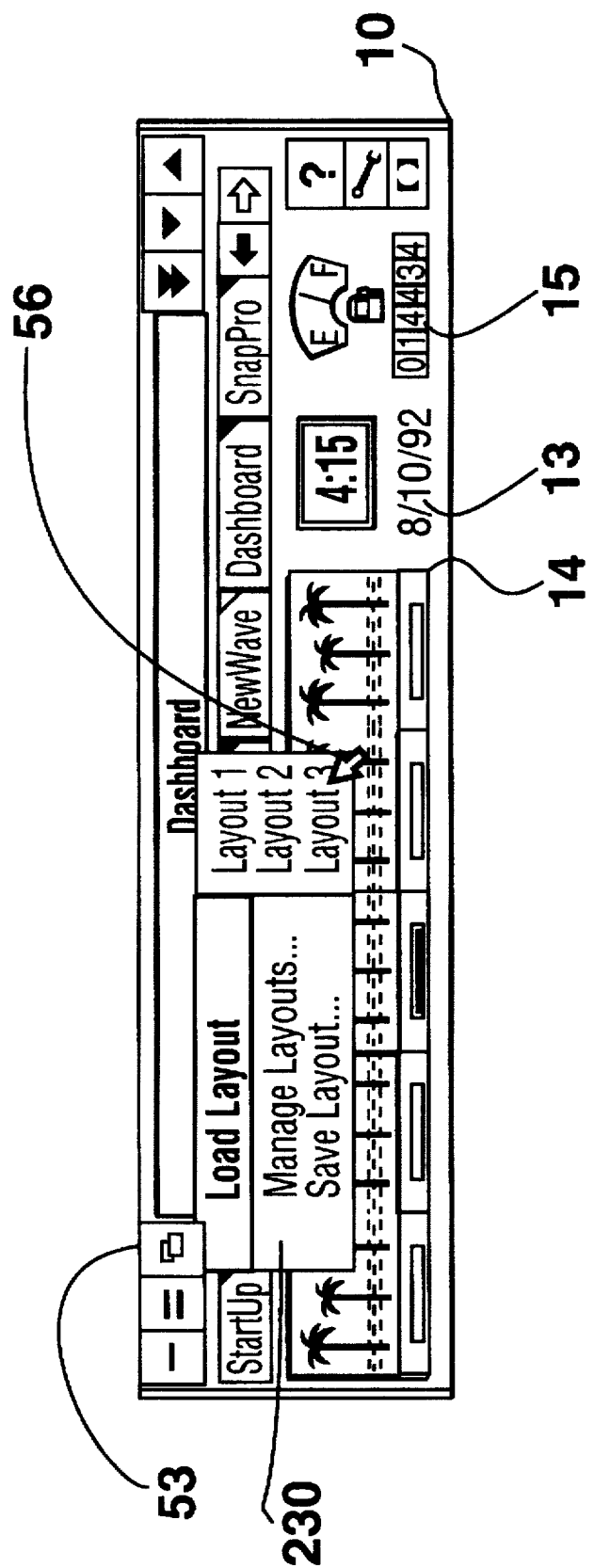
Figure 57:
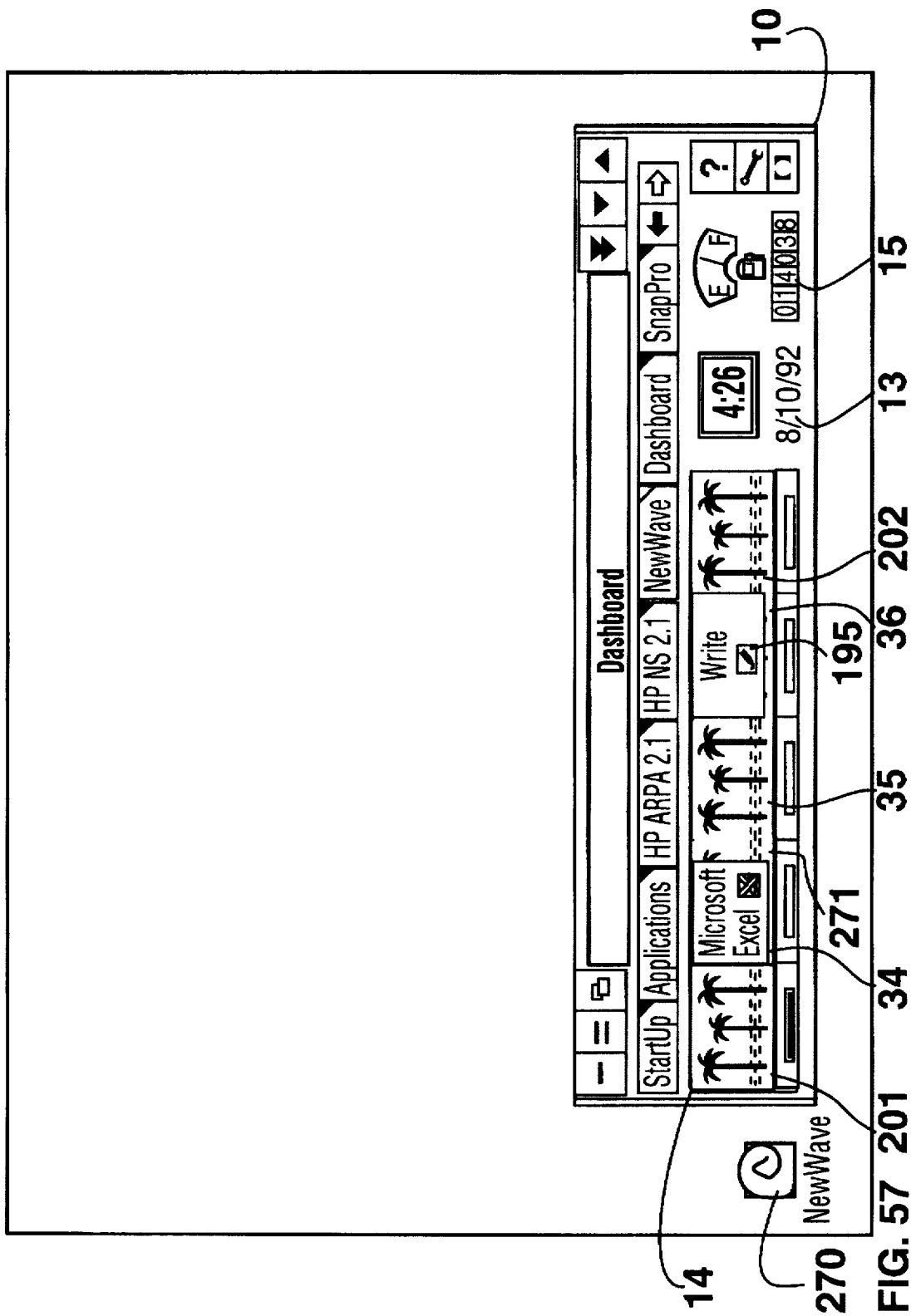

In FIG. 56, using menu 230, brought up by selecting layout menu button 53, "Layout 3" is loaded. FIG. 57 show the NewWave program running in icon form, as represented by icon 270 within the virtual computing screen represented by mini-program window 201. Additionally, FIG. 57 shows MS Write running, as represented by mini-window 195 shown in mini-program window 36, and shows Excel running, as represented by a miniwindow 271 shown in mini-program window 34.

Figure 58:
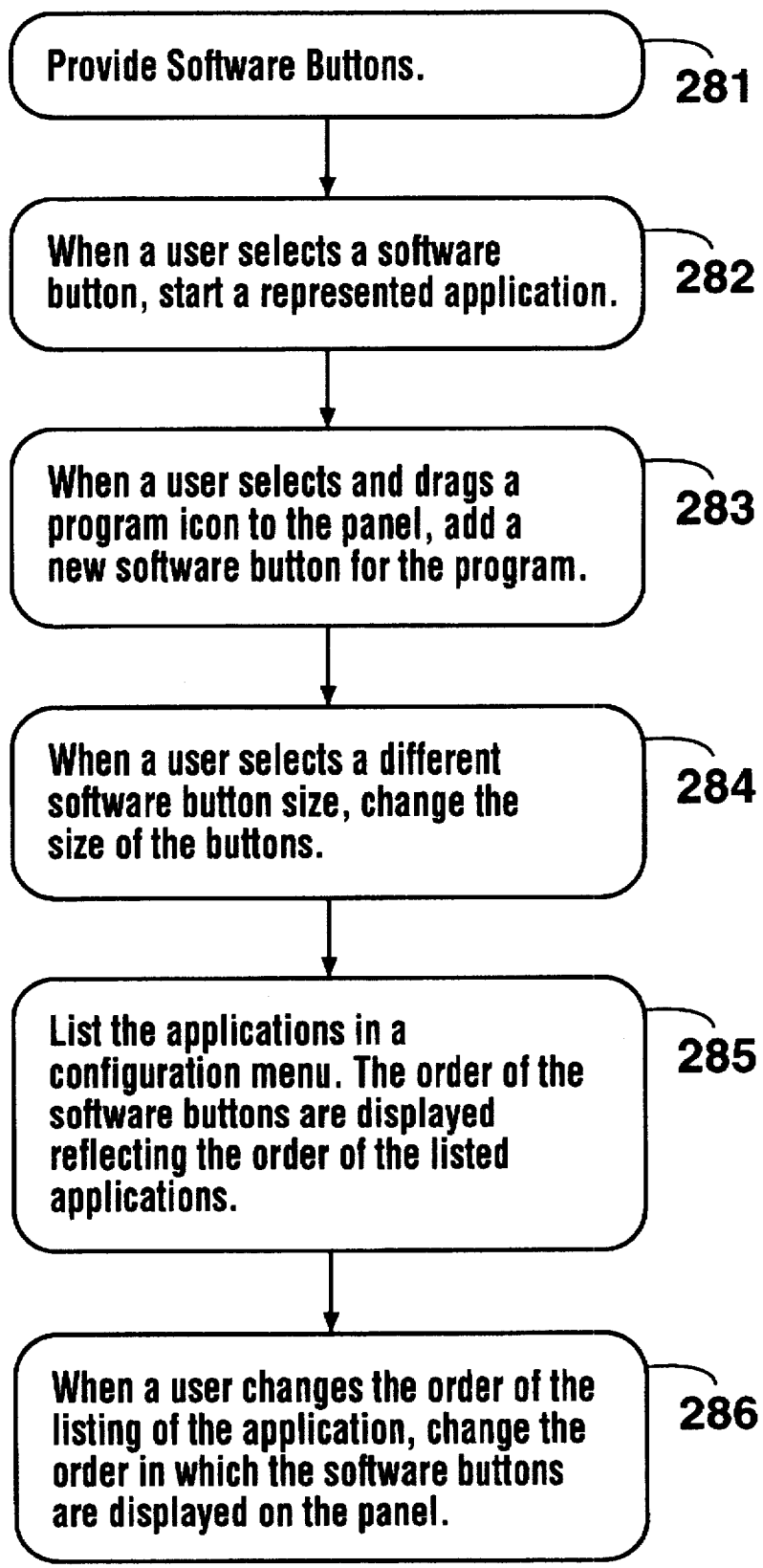
FIGS. 58 through 63 show flowcharts which show implementation of a dashboard interface in accordance with the preferred embodiment of the present invention.

FIG. 58 is a flowchart which shows implementation of a quick launch facility for the start-up of application processes, in accordance with a preferred embodiment of the present invention. In a step 281, a plurality of software buttons is provided on a panel. Each software button represents one of a plurality of applications. In a step 282, upon a user selecting a first software button, a first application represented by the first software button is started. In a step 283, upon a user selecting and dragging a visual representation of a second application to the panel, a new software button representing the second application is added to the panel. In a step 284, upon a user selecting a different software button size in a configuration menu, the size of each software button in the plurality of software buttons is changed. In a step 285, the plurality of applications are listed in a configuration menu. The order in which the plurality of software buttons is displayed on the panel reflects the order of the listing of the plurality of applications. In a step 286, upon a user changing the order of the listing of the plurality of applications, the order in which the plurality of software buttons is displayed on the panel is changed. In Appendix B, example code is shown which implements the actions set out in FIG. 58. For example, on page 32 and 33 of routine DBLIB.C within library DBLIB, the button press is generated. On page 33 of routine DBLIB.C within library DBLIB, the drop message is generated. On page 4 of routine DBAPPS.C within library DBAPPS, the button press is mapped to an application. On pages 3,26 and 27 of routine DBAPPS.C within library DBAPPS, an application is added. On pages 17 through 19 of routine DBAPPS.C within library DBAPPS, a new size is applied. On pages 17 through 19 of routine DBAPPS.C within library DBAPPS and on page 17 of CONFIG.C within library DBAPPS, a new order is applied. On pages 4 and 5 of CONFIG.C within library DBAPPS, a size is chosen. On pages 14,15, and 20 through 22 of CONFIG.C within library DBAPPS, a order is chosen. On pages 4 through 8 of RUN.C within library DBLIB, an application is run. On pages 8 through 10 of ICONS.C within library DASHGRP, a drop message is guaranteed from open group.

Figure 59:
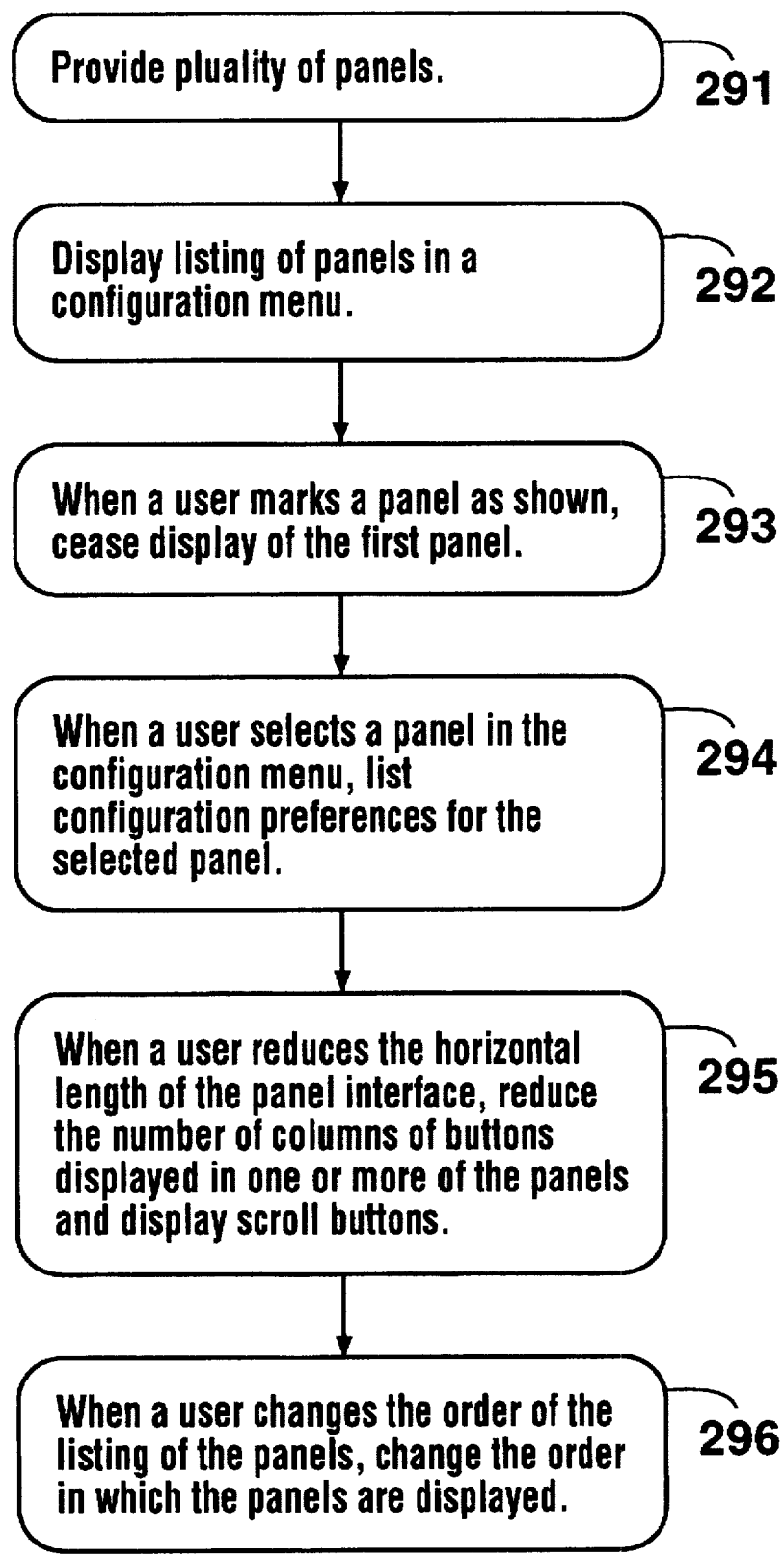

FIG. 59 is a flowchart which shows overall implementation of a dashboard interface, in accordance with a preferred embodiment of the present invention. In a step 291, a first plurality of panels is provided. The panels are displayed horizontally across a computer screen. A first panel from the plurality of panels has a plurality of columns of software buttons. In a step 292, a listing for each of the first plurality of panels is displayed in a configuration menu. An order of the listings determines a horizontal order of the display of panels on the computer screen. In a step 293, upon a user marking a listing for a panel as not shown, display of the panel on computer screen is ceased. For example, the user changes order of the listings by selecting a listing and dragging the listing to a new position in the listings. In a step 294, upon a user selecting a listing for a panel, configuration preferences for the panel are displayed. In a step 295, upon a user reducing the horizontal length of the panel interface, the number of columns displayed in the first panel are reduced. Also, scroll buttons are displayed in the first panel. Upon a user selecting a scroll button in the first panel, the columns displayed in the first panel are scrolled. In a step 296, a listing of each of the first plurality of panels in a configuration menu is displayed. An order of the listings determines a horizontal order of the display of panels on the computer screen.

Upon a user changing the order of the listings, the horizontal order of the display of panels on the computer screen is correspondingly changed.

Additionally, in a first configuration menu, a plurality of entries are listed.

The entries are for software buttons on a first panel. The order in which the plurality of software buttons is displayed on the first panel reflects the order of the listing of the plurality of entries. Upon a user changing order of the listing of the plurality of entries, the order in which the plurality of software buttons is displayed on the first panel is changed.

In Appendix B, example code is shown which implements the actions set out in FIG. 59. For example, see CONFIG.C and DASH.C within library DASH and DBAPPS.C within library DPAPPS, and DBLIB.C within library DBLIB.

Figure 60:
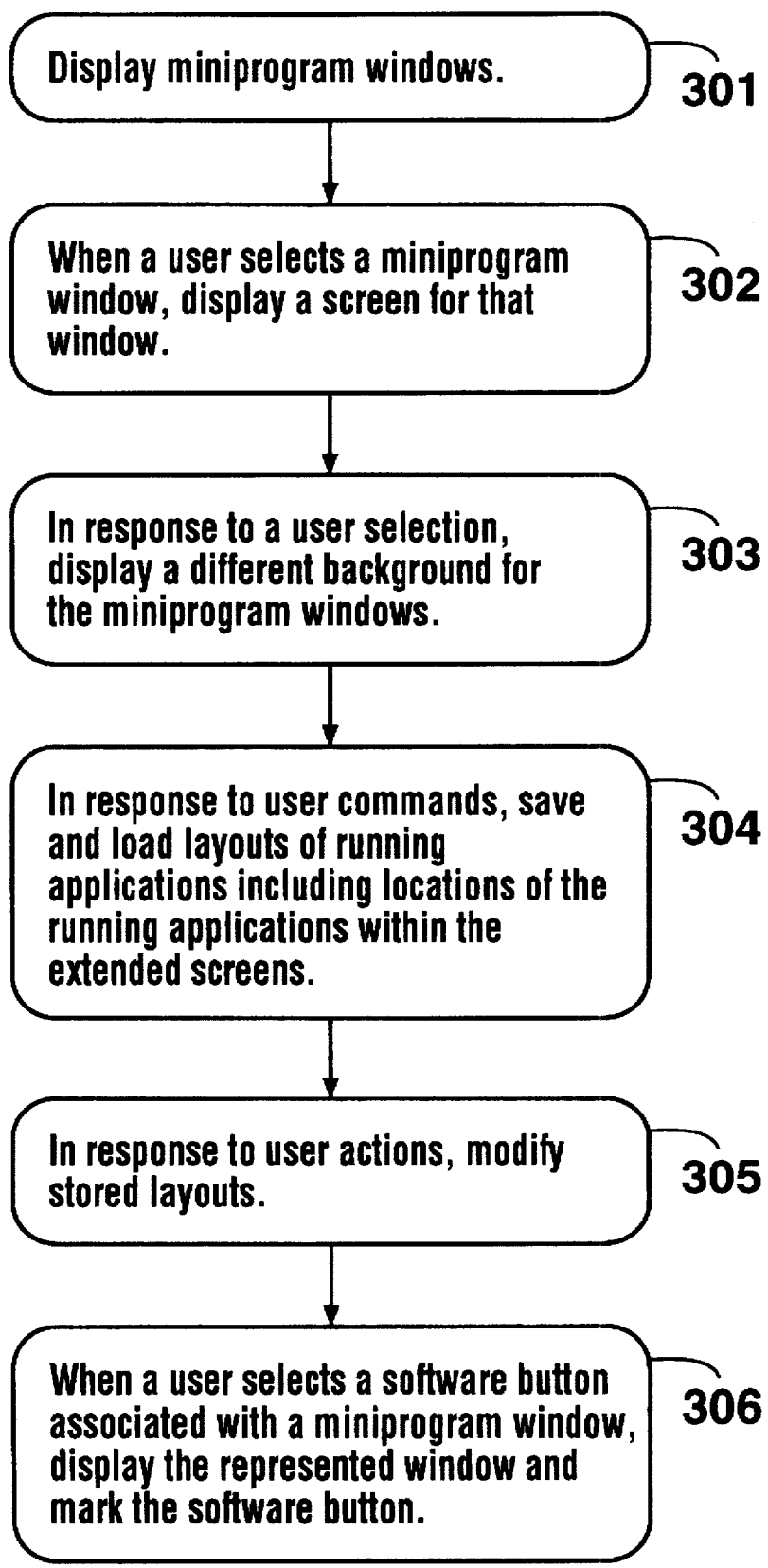

FIG. 60 is a flowchart which shows implementation of an extended screens feature, in accordance with a preferred embodiment of the present invention. In a step 301, a plurality of mini-program windows is displayed.

Each mini-program window has a first background pattern. Each miniprogram window represents a virtual computing screen. Mini-windows shown in the mini-program windows each represent an application window displayed in the represented virtual computing screen. An associated software button is displayed adjacent to each mini-program window. A first mini-window which is greater than a preselected size includes a first icon which identifies a first application which controls a first application window represented by the first mini-window. In a step 302, upon a user selecting a first mini-program window, a first virtual computing screen is displayed which is represented by the mini-program window additionally, it is indicated to the user that the first virtual screen is selected. The user selects the first mini-program window by selecting an associated software button for the first mini-program window. In a step 303, upon the user selecting a second background pattern from a configuration menu, the display of mini-program windows is changed so that each mini-program window has the second background pattern. In a step 304, upon a user selecting a save layout command, a current layout of the virtual screens is stored as a first stored layout. The current layout includes placement of open application windows. Upon the user selecting a load layout command at a later time, the first stored layout of the virtual screens is displayed. The display includes the placement and the size of the application windows. In a step 305, upon the user selecting a modification command, the stored layout is modified. In a step 306, upon a user selecting a first associated software button adjacent to a first miniprogram window, displaying a first virtual computing screen represented by the first mini-program window, and indicating to the user that the first virtual screen is selected. A region on the first associated software button is highlighted to indicate to the user that the first virtual screen is selected. In Appendix B, example code is shown which implements the actions set out in FIG. 60. For example, depending on which background is selected (gConfg.background), the bitmap for the background is painted in routine SCREENS.C page 24, lines 1346–1382. Mini-windows shown in the miniHewlett program windows are implemented by SCREENS.C page 20–24, lines 1159–1296.

The for loop on line 1192 cycles through each application running and draws a mini-window for each one. A user selecting a first mini-program window is implemented at SCREENS.C page 4–5, lines 212–250. When a screen is selected, a WM_COMMAND is sent with ID_CHANGESPACE. This sets the global iCurrentSpace to the selected virtual screen.

Likewise, code at SCREENS.C page 24, lines 1364–1366 indicates to the user the first virtual screen is selected. After the backgrounds for each of the virtual screens has been painted, the background for the selected screen (iCurrentSpace) is painted with a slightly different bitmap. This bitmap indicates that the screen that it's painted in is the selected screen (for example, in the mountain range bitmap, the selected screen has a lighter sky). A second background pattern is selected from a configuration menu at SCREENS.C page 39, lines 2206–2215. When a new background is selected, the current background is set in a global variable (gConfig.background). The new background is painted by a call to InvalidateRect (a Windows routine). This forces the background to be repainted, now with the newly selected background.

An associated software button is displayed adjacent to each mini-program window at SCREENS.C page 39, lines 224S–2261. The "for" loop cycles through each screen. For each screen, it creates a button associated with the screen. The user selects the first mini-program window by selecting an associated software button for the first mini-program window. This is implemented at PUSHB.C, page 1, line 57. When one of the screen's buttons is pressed, a WM_COMMAND, ID_CHANGESPACE is posted. This causes the screen for the selected button to become the active screen. A first icon which identifies a first application is implemented at SCREENS.C - page 22, line 1263.

Inside the "for" loop which paints the mini-windows for each application, a call is made to DrawLilIcon (page 45, lines 2574–2591). This paints an icon which identifies the application.

When the user selects the Save Layout command, the routine CreateLayoutArray (UTIL.C, page 4, lines 214–278) is activated. This creates a data structure which contains the information needed for a layout, including the state of applications running and their placements within the virtual screens. When the user hits the OK button, the layout is saved by code at SAVEDLG.C, page 2, lines 96–105.

When the user selects the Load Layout command, the routine LoadLayout at UTIL.C, page 2, lines 87–213 is called. This restores the data structure saved by the Save Layout command, loads each application specified, and moves each application window to the location where it was saved.

Modify Layout is described at MANAGE.C, page 1, lines 51–485. When the user selects the Manage Layouts command, the current list of layouts (gLayoutList) is copied to a working copy (tempLayoutList) to allow modification. See MANAGE.C, page 2, line 70. If the user hits OK after modifying the layout, the current list of layouts is discarded, and the working copy becomes the current list. See MANAGE.C, page 2, lines 95–96.

Highlighting the button for the selected screen is implemented in PUSHB.C, page 2, lines 84–95. A region is first created within the selected button by taking the bounding rectangle for the button and shrinking it (line 90). This region is then painted with hInBrush. hInBrush is a brush created with the same color as the user-defined active caption color. This brush is used for the selected button to show that it's active.

Figure 61:
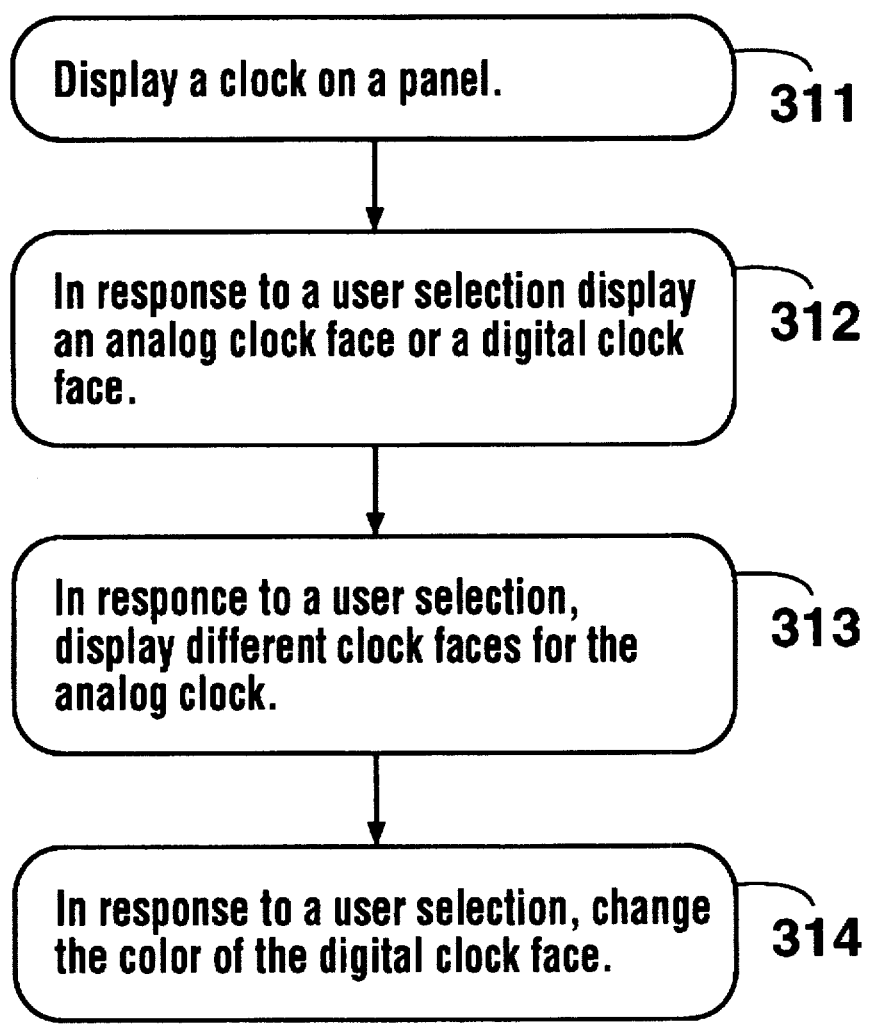

FIG. 61 is a flowchart which shows implementation of a clock display, in accordance with a preferred embodiment of the present invention. In a step 311, clock is displayed on a panel in a computer screen. In a step 312, a user accesses preferences configuration for the clock. Upon the user selecting a digital clock face, a digital clock face for the clock is displayed. Upon the user selecting an analog clock face, an analog clock face for the clock is displayed. In a step 313, upon the user selecting a first analog clock face style, the first analog clock face style for the clock is displayed. Upon the user selecting a second 5 analog clock face style, the second analog clock face style for the clock is displayed. In a step 314, upon the user selecting a first color, the digital clock face is displayed using the first color. Upon the user selecting a second color, the digital clock face is displayed using the second color.

Figure 62:
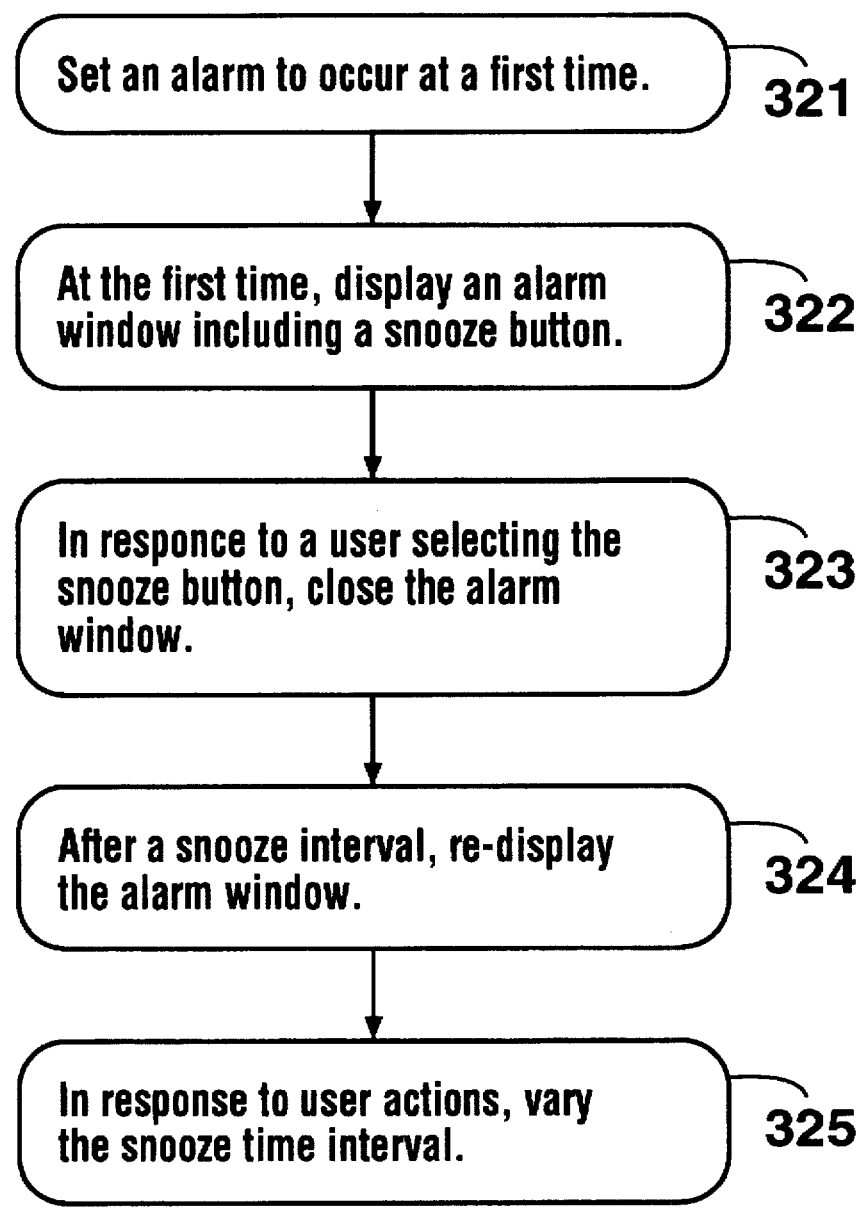

FIG. 62 is a flowchart which shows an implementation of a snooze alarm, in accordance with a preferred embodiment of the present invention.

In a step 321, in response to a user command, an alarm is set to occur at a first time. In a step 322, at the first time an alarm window is displayed. The alarm window includes a snooze software button. In a step 323, upon the user selecting the snooze software button, the alarm window is closed. In a step 324, after passage of a snooze time interval from the first time, the first alarm window is re-displayed. In a step 325, in response to a user command, the snooze time interval is varied.

In Appendix B, within DBCLOCK.C is shown code which implements the actions set out in FIGS. 61 and 62.

For example, display of a clock is implemented at page 4, lines 212–243 of DBCLOCK.C. The clock's window is passed into the routine PaintClock. This is a window within the dashboard's main window. In PaintClock, the clock face is painted onto this window.

Displaying a digital clock face is implemented in DBCLOCK.C at page 11, line 641. When a digital clock face is selected, the global variable gClockConfig type is set to CLOCKCONFIG_DIGITAL. In the routine DisplayTime (page 15, lines 831–1021), this variable is checked to determine which type of time display to use. In DBCLOCK.C at page 11, line 630, when an analog face is selected, the global variable gClockConfig. type is set to CLOCKCONFIG_ANALOG. In the routine DisplayTime (page 15, lines 831–1021), this variable is checked to determine which type of time display to use.

Selecting an analog clock face style is implemented in DBCLOCK.C beginning at page 11, line 657. When a clock face is selected, the global variable gClockConfig.face is set to the selected clock face. The routine GetClockBitmap (page 18, lines 1044–1098 of DBCLOCK.C) loads the bitmap for the selected face.

The routine PaintClock (page 4, lines 212–243 of DBCLOCK.C) then uses this bitmap to paint the clock face.

Changing the clock face is shown implemented beginning at page 11, line 657 of DBCLOCK.C. Changing the digital clock color is implemented beginning at page 11, line 657 of DBCLOCK.C. When a color is selected, the global variable gClockConfig.face is set to the color (in effect, different colors are considered different "faces" for the digital clock). In the routine DisplayTime (page 15, line 958 of DBCLOCK.C), the digits are displayed using a brush of the given color.

Changing to another color is implemented beginning at page 11, line 657 of DBCLOCK.C. When another color is selected, a new brush is created (page 19, lines 1078–1096 of DBCLOCK.C) of the selected color. This brush is used to paint the digits in the newly selected color.

Setting an alarm is implemented at page 31, lines 1802 through 1860 of DBCLOCK.C. When the user creates a new alarm, information is retrieved from the dialog box, including the time of the alarm and the text of the alarm.

This information is saved by calling AddAlarm (page 26, line 1518 of DBCLOCK.C).

Displaying an alarm is implemented at page 21, lines 1230–1247 of DBCLOCK.C. The routine ShowAlarm is called to put up an alarm window.

Selecting the snooze button is implemented at page 24, lines 1368–1383 of DBCLOCK.C. When the Snooze button is selected, the current alarm is set to a new state (ALARMSTATE_SNOOZING. The Alarm window is then closed by calling EndDialog (Windows routine, line 1381).

Redisplaying a snoozed alarm is implemented at page 21, lines 1209–1225 of DBCLOCK.C. In the routine CheckAlarms, the state of all alarms is checked. If one is in the state ALARMSTATE_SNOOZING, and the snooze interval has passed (gClockConfig.snoozeInterval), the alarm is displayed.

Varying the snooze time interval is implemented at page 11, lines 602–624, and line 669 of DBCLOCK.C. When the user selects a new snooze interval, the global variable gClockConfig.snoozeInterval is changed to the new interval.

Figure 63:
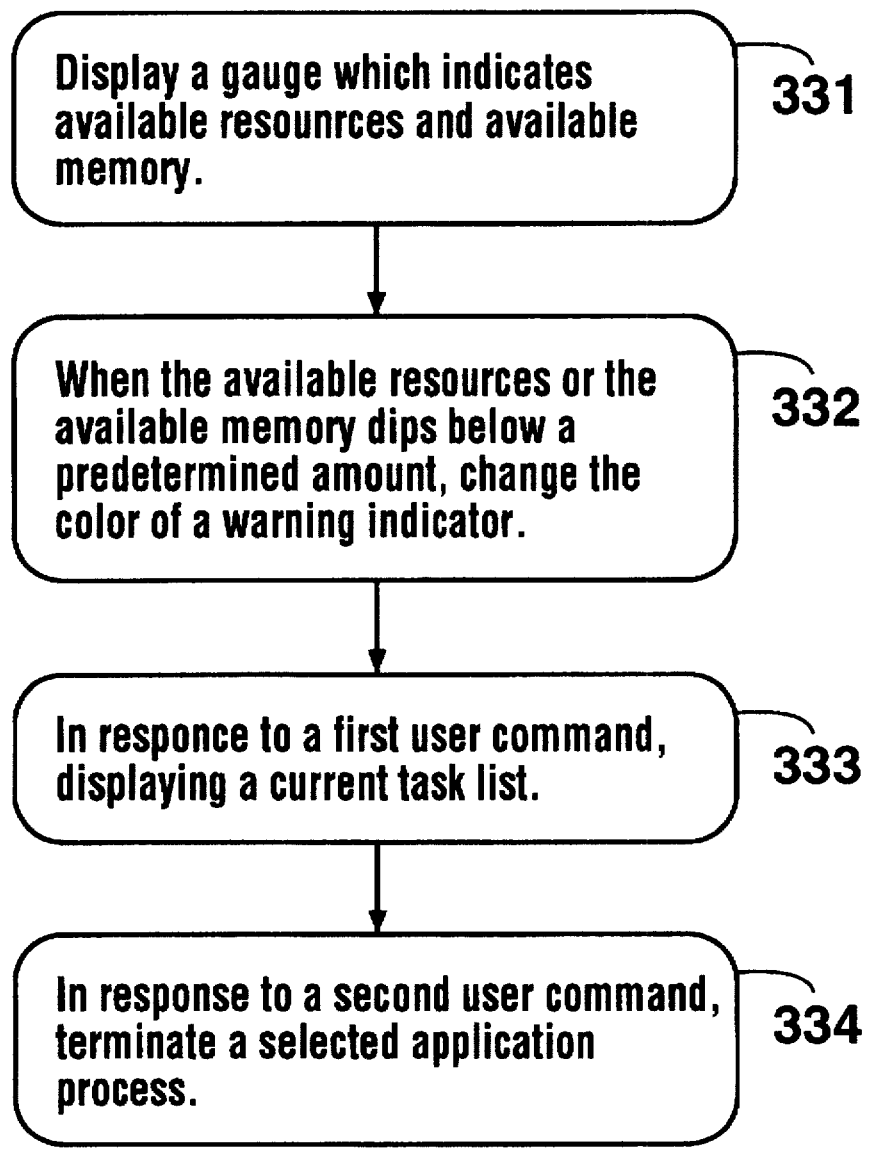

FIG. 63 is a flowchart which shows an implementation of a resource gauge, in accordance with a preferred embodiment of the present invention. In a step 331, a first gauge is displayed on a panel. The first gauge indicates an amount of resources available to a user of the computing system. For example, the first gauge has an appearance similar to an automobile gas gauge. Also displayed on the panel is an indication of the unused memory available to the user. For example, the indication has an appearance similar to an automobile odometer. In a step 332, upon the amount of resources available to the user becoming less than a first preselected amount, a warning is given to the user. Upon the amount of unused memory available to the user becoming less than a second preselected amount, a warning is given to the user. The warning includes changing the color of a portion of the panel. In a step 333, in response to a first user command, a task list of currently running application processes is displayed. In a step 334, in response to a second user command, a currently running application process which the user has selected from the task list is terminated. In Appendix B, within SYSRES.C and TASKMSTR.C there is shown code which implements the actions set out in FIG. 63.

A printer manager is implemented as follows in accordance with a preferred embodiment of the present invention. In a first step a printer icon and a printer indicator button are displayed for each printer for which the computing system is configured. In a second step upon selection of the printer icon for a first printer, a label describing the first printer is displayed. In a third step upon selection of the printer indicator button for the first printer, designating the first printer as a default printer for the computing system. For example, this includes placing an indication within the printer indicator button that the first printer is the default printer. In a fourth step upon a user double selecting the printer icon for the first printer, a configuration window for the first printer is displayed. In a fifth step a first image of a sheet of paper is displayed within a first printer icon for a first printer. The sheet of paper is oriented in a landscape orientation when the printer is configured to be in a landscape mode and the sheet of paper is oriented in a portrait orientation when the printer is configured to be in a portrait mode. In a sixth step upon a user configuring the first printer from the landscape mode to the portrait mode, the display of the first image of the sheet of paper is changed from being oriented in the landscape orientation to being oriented in the portrait orientation. Upon the user configuring the first printer from the portrait mode to the landscape mode, changing the display of the first image of the sheet of paper from being oriented in the portrait orientation to being oriented in the landscape orientation.

In Appendix B, example code is shown which implements the actions of the printer manager described above. For example, see DBPRINT.C within library DBPRINT.

Table 1 below gives a description of messages sent between the main routine for Dashboard and the various panels:

TABLE 1

| Message: | WM_LAYOUT |
|---|---|
| Source: | Panel |
| wParam | Window handle of panel. |
| lParam: | Size requested by panel. |
| Description: | Used by panels to inform the Dashboard that their size or appearance may have changed, causing the Dashboard to refresh its layout. The panel is identified by the value of wParam. The panel may request that a particular number of its units be displayed by placing this number in lParam. For example, if Quick Launch wanted 8 buttons to be |

TABLE 1-continued

| | displayed, it would set lParam = 8. |
|---|---|
| Message: | WM_CONFIG |
| Source: | Panel |
| wParam | Window handle of panel. |
| lParam: | not used. |
| Description: | Used by panels to have the Dashboard display their preferences dialog box. The panel is identified by the value of wParam. |
| Message: | WM_CONFIGCHANGED |
| Source: | Panel |
| wParam | Window handle of panel. |
| lParam: | not used. |
| Description: | Used by panels to mark their configuration as "dirty" so that the Dashboard will save it to disk. The panel is identified by the value of wParam. |
| Message: | WM_CONFIGDONE |
| Source: | Dashboard |
| wParam | not used. |
| lParam: | not used. |
| Description: | Sent by Dashboard to all panels to inform them that the preferences dialog box has been closed. Panels may use this message to update themselves as necessary. |
| Message: | WM_UPDATECAPTION |
| Source: | Panel |
| wParam | not used. |
| lParam: | not used. |
| Description: | Used by a panel which is displaying information in the Dashboard's title bar to force the Dashboard to update this information. |
| Message: | WM_DATACHANGED |
| Source: | Panel |
| wParam | Window handle of panel. |
| lParam: | not used. |
| Description: | Used by panels to mark their data as "dirty" so that the Dashboard will save it to disk. The panel is identified by the value of wParam. |
| Message: | WM_GETDASHCONFIGDATA |
| Source: | Panel |
| wParam | not used. |
| lParam: | Pointer to storage area to receive data. |
| Description: | Used by panels to retrieve certain Dashboard settings, such as whether icons are being displayed. |
| Message: | WM_CONFIGSTART |
| Source: | Dashboard |
| wParam | not used. |
| lParam: | not used. |
| Description: | Sent by Dashboard to all panels to inform them that the preferences dialog box has been displayed. Panels may use this message to update themselves as necessary. |
| Message: | WM_GETDLGFONTINFO |
| Source: | Panel |
| wParam | not used. |
| lParam: | Pointer to storage area to receive data. |
| Description: | Used by panels to retrieve information about the font used in the preferences dialog box. |
| Message: | WM_CALCMAXPANELSIZE |
| Source: | Panel. |
| wParam | not used. |
| lParam: | not used. |
| Description: | Used by panels to force the Dashboard to write the panel's data to disk. |
| Message: | WM_STARTHELP |
| Source: | Dashboard |
| wParam | TRUE = help mode turned on; FALSE = help mode turned off. |
| lParam: | not used. |
| Description: | Used by Dashboard to inform the panels that help mode has been turned on or off. Panels may wish to act differently when help mode is on (for example by displaying help text rather than performing an action when a button is clicked). |
| Message: | WM_DISPLAYHELP |
| Source: | Panel |
| wParam | not used. |
| lParam: | The help file context number. |
| Description: | Used by panels to cause help information to be displayed. The Dashboard will display the help text identified by the value of lParam. |
| Message: | WM_MINLBUTTONUP |

TABLE 1-continued

| | |
|---|---|
| Source: | Dashboard |
| wParam | not used. |
| lParam: | Coordinates of mouse click. |
| Description: | Used by the Dashboard to inform a panel that the user has clicked the mouse on the Dashboard's minimized icon, when that panel is controlling the display of the icon. |
| Message: | WM_IGNOREDDE |
| Source: | Panel |
| wParam | TRUE = ignore DDE conversations; FALSE = react to DDE conversations. |
| lParam: | not used. |
| Description: | Used by panels which carry on DDE conversations with PROGMAN, to tell Dashboard to ignore the conversation. This is necessary when Dashboard is the shell, as it will normally intercept some conversations meant for PROGMAN. |

TABLE 2

| | |
|---|---|
| Function: | CalcMinPanelSize |
| Description: | Used to determine the minimum size that a panel can assume. |
| Function: | CalcVarPanelSize |
| Description: | For panels that can vary their sizes, used to determine how large the panel would like to be, based on the space offered by the Dashboard. The panel may also optionally return the number of units (buttons) this size corresponds to. |
| Function: | ConfigPanel |
| Description: | Used to cause a panel to display its preferences dialog box. |
| Function: | CreatePanel |
| Description: | Used to tell a panel to create its main window. Called only when the Dashboard is first opened. |
| Function: | DestroyPanel |
| Description: | Used to tell a panel to destroy its main window. Called only when the Dashboard is being closed. |
| Function: | DisplayAllErrors |
| Description: | Used to tell a panel to sequentially display all of its error messages. Used only for development of localized version of the software. |
| Function: | GetCaptionText |
| Description: | Used to get the text to display in Dashboard's title bar, from a panel which is controlling the contents of the title bar. |
| Function: | GetPanelCfgHelp |
| Description: | Used to get the help topic context number for help text on a panel's preferences dialog box. |
| Function: | GetPanelConfig |
| Description: | Used to give a panel its configuration information which has been read from disk by the Dashboard. |
| Function: | GetPanelData |
| Description: | Used to give a panel its data which has been read from disk by the Dashboard. |
| Function: | GetPanelIcon |
| Description: | Used to get the miniature icon for each panel which the Dashboard displays in its preferences dialog box. |
| Function: | GetPanelName |
| Description: | Used to get the name of each panel which the Dashboard displays in its preferences dialog box. |
| Function: | GetPanelProps |
| Description: | Used to get the properties of each panel. The currently defined properties are: PROP MUST SHOW the panel cannot be hidden. |

TABLE 2-continued

| | |
|---|---|
| | PROP HORIZONTAL the panel is horizontal (only the Programs panel uses this). |
| Function: | MinimizedDisplay |
| Description: | Used to determine which panels can control the display of the minimized Dashboard icon. Also used to allow these panels to update the display of that icon. |
| Function: | NotifyLostFocus |
| Description: | Used to notify a panel that it has lost the input focus. Panels may use this information to alter their appearance, if necessary. |
| Function: | QueryDestroyPanel |
| Description: | Used to ask the panels whether it is OK to close the Dashboard. A panel may stop the Dashboard from being closed by the user by returning FALSE from this call. |
| Function: | SavePanelConfig. |
| Description: | Used to retrieve a panel's configuration information, so that Dashboard can save it to disk. |
| Function: | SavePanelData |
| Description: | Used to retrieve a panel's data, so that Dashboard can save it to disk. |
| Function: | SetKbdFocus |
| Description: | Used to inform a panel whether it has the keyboard input focus. A panel may wish to alter its display when it has the keyboard focus, often by drawing a focus rectangle around the active control. |
| Function: | SetPanelStyle |
| Description: | Used to inform a panel of changes in the Dashboard which could cause the panel to alter its appearance. Currently, the three events which trigger this call are: changing the Dashboard color, changing the font, or switching the orientation. |
| Function: | TermLibrary |
| Description: | Used to inform a panel that its DLL is about to be unloaded. A panel may wish to delete files or resources when this occurs. |
| Function: | TimerNotify |
| Description: | Used to inform a panel that one second has elapsed. |
| Function: | ValidateConfig |
| Description: | Used to ask whether a panel's configuration information is valid before closing the preferences dialog box for that panel. |

Appendix A shows a programming code implementation of a generic panel which implements basic functionally for a panel including panel creation, configuration, context sensitive help, caption text display and orientation changes. Appendix B is a microfiche appendix which includes various code segments utilized in the preferred embodiment of the present invention.

The foregoing discussion discloses and describes merely exemplary methods and embodiments of the present invention. As will be understood by those familiar with the art, the invention may be embodied in other specific forms without departing from the spirit or essential characteristics thereof. Accordingly, the disclosure of the present invention is intended to be illustrative, but not limiting, of the scope of the invention, which is set forth in the following claims.

APPENDIX A

```
1    /************************************************************
2        Dashboard generic panel
3        This a sample dashboard panel. It implements basic functionality
4        for a panel including:
5            Panel Creation
6            Configuration
7            Context sensitive help
```

APPENDIX A-continued

```
8          Caption Text display
9          Orientation changes
10  *************************************************************/
11  #define MMNOJOY
12  #define MMNOMMIO
13  #define MMNODRV
14  #define MMNOMIDI
15  #define MMNOAUX
16  #define MMNOMCI
17
18  #include <windows.h>
19  #include <commdlg.h>
20  #include <stdlib.h>
21  #include <mmsystem.h>
22  #include <dblib.h>
23  >include <dashbord.h>
24  #include <dberror.h>
25
26  #include "panel.h"
27  #include "globals.h"
28  #include "forwards.h"
29
30  /*************************************************************
31      LibMain
32          Standard DLL LibMain called when dashboard loads the library
33  *************************************************************/
34  int FAR PASCAL LibMain(hInstance, wDataSegment, wHeapSize, lpszCmdLine)
35  HANDLE hInstance;
36  WORD wDataSegment;
37  WORD wHeapSize;
38  LPSTR lpszCmdLine;
39  {
40  int    iOk;
41  HANDLE hWC;
42  LRWNDCLASS lpWC;
44  glpConfigProc = MakeProcInstance(ConfigDlgProc, ghInst);
45
46  iOk = 0;
47  ghInst = hInstance;
48  hWC = GlobalAlloc(GHND, (DWORD)sizeof(WNDCLASS));
49  if (hWC)
50      {
51      LpWC = (LPWNDCLASS)GlobalLock(hWC);
52      if (lpWC)
53          {
54          lpWC ->lpszClassName = (LPSTR)PANEL_CLASS;
55          lpWC ->hCursor =    LoadCursor(NULL, IDC_ARROW);
56          lpWC ->lpszMenuName =   (LPSTR)NULL;
57          lpWC ->style =     CS_HREDRAW | CS_VREDRAW | CS_DBLCLKS;
58          lpWC ->lpfnWndProc =   PanelWndProc;
59          lpWC ->hInstance = hInstance;
60          lpWC ->hIcon =     NULL;
61          lpWC ->cbWndExtra =    0;
62          lpWC ->hbrBackground = NULL;
63          iOk = RegisterClass(lpWC);
64          }
65      GlobalFree(hWC);
66      }
67  return iOk;
68  }
69
70  /*************************************************************
71      PanelWndProc
72          Window Procedure for the panel
73  *************************************************************/
74  long FAR PASCAL PanelWndProc(HWND hWnd, WORD msg, WORD wParam, LONG lParam)
75  {
76  PAINSTRUCT ps;
77  HDC     hDC;
78  RECT    rect;
79
80  switch (msg)
81      {
82      /*----------------------------------------------------*/
83      /* WM_STARHELP is passed by dashboard to panels when going in and out*/
84      /* of help mode. The global gbInHelp is set to TRUE if wwe're in help*/
85      /* mode.'0    */
86      /*----------------------------------------------------*/
87      case WM_STARTHELP:
```

APPENDIX A-continued

```
88        gbInHelp = wParam;
89        break;
90
91     case WM_SHOWWINDOW:
92        if (wParam)
93           {
94           gbShown = TRUE;
95           }
96        else
97           gbShown = FALSE;
98        break;
99
100    case WM_CREATE:
101       InitializePanel(hWnd);
102       if (gbShown)
103          ShowWindow(hWnd, SW_SHOW);
104       break;
105
106    /*------------------------------------------------*/
107    /* Standard WM_ERASEBKGND processing except that the dashboard  */
108    /* PANEL_BRUSH is used so that all panels will have the same color  */
109    /* background.      */
110    /*------------------------------------------------*/
111    case WM_ERASEBKGND:
112       GetClinetRect(hWnd, &rect);
113       FillRect((HDC)wParam, &rect, GetDashBrush(PANEL_BRUSH));
114       break;
116    /*------------------------------------------------*/
117    /* If we're in help mode, pass the WM_SETCURSOR back to the dashboard*/
118    /* so that it can set the cursor to a uestion mark.     */
119    /*------------------------------------------------*/
120    case WM_SETCURSOR:
121       if (gbInHelp)
122          {
123          SendMessage(ghWndDashboard, msg, wParam, LParam);
124          break;
125          }
126       return DefWindowProc(hWnd, msg, wParam, LParam);
127       break;
128
129
130    /*------------------------------------------------*/
131    /* If the lbutton is pressed while in help mode, pass WM_DISPLAYHELP */
132    /* back to dashboard with the help context number for this panel.   */
133    /* Dashboard will then display help for this panel.     */
134    /*------------------------------------------------*/
135    cased WM_LBUTTONDOWN:
136       if (gbInHelp)
137          PostMessage(ghWndDashboard, WM_DISPLAYHELP, 0, 1002);
138       break;
139
140    /*------------------------------------------------*/
141    /* When the right button is double-clicked, send WM_CONFIG to  */
142    /* dashboard with wParam set to this panel's hWnd. Dashboard will  */
143    /* put up the configuration dialog box with this panel's     */
144    /* configuration options selected.      */
145    /*------------------------------------------------*/
146    case WM_RBUTTONDBLCLK:
147       PostMessage(ghWndDashboard, WM_CONFIG, hWnd, OL);
148       break;
149
150    case WM_PAINT:
151       hDC = BeginPaint(hWnd, &ps);
152       if (hDC != NULL)
153          PaintPanel(hDC, hWnd);
154       EndPaint(hWnd, &ps);
155       break;
156
157    /*------------------------------------------------*/
158    /* WM_CONFIGSTART is passed in from dashboard when the configuration */
159    /* dialog box is displayed. Set the global ghWndDashConfig to the   */
160    /* hWnd of the dialog box.      */
161    /*------------------------------------------------*/
162    case WM_CONFIGSTART:
163       ghWndDashConfig = (HWND)wParam;
164       break;
165
166    /*------------------------------------------------*/
167    /* WM_CONFIGDONE is passed in from the dashboard when the config  */
```

APPENDIX A-continued

```
168    /* dialog box is closed. Reset the globals for the config hWnd's.  */
169    /*--------------------------------------------------------------*/
170    case WM_CONFIGDONE:
171       ghWndModeless = NULL;
172       ghWndDashConfig = NULL;
173       break;
174
175    case WM_DESTROY:
176       break;
177
178    default:
179       return DefWindowProc(hWnd, msg, wParam, lParam);
180       break;
181    }
182    return 0L;
183    }
184
185    /*************************************************************
186       PaintPanel
187          Paints the panel. This uses the standard dblib button font to
188          display the panel's title
189    *************************************************************/
190    void NEAR PASCAL PaintPanel(HDC hDC, HWND hWnd)
191    {
192    RECT rect;
193    char buffer[BUFFERMAX + 1];
194
195    GetClientRect(hWnd, &rect);
196    InflateRect(&rect, -1, -1);
197    DrawOutFrame(hDC, rect);
198
199    LoadString(ghInst, PANEL_TITLE, buffer, sizeof(buffer));
200    SelectObject(hDC, GetButtonFont(NULL, 0));
201    SetBkMode(hDC, TRANSPARENT);
202    DrawText(hDC, buffer, -1, &rect, DT_CENTER);
203    return;
204    }
205
206    /*************************************************************
207       SetPanelStyle
208          Called by dashboard when its style (orientation, color, or font)
209          changes. Set the global gPanelStyle to the style.
210    *************************************************************/
211    VOID FAR PASCAL SetPanelStyle(DWORD panelStyle)
212    {
213    gPanelStyle = panelStyle;
214    }
215
216    /*************************************************************
217       CalcMinPanelSize
218          Called by dashboard to determine the panel's minimum size. For this
219          panel, the minimum size is determined by the size needed to display
220          its title.
221
222          The dashboard orientation is checked so that if it's in
223          horizontal mode the minimum size is the width of the text, and if it's
224          in vertical mode, the minimum size is the height of the text.
225    *************************************************************/
226    void FAR PASCAL CalcMinPanelSize(lpWidth, lpHeight)
227    LPINT lpWidth;
228    LPINT lpHeight;
229    {
230    char buffer[BUFFERMAX + 1];
231    DWORD dwExtent;
232    HDC hDC;
233
234    if ((hDC = GetDC(NULL)) == NULL)
235       dwExtent = 0;
236    else
237       {
238       LoadString(ghInst, PANEL_TITLE, buffer, sizeof(buffer));
239       SelectObject(hDC, GetButtonFont(NULL, 0));
240       dwExtent = GetTextExtent(hDC, buffer, lstrlen(buffer));
241       ReleaseDC(NULL, hDC);
242       }
243
244    if (HORIZONTAL)
245       *lpWidth = LOWORD(dwExtent) + 8;
246    else
```

APPENDIX A-continued

```
247     *lpHeight = HIWORD(dwExtent) + 8;
248     return;
249     }
250
251     /***********************************************************************
252     GetPanelCfgHelp
253         Called by dashboard to the the help context number for the panel.
254     ***********************************************************************/
255     LONG FAR PASCAL GetPanelCfgHelp(void)
256     {
257     return 1003;
258     }
259
260     /***********************************************************************
261     GetPanelIcon
262         Called by dashboard to get the mini-icon for the panel. This is the
263         icon used in the list box in the configuration dialog box.
265     ***********************************************************************/
265     HBISTMAP FAR PASCAL GetPanelIcon(void)
266     {
267     return LoadBitmap(ghInst, "MiniIcon");
268     }
269
270     /***********************************************************************
271     GetPanelName
272         Called by dashboard to get the name of the panel. This is the name
273         used in the list box in the configuration dialog box. This name can
274         be different than the name in dash.ini.
275     ***********************************************************************/
276     BOOL FAR PASCAL GetPanelName(LPSTR lpszPanelName)
277     {
278     LoadString(ghInst, PANEL_TITLE, lpszPanelName, MAX_PANEL_NAME);
279     return TRUE;
280     }
281
282     /***********************************************************************
283     TermLibrary
284         Called by dashboard when the panel's DLL is about to be unloaded.
285     ***********************************************************************/
286     VOID   FAR PASCAL TermLibrary(VOID)
287     {
288     }
289
290     /***********************************************************************
291     GetCaptionText
292         Called by dashboard to get the caption text when this panel is
293         configured to display in the dashboard's caption.
294         If a panel includes this function in its .def file, the panel will
295         will automatically be included in the list of panels which can be
296         displayed in the dashboard's caption.
297
298         This routine also serves to notify the panel that it is displaying into
299         the caption so that, for example, the clock will know to update the
300         caption when the time changes.
301
302         szCaptionText == NULL turns off the caption display
303     ***********************************************************************/
304     VOID FAR PASCAL GetCaptionText(LPSTR szCaptionText,
305                 int ICaptionWidth,
306                 HDc hDC)
307     {
308     DWORD dwExtent;
309
310     if (szCaptionText != NULL)
311         {
312         gCaptionDisplay = TRUE;
3113
314         lstrcpy(szCaptionText, "Panel Caption Text");
315
316         dwExtent = GetTextExtent(hDC, szCaptionText, lstrlen(szCaptionText)),
317
318         /* If the caption text doesn't fit (i,e., in vertical mode, there's not */
319         /* much space for the caption text), use a shorter string.     */
320
321         if ((int)LOWORD(dwExtent) > iCaptionWidth)
322             {
323             lstrcpy(szCaptionText, "Panel");
324             dwExtent = GetTextExtent(hDC, szCaptionText, lstrlen(szCaptionText));
325             if ((int)LOWORD(dwExtent) > iCaptionWidth)
```

APPENDIX A-continued

```
326         *szCaptionText = NULL;
327         }
328     }
329     else
330         gCaptionDisplay = FALSE;
331     }
332
333  /**************************************************************************
334     SavePanelConfig
335        Called by dashboard when it's saving the config file. The panel
336        resizes the memory block passed in to the size that it needs for its
337        configuration data structure and copies this structure to the memory
338        block.
339     **************************************************************************/
340        HANDLE FAR PASCAL SavePanelConfig(HANDLE hMem)
341        {
342        HANDLE hNewMem;
3434       LPPANELCONFIG lpConfig;
344
345        hNewMem = GlobalReAlloc(hMem, sizeof(gPanelConfig), GMEM_MOVEABLE);
346        if (hNewMem == NULL)
347     return NULL;
348
349  lpConfig = (LPPANELCONFIG)GlobalLock(hNewMem);
350  if (lpConfig == NULL)
351     return NULL;
352
353  *lpConfig = gPanelConfig;
354
355  GlobalUnlock(hNewMem);
356  return hNewMem;
357  }
358
359  /**************************************************************************
360     GetPanelConfig
        361  Called by dashboard to give a panel its configuration. If hMem is
        362  NULL, then the panel has never saved a configuration block (e.g. if
        363  this is the first time dashboard has been run). In this case, the
        364  panel should set up its default configuration values.
365     **************************************************************************/
366  BOOL FAR PASCAL GetPanelConfig(HANDLE hMem)
367  {
368  LPPANELCONFIG lpConfig;
369
370  if (hMem == NULL)
371     {
372     gPanelConfig.version = PANELCONFIG_VERSION;
373     return TRUE;
374     }
375
376  lpConfig = (LPPANELCONFIG)GlobalLock(hMem);
377  if (lpConfig == NULL)
378     return FALSE;
379
380     (lpConfig0>version != PANELCONFIG_VERSION)
381     {
382     GlobalUnlock(hMem);
383     return FALSE;
384     }
385
386  gPanelConfig = *lpConfig;
387
388  GlobalUnlock(hMem);
389
390  return TRUE;
391  }
392
393  /**************************************************************************
394     ValidateConfig
395        Called by dashboard to validate the panel's configuration.
396        This is done so that dashboard can prevent the configuration dialog
397        box from closing if a panel's configuration is invalid.
398     **************************************************************************/
399  BOOL FAR PASCAL ValidateConfig(HWND hDlg)
400  {
401  return TRUE;
402  }
403
404  /**************************************************************************
```

APPENDIX A-continued

```
405     CreatePanel
406         Called by dashboard to create the panel. This is called AFTER
407         CalcPanelMinSize, and GetPanelConfig are called.
408     /*****************************************************************
409     HWND FAR PASCAL CreatePanel(hWndDashboard, lpRect)
410     HWND   hWndDashboard;
411     LPRECT lpRect;
412     {
413     BYTE szTitle[BUFFERMAX+1];
414
415     ghWndDashboard = hWndDashboard;
416     LoadString(ghInst, PANEL_TITLE, szTitle, sizeof(szTitle));
417     ghWndPanel = CreateWindowFromRect(PANEL_CLASS, szTitle, WS_CHILD,
418                     lpRect, hWndDashboard, ghInst);
419     return ghWndPanel;
420     }
421
422     /*****************************************************************
423         ConfigPanel
424             Called by dashboard to put up the panel's configuration dialog box.
425             "hWndParent" is the hWnd of the main dialog box. This is used
426             as the parent window in CreateDialog so that the panel's configuration
427             dialog box will appear within the main dashboard configuration dialog
428             box.
429     *****************************************************************/
430     HWND FAR PASCAL ConfigPanel(hWndParent)
431     HWND  hWndParent;
432     {
433     ghWndModeless = CreateDialog(ghInst, "PANEL_CONFIG", hWndParent, glpConfigProc);
434     return ghWndModeless;
435     }
436
437     /*****************************************************************
438         DestroyPanel
439             Called by dashboar when it's closing.
440     *****************************************************************/
441     void FAR PASCAL DestroyPanel(hWndPanel)
442     HWND hWndPanel;
443     {
444     if (glpConfigProc != NULL) FreeProcInstance(glpConfigProc);
445     return;
446     }
447
448     /*****************************************************************
449         WEP
450             Standard Windows WEP.
451     *****************************************************************/
452     void FAR PAASCAL WEP(bSystemExit)
453     int bSystemExit;
454     {
455     return;
456     }
457
458     /*****************************************************************
459         ConfigDlgProc
460             The Dialog Box Procedure for the panel's configuration screen.
461     *****************************************************************/
462     BOLL FAR PASCAL ConfigDlgProc(hDlg, message, wParam, lParam)
463     HWND hDlg;
464     WORD message;
465     WORD wParam
466     LONG lParam;
467     {
468     switch (message)
469         {
470         }
471     return 0;
472     }
473
474     /*****************************************************************
475         InitializePanel
476     *****************************************************************/
477     VOID NEAR PASCAL InitializePanel(HWND hWnd)
478     {
479     RECT rect;
480
481     GetClientRect(hWnd, &rect);
482     if ((rect.right-rect.left > 0) && (rect.bottom-rect.top)>0)
483         gbShown = TRUE;
```

APPENDIX A-continued

```
484     else
485        gbShown = FALSE;
486     }
```

We claim:

1. In a computer system wherein multiple programs may be open at the same time with each program displaying at least one window on a display device, a computer-implemented method for allowing a user of the computer system to control the display of program windows on the display device, the method comprising:

displaying a dashboard graphical user interface having at least first and second panel regions wherein each panel region automatically maintains a proximity relative to the other panel upon a change in orientation of said integrated dashboard graphical user interface shell by a user, displaying in said first panel region a plurality of delineated display regions, each delineated display region representing a virtual display and being referred to as a virtual display region;

displaying in said second panel region a plurality of application program icons, each of said application program icons for launching in response to user input a particular application program;

in response to first user input specifying the selection of a particular application icon, displaying at least one miniaturized rendition of a program window, referred to as a mini-window, in at least one of the virtual display regions, any given mini-window having a respective spatial relationship to the virtual display region in which the given mini-window is displayed and further having a corresponding program window, referred to as the corresponding actual window for the given mini-window;

in response to second user input specifying the selection of a particular virtual display region, displaying, for each given mini-window within the particular virtual display region, the corresponding actual window with a spatial relationship to the display device that corresponds to the spatial relationship of the given mini-window to the particular virtual display region; and in response to third user input specifying a change in the spatial relationship of a particular mini-window to the particular virtual display region, correspondingly changing the spatial relationship of the corresponding actual window to the display device.

2. The method of claim 1 wherein the specified change in the spatial relationship is a resizing of the particular mini-window.

3. The method of claim 1 wherein the specified change in the spatial relationship is a movement of the particular mini-window within the particular virtual display region.

4. The method of claim 1 wherein:

the specified change in the spatial relationship is a movement of the particular mini-window from within the particular virtual display region to a position within a different virtual display region; and the corresponding change in the spatial relationship of the corresponding actual window to the display device is the movement of the corresponding actual window off the display.

5. The method of claim 1, and further comprising:

in response to fourth user input specifying a change in the spatial relationship of the corresponding actual window to the display device, correspondingly changing the spatial relationship of the particular mini-window to the particular virtual display region.

6. The method of claim 1, and further comprising:

displaying a plurality of selection bars corresponding to the plurality of virtual display regions, each selection bar displayed in proximity to a respective virtual display region.

7. The method of claim 6 wherein the second user input specifying the selection of a particular virtual display region is a click in the selection bar displayed in proximity to the particular virtual display region.

8. In a computer system wherein multiple programs may be open at the same time with each program displaying at least one window on a display device, a computer-implemented method for allowing a user of the computer system to control the display of program windows on the display device, the method comprising:

displaying a multi-panel graphical user interface shell having at least first and second panel regions wherein each panel region is configurable by a user to maintain a particular proximity relative to the other panel;

displaying in said first panel region a plurality of delineated display regions, each delineated display region representing a virtual display and being referred to as a virtual display region;

displaying in said second panel region a plurality of application program icons, each of said application program icons for launching in response to user input a particular application program;

in response to first user input specifying the selection of a particular application icon displaying at least one miniaturized rendition of a program window, referred to as a mini-window, in each of first and second virtual display regions, any given mini-window having a respective spatial relationship to the virtual display region in which the given mini-window is displayed and further having a corresponding program window, referred to as the corresponding actual window for the given mini-window;

in response to second user input specifying the selection of the first virtual display region, displaying, for each given mini-window within the first virtual display region, the corresponding actual window with a spatial relationship to the display device that corresponds to the spatial relationship of the given mini-window to the first virtual display region; and in response to third user input specifying the selection of the second virtual display region, displaying, for each given mini-window within the second virtual display region, the corresponding actual window with a spatial relationship to the display device that corresponds to the spatial relationship of the given mini-window to the second virtual display region.

9. The method of claim 8 wherein said step of displaying in response to third user input specifying the selection of the second virtual display region includes ceasing to display actual windows corresponding to the mini-windows in the first virtual display region.

10. The method of claim 8 wherein:

said step of displaying in response to second user input specifying the selection of the first virtual display region occurs before said step of displaying in response to third user input specifying the selection of the second virtual display region; and the third user input specifying the selection of the second virtual display region is a double-click in a given one of the mini-windows displayed in the second virtual display region.

11. The method of claim 8, and further comprising:

displaying a plurality of selection bars corresponding to the plurality of virtual display regions, each selection bar displayed in proximity to a respective virtual display region.

12. The method of claim 11 wherein the second user input specifying the selection of the first virtual display region is a click in the selection bar displayed in proximity to the first virtual display region.

13. In a computing system having a display device, said display device having a single physical display region for displaying a plurality of application programs within a graphical user interface, a computer implemented method for providing said graphical user interface with a plurality of logical display regions each of which can be selected for displaying currently executing application programs at said physical display region of said display device, the method comprising:

(a) displaying an integrated dashboard graphical user interface shell having an orientation which is configurable by a user;

(b) displaying first and second panel regions within said integrated dashboard graphical user interface shell, each panel region being individually configurable and each panel region being configurable as part of the graphical user interface shell, and each panel region maintaining a constant proximity relative to the other panel regardless of change in orientation of said integrated dashboard graphical user interface shell by the user;

(c) displaying within said first panel region a plurality of user-selectable screen icons, each of said user-selectable screen icons for selecting in response to user input a particular one of said plurality of logical display regions for display on said physical display region of said display device;

(d) displaying a plurality of application program icons within said second panel region, each of said application tion program icons for launching in response to user input a particular one of said application programs;

(e) receiving user input for selecting an application program icon corresponding to a desired application program and for selecting a user-selectable screen icon corresponding to a desired logical display region;

(f) in response to said user input of step (e), launching the desired application program as an executing application program in said desired logical display region; and (g) in response to receiving user input at one of said user-selectable screen icons for selecting display of said desired logical display region, displaying said executing application program in said physical display region of said display device and ceasing display of any application program which is executing in another of said logical display regions.

14. The method of claim 13, wherein said user input of step (e) includes placing a cursor over an application program icon corresponding to a desired application program, depressing a mouse button, moving the cursor over a user-selectable screen icon corresponding to a desired logical display region and releasing the mouse button.

15. The method of claim 13, further comprising:

in response to receiving user input, saving a particular configuration of said plurality of logical display regions as a default configuration for a future session; and at the future session, restoring said particular configuration by re-displaying application programs which were being displayed when said particular configuration was saved.

16. The method of claim 13, further comprising:

displaying in said second panel region for each application program executing an application program name for indicating which application programs are currently executing in the system.

17. The method of claim 13, wherein step (g) further comprises:

in response to receiving user input for selecting another of said user-selectable screen icons for selecting display of another desired logical display region, displaying any executing application program in said physical display region associated with the other logical display region, and ceasing display of any application program which is executing in the previously-displayed logical display region.

18. The method of claim 17, wherein application programs continue background execution even when they are no longer displayed.

* * * * *